(12) United States Patent
Kraegeloh et al.

(10) Patent No.: US 11,962,833 B2
(45) Date of Patent: Apr. 16, 2024

(54) SOURCE DEVICES, SINK DEVICES, METHODS AND COMPUTER PROGRAMS

(71) Applicant: Fraunhofer-Gesellschaft zur Foerderung der angewandten Forschung e.V., Munich (DE)

(72) Inventors: Stefan Kraegeloh, Erlangen (DE); Thomas Heller, Erlangen (DE); Rinat Zeh, Nuremberg (DE); Herbert Thoma, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 45 days.

(21) Appl. No.: 17/239,217

(22) Filed: Apr. 23, 2021

(65) Prior Publication Data

US 2021/0243491 A1   Aug. 5, 2021

Related U.S. Application Data

(63) Continuation of application No. PCT/EP2019/079109, filed on Oct. 24, 2019.

(30) Foreign Application Priority Data

Oct. 24, 2018   (EP) ..................................... 18202428

(51) Int. Cl.
*H04N 21/43*      (2011.01)
*H04N 21/4363*    (2011.01)
*H04N 21/485*     (2011.01)

(52) U.S. Cl.
CPC ................. *H04N 21/43072* (2020.08); *H04N 21/43635* (2013.01); *H04N 21/485* (2013.01)

(58) Field of Classification Search
None
See application file for complete search history.

(56) References Cited

U.S. PATENT DOCUMENTS

| | | | |
|---|---|---|---|
| 8,922,713 B1 | 12/2014 | Chakrovorthy et al. | |
| 2005/0281255 A1 | 12/2005 | Davies et al. | |
| 2008/0291863 A1 | 11/2008 | Agren | |
| 2009/0073316 A1* | 3/2009 | Ejima | H04N 5/04 348/739 |

(Continued)

FOREIGN PATENT DOCUMENTS

| | | |
|---|---|---|
| CN | 106331562 A | 1/2017 |
| EP | 3226570 A1 | 10/2017 |

(Continued)

OTHER PUBLICATIONS

HDMI 1.4—Uploaded in 2 parts.

(Continued)

*Primary Examiner* — Heather R Jones
(74) *Attorney, Agent, or Firm* — Perkins Coie LLP; Michael A. Glenn

(57) ABSTRACT

A source device for providing audio data and video data on one or more digital media interfaces is described, wherein the source device is configured to automatically adjust a time alignment between a provision of audio data and a provision of video data based on an information about a latency of an audio path and based on an information about a latency of a video path.

30 Claims, 17 Drawing Sheets

(56) References Cited

U.S. PATENT DOCUMENTS

| | | |
|---|---|---|
| 2009/0091655 A1 | 4/2009 | Russell et al. |
| 2012/0133829 A1 | 5/2012 | Nakade |
| 2013/0222210 A1 | 8/2013 | Wang et al. |
| 2013/0268980 A1* | 10/2013 | Russell .............. H04N 21/6332 725/75 |
| 2015/0208161 A1 | 7/2015 | Lesaffre |
| 2015/0319405 A1 | 11/2015 | Yarygin et al. |
| 2016/0373615 A1 | 12/2016 | Chen |

FOREIGN PATENT DOCUMENTS

| | | |
|---|---|---|
| JP | 2004282667 A | 10/2004 |
| JP | 2012119924 A | 6/2012 |
| JP | 2013192247 A | 9/2013 |
| KR | 20140134691 A | 11/2014 |
| RU | 2510587 C2 | 3/2014 |
| RU | 2015111194 A | 10/2016 |
| WO | 2013130864 A1 | 9/2013 |

OTHER PUBLICATIONS

HDMI 2.1—Uploaded in 3 parts.
HDMI Forum, "High-Definition Multimedia Interface Specification Version 2.0", Sep. 4, 2013 (Sep. 4, 2013), XP055388172, Retrieved from the Internet: URL:hdmiforum.org [retrieved on Jul. 5, 2017], Sep. 4, 2013. Uploaded in 2 parts.

* cited by examiner

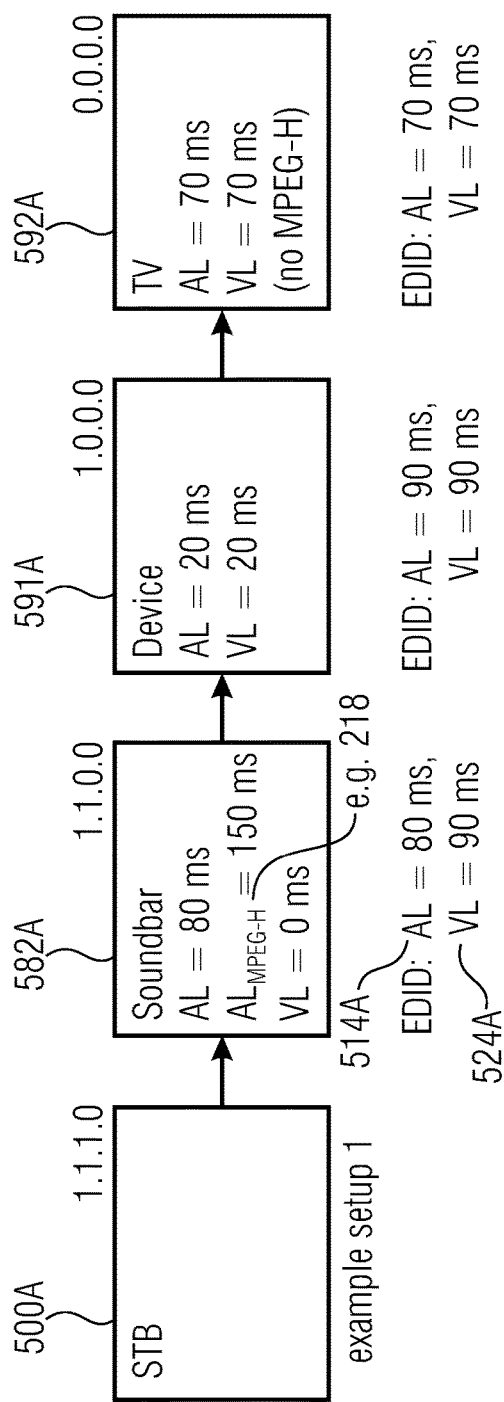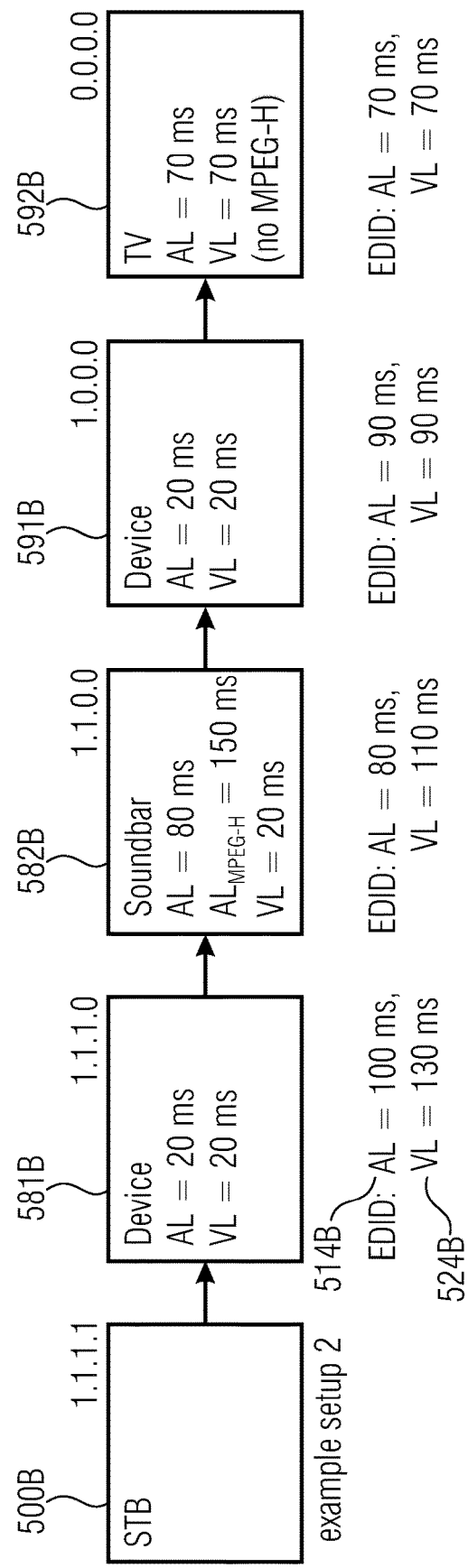
Fig. 5A
Fig. 5B

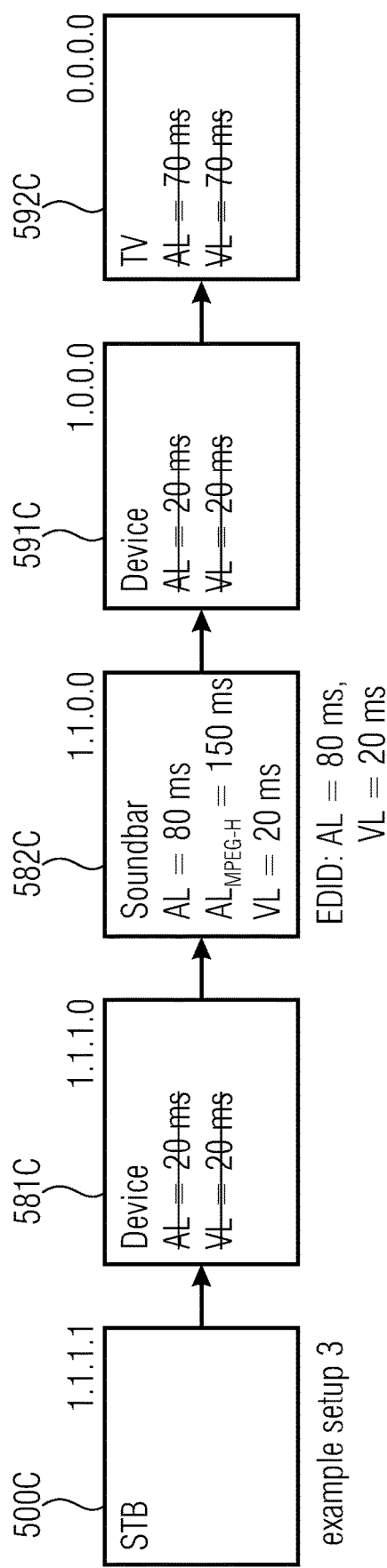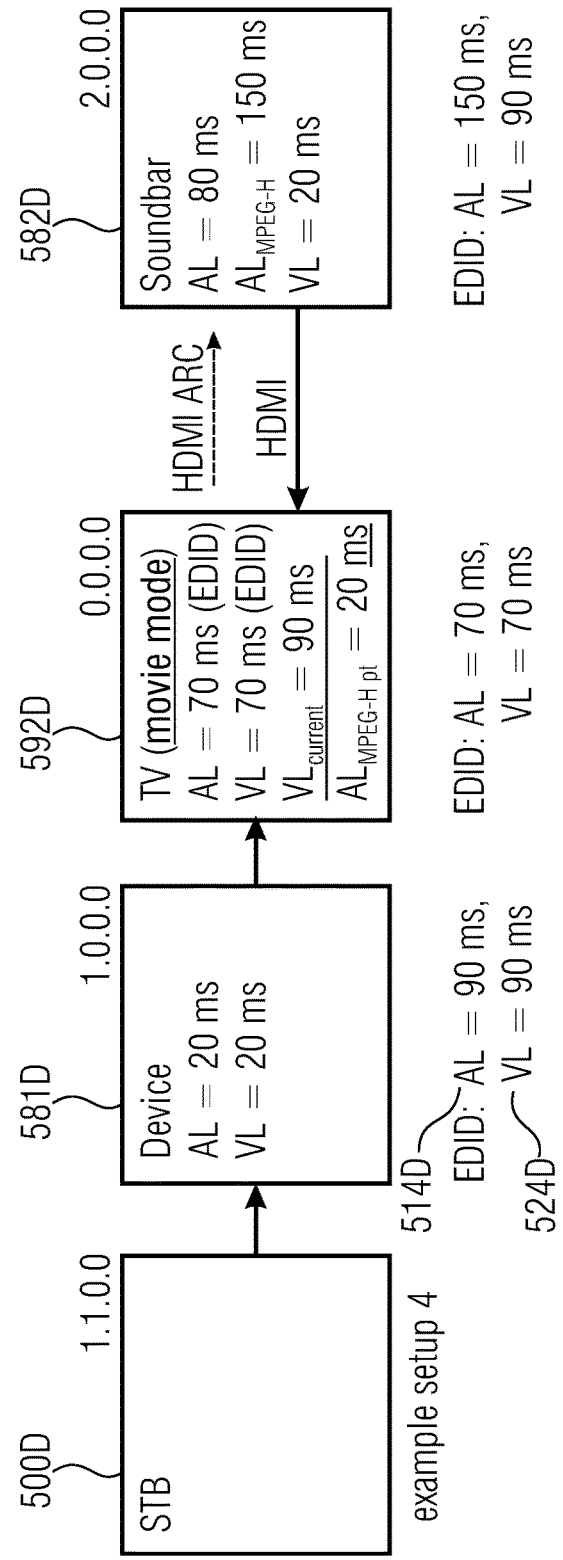
Fig. 5C
Fig. 5D

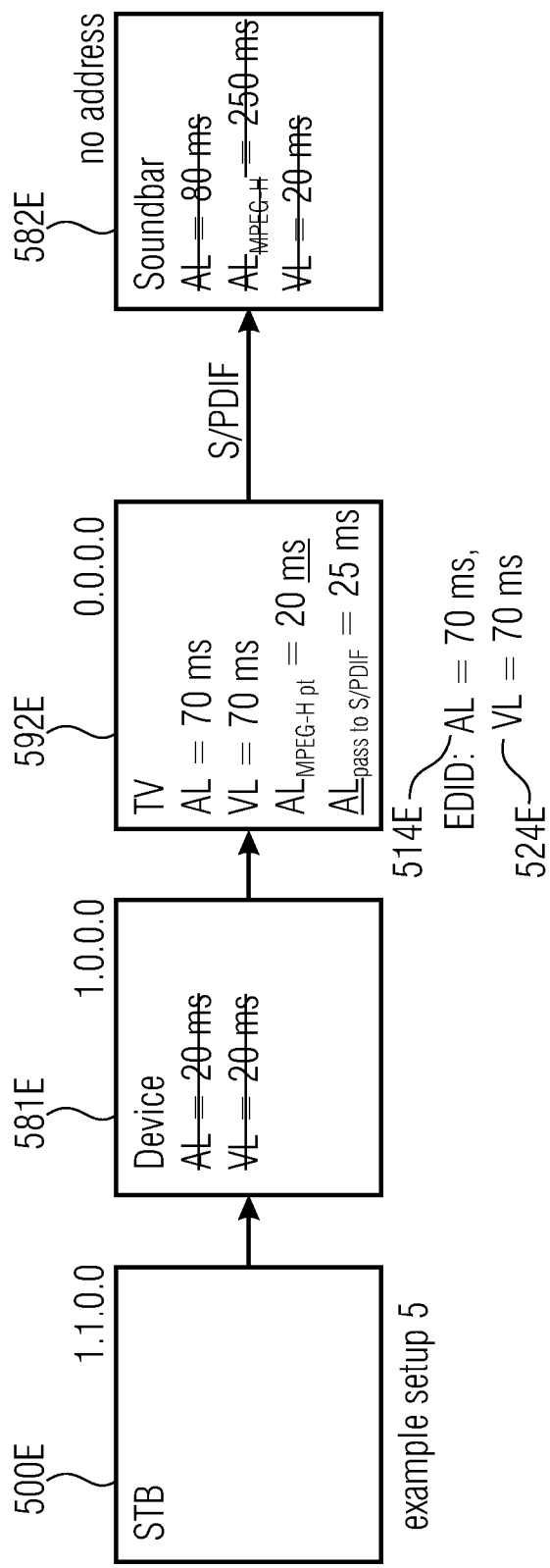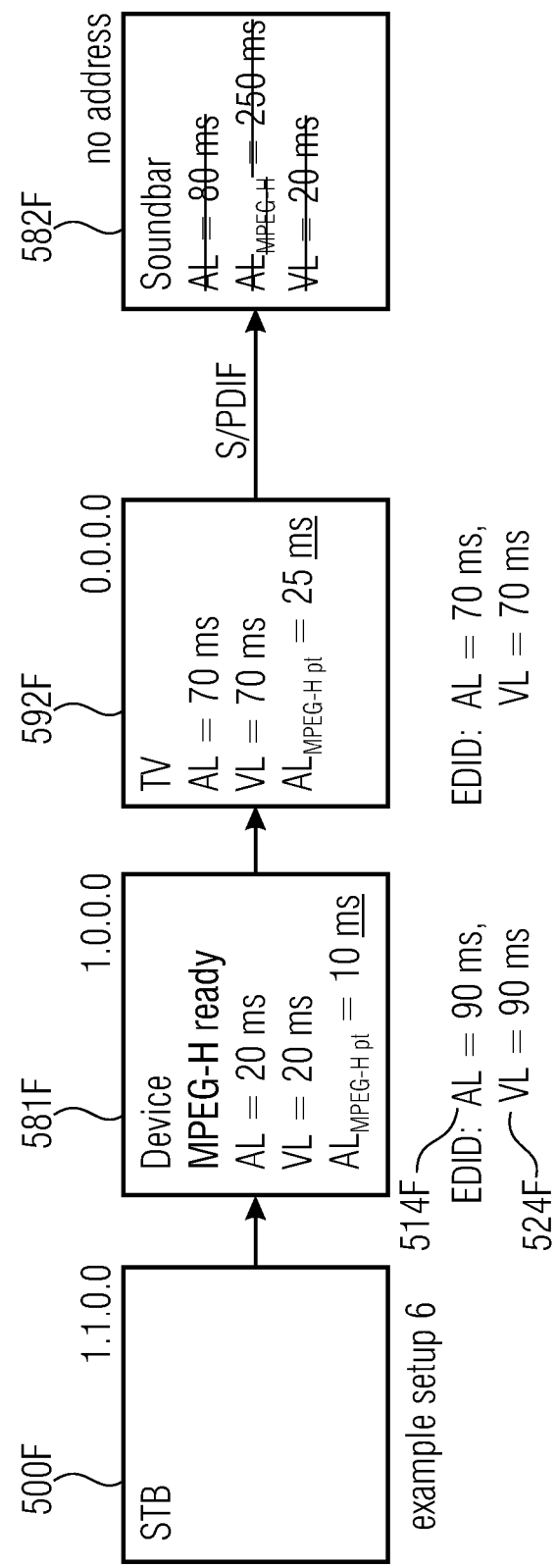

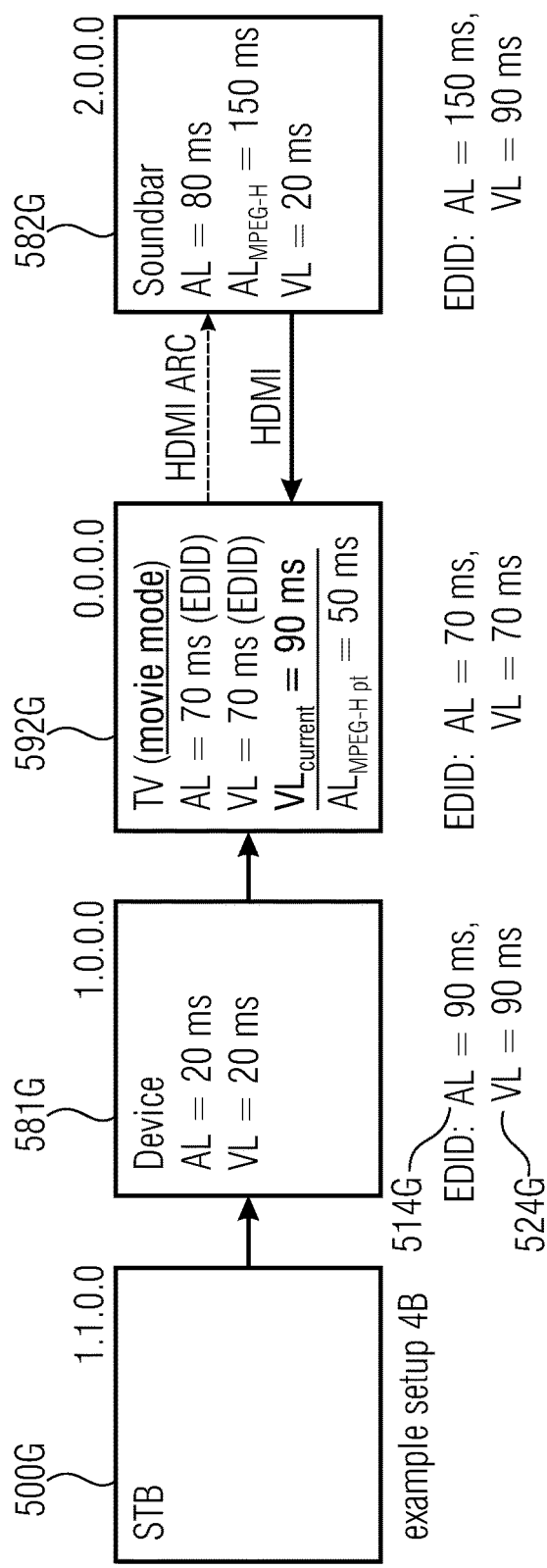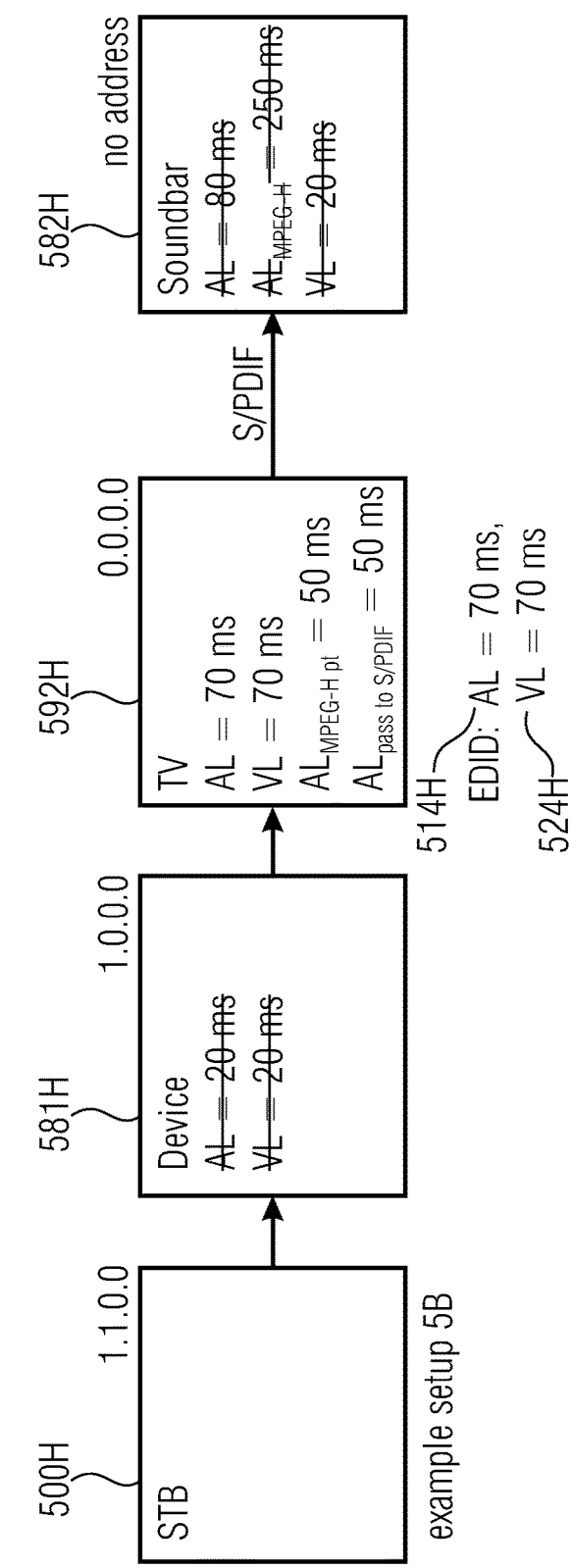
Fig. 5G
Fig. 5H

1000

Automatically adjusting a time alignment between a provision of audio data and a provision of video data based on an information about a latency of an audio path and based on an information about a latency of a video path — 1010

Receiving audio data via a digital media interface — 1110

Decoding the received audio data, to obtain decoded audio data and — 1120

Outputting the decoded output data; — 1130

Reporting a device-individual latency information which comprises latency information associated with a playback using the first audio mode and latency information associated with a playback using a second audio mode in response to a request from a source device — 1140

Fig. 11

SOURCE DEVICES, SINK DEVICES, METHODS AND COMPUTER PROGRAMS

CROSS-REFERENCE TO RELATED APPLICATIONS

This application is a continuation of copending International Application No. PCT/EP2019/079109, filed Oct. 24, 2019, which is incorporated herein by reference in its entirety, and additionally claims priority from European Application No. 18202428.1, filed Oct. 24, 2018, which is also incorporated herein by reference in its entirety.

TECHNICAL FIELD

Embodiments of the invention refer to a source device for providing audio data and video data on one or more digital media interfaces.

Further embodiments of the invention refer to a sink device, in particular a video sink device.

Further embodiments of the invention refer to a further sink device, in particular an audio sink device.

Further embodiments of the invention refer to a method for providing audio data and video data on one or more digital media interfaces.

Further embodiments of the invention refer to a computer program.

Embodiments according to the invention provide a mean to achieve lip sync in audio/video devices connected via HDMI, HDMI ARC and S/PDIF.

BACKGROUND OF THE INVENTION

Playback of audio/video content often involves a number of devices that are connected to each other using, for example, HDMI, HDMI ARC and S/PDIF links. HDMI carries, for example, audio and video, HDMI ARC and S/PDIF carry, for example, only audio. All devices connected with HDMI or HDMI ARC are among themselves connected with the HDMI CEC bus. S/PDIF (electrical or optical TOSLINK) is a pure unidirectional connection.

For playback, a source device (e.g. STB, Set Top Box) sends an audio and video stream to a sink device (e.g. TV set). It is also common to have different sink devices for video and audio, e.g. TV set for video and AVR or soundbar for audio. In addition, there may be further devices in the HDMI network, e.g. repeaters or switches or additional sources or sinks. Video is, for example, always transmitted in raw format, for audio a variety of formats are possible, both uncompressed (e.g. PCM) and compressed (e.g. MPEG-H).

To achieve lipsync, the HDMI spec (HDMI 1.4, HDMI 2.0) suggests that audio and video are played out in synch by a source device. It is then seen as the responsibility of all downstream devices to apply the same latency to the video path and the audio path so that rendering of video and audio will occur at exactly the same time.

This works reasonably well in simple cases, e.g. when playing out from a STB to a TV set using PCM audio. The TV set knows the rendering time for video and applies this time as delay for audio before sending it to the loudspeakers.

Problems arise, if the time needed for audio processing (decoding and rendering) is larger than the time needed for video rendering. Since video is transmitted on HDMI in raw format, it cannot be delayed in the sink devices with reasonable effort. Therefore the HDMI spec mandates that audio latency be no larger than video latency+20 ms (see HDMI 2.0a 10.6.1.1).

But today's powerful audio codecs often have decoding times that are larger than the typical video rendering time. In addition the sink devices may need substantial time for audio rendering algorithms (e.g. in a soundbar) or wireless connection of loudspeakers. Therefore a solution is needed where lipsync can be achieved when audio latency is larger than video latency.

Another problem arises, if audio sink and video sink are not the same devices. In that case, the audio sink should know (or needs to know) the latency of the video sink to adjust its latency according to the current scheme. HDMI defines an optional mechanism for a sink device to report it's video and audio latencies in EDID (information sent from sink to source), but this is almost never implemented and therefore cannot be used in practice. And even if it were implemented, it is static and averaged information and does not change when the video latency changes. The video latency may change when different video resolutions are processed or when different video options are selected at the TV set, e.g. a fast game mode.

HDMI 2.0 also defines optional CEC commands to report changing video latency times (see HDMI 2.0a 10.7.1). But again, this is almost never implemented and so cannot be used in practice.

It should be noted that, optionally, some or all of the features, functionalities and details, may be applied or may be present in embodiments according to the present invention (at least if this is not in conflict with the concepts described below).

Thus, there is a need to improve synchronization of audio and video playback in connected audio and video devices.

SUMMARY

An embodiment may have a source device for providing audio data and video data on one or more digital media interfaces, wherein the source device is configured to automatically adjust a time alignment between a provision of audio data and a provision of video data based on an information about a latency of an audio path and based on an information about a latency of a video path, wherein the source device is configured to obtain an encoded video representation, to decode the encoded video representation, to obtain a decoded video representation, and to provide the video data, such that the video data represent the decoded video representation, and wherein the source device is configured to selectively delay the decoding of the encoded video representation based on the information about the latency of the audio path and the information about the latency of the video path, wherein the source device is configured to obtain the information about the latency of the audio path using an audio delay information which is obtained from an audio playback device via one of the one or more digital interfaces, and/or wherein the source device is configured to obtain the information about the latency of the video path using a video delay information which is obtained from a video rendering device via one of the one or more digital interfaces.

Another embodiment may have a sink device, wherein the sink device is configured to receive audio data via a digital media interface, wherein the sink device is configured to decode the received audio data, to obtain decoded audio data, and wherein the sink device is configured to output the decoded output data; wherein the sink device is configured to report a device-individual latency information which has latency information associated with a playback using the first audio mode and latency information associated with a playback using a second audio mode, in response to a request from a source device, and wherein the sink device is configured to negotiate a decoding latency or a playback latency associated with the second audio mode with a source device.

Another embodiment may have a sink device, wherein the sink device is configured to receive video data via a digital media interface, wherein the sink device is configured to render the received video data; wherein the sink device is configured to report a device-individual latency information which has static latency information representing a contribution of the sink device to a total video latency information describing a total latency of a video path or describing an average total latency of the video path over a plurality of video modes; and latency information representing an actual latency of a rendering of video data, wherein the contribution to the total video latency information is different from the latency information representing the actual latency of a rendering of video data.

Another embodiment may have a method for providing audio data and video data on one or more digital media interfaces, wherein the method has automatically adjusting a time alignment between a provision of audio data and a provision of video data based on an information about a latency of an audio path and based on an information about a latency of a video path, wherein the method has: obtaining an encoded video representation, decoding the encoded video representation, to obtain a decoded video representation, and providing the video data, such that the video data represent the decoded video representation, and wherein the method has selectively delaying the decoding of the encoded video representation based on the information about the latency of the audio path and the information about the latency of the video path, and wherein the method has obtaining the information about the latency of the audio path using an audio delay information which is obtained from an audio playback device via one of the one or more digital interfaces, and/or obtaining the information about the latency of the video path using a video delay information which is obtained from a video rendering device via one of the one or more digital interfaces.

Still another embodiment may have a method for operating a sink device, wherein the method has receiving audio data via a digital media interface, wherein the method has decoding the received audio data, to obtain decoded audio data, and wherein the method has outputting the decoded output data; wherein the method has reporting a device-individual latency information which has latency information associated with a playback using the first audio mode and latency information associated with a playback using a second audio mode, in response to a request from a source device, and wherein the method has negotiating a decoding latency or a playback latency associated with the second audio mode with a source device.

Another embodiment may have a method for operating a sink device, wherein the method has receiving video data via a digital media interface, wherein the method has rendering the received video data, wherein the method has reporting a device-individual latency information which has latency information representing a contribution of the sink device to a total video latency information describing a total latency of a video path or describing an average total latency of the video path over a plurality of video modes; and latency information representing an actual latency of a rendering of video data, wherein the contribution to the total audio latency information is different from the latency information representing the actual latency of a rendering of video data.

Another embodiment may have a source device for providing audio data and video data on one or more digital media interfaces, wherein the source device is configured to automatically adjust a time alignment between a provision of audio data and a provision of video data based on an information about a latency of an audio path and based on an information about a latency of a video path, wherein the source device is configured to negotiate a decoding latency with an audio playback device, and to adjust the time alignment in dependence on the negotiated decoding latency.

Another embodiment may have a source device for providing audio data and video data on one or more digital media interfaces, wherein the source device is configured to automatically adjust a time alignment between a provision of audio data and a provision of video data based on an information about a latency of an audio path and based on an information about a latency of a video path; and to negotiate a decoding latency with an audio playback device, and to adjust the time alignment in dependence on the negotiated decoding latency; and to obtain a latency span information describing a span of possible latency values from the audio playback device, or to obtain a latency list information describing one or more possible latency values from the audio playback device; and to select a desired latency value on the basis of the latency span information or the latency list information such that the desired latency value fits an information about the latency of the video path; and to instruct the audio playback device to use the desired latency value; and to adjust the time alignment in dependence on the selected desired audio playback latency value.

According to another embodiment, a method for providing audio data and video data on one or more digital media interfaces may have the steps of: automatically adjusting a time alignment between a provision of audio data and a provision of video data based on an information about a latency of an audio path and based on an information about a latency of a video path; negotiating a decoding latency with an audio playback device, and to adjust the time alignment in dependence on the negotiated decoding latency.

According to still another embodiment, a method for providing audio data and video data on one or more digital media interfaces may have the steps of: automatically adjusting a time alignment between a provision of audio data and a provision of video data based on an information about a latency of an audio path and based on an information about a latency of a video path; negotiating a decoding latency with an audio playback device, and to adjust the time alignment in dependence on the negotiated decoding latency; obtaining a latency span information describing a span of possible latency values from the audio playback device, or obtaining a latency list information describing one or more possible latency values from the audio playback device; and selecting a desired latency value on the basis of the latency span information or the latency list information such that the desired latency value fits an information about the latency of the video path; and instructing the audio playback device to use the desired latency value; and adjusting the time alignment in dependence on the selected desired audio playback latency value.

Still another embodiment may have a non-transitory digital storage medium having stored thereon a computer program for performing the inventive methods as mentioned above when said computer medium is run by a computer.

An embodiment according to the invention provides a source device for providing audio data and video data on one or more digital video interfaces, for example, HDMI ports, for example according to specification HDMI 1.4 or later. The source device is configured to automatically adjust a time alignment between a provision of audio data, for example in the form of an audio stream, and a provision of video data, for example, in the form of a video stream, based on an information about a latency of an audio path and based on an information about a latency of a video path. A latency of an audio path is, for example, a latency from the provision of the audio data by the source device until a provision of audible audio information, that is a playback of the audio data, for example by an audio sink device. The latency of the video path is, for example, a latency from the provision of video data or audio data by the source device until the provision of visible video data, for example by a video sink device or by the video source device.

The source device is based on the idea that a synchronization of a playback of audio data and a playback of video data may be improved by an adjustment of a time alignment between a provision of audio data and a provision of video data by the source device. As the source device is, for example, configured to have access to an information about the latency of the audio path and an information about the latency of the video path, the source device is capable of considering both a latency of the audio path and a latency of the video path for adjusting a time alignment between a provision of audio data and a provision of video data. As the source device provides both the audio data and the video data, the source device may efficiently adjust the time alignment between the audio data and the video data (which may, for example, be more efficient than adding a delay at a sink device).

For example, the source device may delay the provision of audio data with respect to the provision of the video data or the source device may delay the provision of video data with respect to the provision of audio data. Thus, the source device is capable of delaying both the provision of audio data and the provision of video data with respect to each other. Therefore, the source device is, for example, capable to improve the synchronization of a playback of audio data and a playback of video data in cases where the latency of the audio path is larger than the latency of the video path and in cases where the latency of the video path is larger than the latency of the audio path or in cases where the latency of the audio path equals the latency of the video path.

For example, adjusting the time alignment between the provision of audio data and the provision of video data may lead to a perfect lip sync of the playback of the audio data and the playback of the video data.

For example, it may be possible that the latency of the audio path is more than 20 milliseconds larger than the latency of the video path. The source device may adjust the time alignment between the provision of the audio data and the provision of the video data, so that lip sync for these cases may be achieved.

For example, if the audio data provided by the source device is determined to be decoded by an audio sink or an audio playback device by using the MPEG-H codec the latency due to the decoding of the audio data may be large, for example larger than 20 milliseconds.

As the time alignment between the provision of audio data and the provision of video data is adjusted by the source device, a synchronization between the playback of audio data and the playback of video data within a set of different devices may be improved, even if a subset of the set of devices is incapable of communicating to each other. For example, the synchronization of the playback of audio data and the playback of video data may be improved even if a device within the audio path or a device within the video path is incompatible to communicate, for example to communicate an information about a latency, to another device, for example, the source device or another device in the audio path or in the video path.

The source device is configured to automatically adjust the time alignment between the provision of audio data and the provision of video data. For example, the source device may be capable of communicating with a sink device, for example an audio sink device or a video sink device or an audio playback device or a video playback device, so that the source device may react on changes of the latency of the audio path and/or the latency of the video path, so that the source device may be configured to adjust the time alignment between the provision of audio data and the provision of video data according to these changes. Therefore, the source device may improve the synchronization of a playback of video data and a playback of audio data in a very reliable way.

For example, the source device may be capable to achieve lipsync in case an audio latency is more than 20 ms larger than a video latency.

For example, the source device may be compatible to spec HDMI1.4 and/or HDMI2.0.

For example, the source device may excel the speed and the reliability of existing lipsync management algorithms (which are defined only for cases where an audio latency is more than 20 ms smaller than a video latency).

According to an embodiment, the source device is configured to obtain or receive or read from a data carrier or generate an encoded video representation, to decode the encoded video representation, to obtain a decoded video representation, and to provide the video data, such that the video data represents the decoded video representation, for example in a raw data format, representing individual pixels. The source device is further configured to selectively delay the decoding of the encoded video representation, for example, by delaying or buffering the encoded video representation, based on the information about the latency of the audio path and the information about the latency of the video path, for example, if the latency of the audio path is larger than the latency of the video path. Delaying the decoding of the encoded video representation (e.g. a decoding from a representation comprising inter-frame dependencies and/or a description of motion between two frames into an independent representation of pixel values for individual frames) is a very efficient way to delay the provision of video data, for example, in contrast to delaying a decoded video representation. As the source device combines the function of decoding the encoded video representation with the function of providing both, the video data and the audio data, it may adjust the time alignment very efficiently and may be capable of achieving a very accurate synchronization between the playback of the audio data and the playback of the video data.

For example, the source device may be configured to obtain an encoded audio representation and to provide the audio data, such that the audio data represents the encoded audio representation. Thus, the audio data may have to be decoded by an audio sink device or an audio playback device before the audio sink device may provide audible audio information based on the audio data. In cases where the latency of the audio path is larger than the latency of the video path, for example due to a large audio latency caused by a decoding of the audio data by an audio sink device or an audio playback device, the provision of the video data by the source device may be delayed for achieving lip sync or at least an improvement of a synchronization of an audio playback and a video playback. The source device is configured to efficiently delay the provision of video data by delaying the decoding of the encoded video representation.

According to an embodiment of the invention, the source device is configured to obtain the information about the latency of the audio path using an audio delay information which is obtained from an audio playback device, for example an audio decoding device, for example a soundbar, via one of the one or more digital interfaces. The source device is further configured to obtain the information about the latency of the video path using a video delay information which is obtained from a video rendering device, for example a TV, via one of the one or more digital interfaces. By obtaining the information about the latency of the audio path from an audio delay information which is obtained from an audio playback device, the source device is able to increase an accuracy of the information about the latency of the audio path. For example, the source device may combine the audio delay information obtained from the audio playback device with more audio delay information obtained from a further device within the audio path, so to obtain the information about the latency of the audio path. By for obtaining the information about the latency of the video path from the video delay information which is obtained from the video rendering device, an accuracy of the information about the latency of the video path may be increased. By obtaining a better accuracy of the information about the latency of the audio path and/or the information about the latency of the video path, the source device may achieve a better synchronization of the audio playback and the video playback by adjusting the time alignment between the provision of the audio data and the provision of the video data very accurately.

According to an embodiment of the invention the source device is configured to negotiate a decoding latency with an audio playback device, for example an audio playback device configured to decode the audio data, and to adjust the time alignment in dependence on the negotiated decoding latency. The decoding latency may, for example, be an audio decoding latency of the audio playback device configured to decode the audio data. The audio decoding latency may be a time the audio playback device needs or uses for decoding audio data. For example, the source device may negotiate the decoding latency based on a video decoding latency for decoding the encoded video representation. For example, the source device may negotiate the decoding latency, so as to adapt the decoding latency to the video decoding latency. By negotiating the decoding latency with the audio playback device, the source device may be able to minimize a delay for the provision of audio data and/or the provision of video data, which is entailed for achieving lip sync. For example, the source device may initiate an adjustment of a decoding latency of the audio playback device, so as to reduce a difference between the latency of the audio path and the latency of the video path, such that an adjustment of the time alignment between the provision of audio data and the provision of video data by the source device may be minimized. Thus, the negotiation of the decoding latency between the source device and the audio playback device may decrease a time period between obtaining the video data and the audio data and a playback of the video data and the audio data.

For example, the source device may be configured to perform a latency negotiation (e.g. defined by DaNoL) between the source device and the audio decoding device so that it is possible to adjust the latency to the most suitable value.

According to an embodiment the source device is configured to obtain or request a latency span information describing a span of possible latency values from the audio playback device, for example, using a reporting latency span message, or to obtain a latency list information describing one or more possible latency values, for example, using a report possible latency values message, from the audio playback device, for example by sending a request latency info message to the audio playback device. The source device is further configured to select a desired latency value on the basis of the latency span information or the latency list information, for example such that the desired latency value fits an information about the latency of the video path. The source device is further configured to instruct the audio playback device to use the desired latency value, for example, using a set latency message. The source device is further configured to adjust the time alignment independent on the selected desired audio playback latency value. By obtaining a latency span information or a latency list information, the source device is capable of choosing or selecting a decoding latency or a latency value from the span of possible latency values or from the one or more possible latency values for the audio playback device that is compatible with the audio playback device. As the source device is configured to instruct the audio playback device to use a latency value selected by the source device, the source device is capable of adjusting a latency value or a decoding latency of the audio device based on the information about the latency of the video path and the information about the latency of the audio path and/or a video decoding latency of the source device. Thus, the source device is capable of avoiding an unnecessarily long latency of the audio path and the video path.

According to an embodiment the source device is configured to verify whether the audio playback device uses the selected desired latency value, as instructed, and the source device is configured to consider a default latency value if the audio playback device fails to use the selected desired latency value. As the source device is configured to verify whether the audio playback device uses the selected desired latency value, as instructed, the source device may avoid to adjust the time alignment between the provision of audio data and the provision of video data based on a wrongly assumed latency value of the audio playback device, or in other words, a faulty information about the latency of the audio path. As the source device is configured to consider a default latency value if the audio playback device fails to use the selected desired latency value, the source device may be still able to correctly adjust the time alignment between the provision of audio data and the provision of video data, if a negotiation of the decoding latency with the audio playback device fails.

According to an embodiment the source device is configured to receive a latency negotiation request comprising a latency span information describing a span of possible latency values from the audio playback device, for example, using a reporting latency span message or comprising a latency list information describing one or more possible latency values, for example, using a report possible latency values message, from the audio playback device. The source device is further configured to select a desired latency value on the basis of the latency span information or the latency list information, for example such that desired latency value fits an information about the latency of the video path. As the source device is configured to receive a latency negotiation request, the source device is able to adjust or check the time alignment between the provision of audio data and the provision of video data based on a request from another device, so that the source device may react to a change of the latency of the audio path.

According to an embodiment of the invention the source device is configured to discover a topology of a connection between the source device and an audio playback device and also of a connection between the source device and a video rendering device, in order to obtain a topology information. The source device is further configured to adjust the time alignment in dependence on the topology information. By discovering the topology of the connection between the source device and the video rendering device, the source device is able to obtain a more accurate information about the latency of the video path. By discovering the topology of the connection between the source device and the audio playback device, the source device is able to obtain a more accurate information about the latency of the audio path. For example, the source device may obtain an information about the latency of the audio path by considering one or more latency values of one or more devices comprised in the connection between the source device and the audio playback device. For example, the source device may obtain the information about the latency of the video path by considering one or more latency values of one or more devices comprised in the topology of the connection between the source device and the video rendering device.

According to an embodiment, the source device is configured to obtain a total audio latency information, for example an EDID audio latency, for example $AL_{EDIDsource}$, describing a total latency of an audio path for a first audio mode, for example, for a legacy audio mode or for a none-MPEG-H audio mode or for a low-delay audio mode, or describing an average total latency of the audio path over a plurality of audio modes, for example, by receiving a message representing the total audio latency information. The source device is further configured to obtain a total video latency information, for example an EDID video latency, for example, $VL_{EDIDsource}$ describing a total latency of a video path for a first video mode, for example, for a legacy video mode or for a standard video mode or for a non-MPEG-H video mode, or describing an average total latency of the video path over a plurality of video modes, for example, by receiving a message representing the total video latency information. Obtaining the total audio latency information may improve the information about the latency of the audio path. Obtaining the total video latency information may improve the information about the latency of the video path. An improvement of the information about the latency of the audio path and the information about the latency of the video path enables the source device to adjust the time alignment more accurately.

According to an embodiment, the source device is configured to query a plurality of individual devices, for example, devices in a chain between the source device and an audio playback device, or devices in a chain between the source device and a video rendering device, for device-individual (audio and/or video) latency information (for example, using <Request Latency Info> messages, or, optionally, by using a <Request EDID Latency Info> message), wherein the device-individual (audio) latency information may, for example, comprise latency information associated with a playback using the first audio mode, $AL_{none\ MPEG-H}$, latency information associated with a playback using a second audio mode, $AL_{MPEG-H}$, a latency associated with a passthrough of audio information for the second audio mode, $AL_{MPEG-H\ passthrough}$, a latency information describing a contribution of the device to the total video latency information, $VL_{EDID}$, and a current video latency information $VL_{current}$. As the source device is configured to query the plurality of individual devices, the source device may acquire very accurate information about the latency of the audio path and/or the latency of the video path, so that the source device may adjust the time alignment very accurately, even in situation in which the second audio mode is used or in situations, in which a total audio and/or video latency information describing a total latency of the audio/video path is unavailable to the source device, e.g. because a device in the audio and/or video path does not support a total latency information.

According to an embodiment, the source device is configured to determine, e.g. selectively determine, the information about the latency of the video path using a summation of device-individual current video latency information, if device-individual current video latency information is available to the source device for the video rendering device and all devices, for example in the video path, between the source device and the video rendering device. Alternatively or additionally, the source device is configured to determine the information about the latency of the video path using: a total video latency information describing a total latency of a video path for a first video mode, for example, for a legacy video mode or for a non-MPEG-H video mode, or describing an average total latency of the video path over a plurality of video modes; further using: a latency information describing a contribution of the video rendering device to the total video latency information, e.g. $VL_{EDID}$; and further using a current video latency information of the video rendering device, e.g. $VL_{current}$, if the total video latency information, the latency information describing a contribution of the video rendering device to the total video latency information and the current video latency information of the video rendering device is available to the source device but some device-individual current video latency information is unavailable to the source device. Alternatively or additionally, the source device is configured to determine the information about the latency of the video path using the total video rendering information if the total video rendering information is available to the source device but the current video latency information of the video rendering device is unavailable to the source device. Alternatively or additionally, the source device may be configured to determine the information about the latency of the video path using, for example, any known or estimated video latency information of devices in the video path available otherwise. Thus, the source device determines the information about the latency of the video path in dependence of an availability of contributions to the information about the latency of the video path, e.g. contributions from the plurality of devices in the video path. Therefore, the source device may still adjust the time alignment in cases in which one or more of the devices in the video path are unable or fail to provide a contribution to the information about the latency of the video path, e.g. because some of the devices are incompatible to a communication protocol or do not comprise an information about their latency. As the source device may have several options to determine the information about the latency of the video path, it may be able to choose the most accurate way to determine the information about the latency of the video path. In other words, the source device may adjust the time alignment in combination of devices that support or do not support a direct communication with the source device, e.g. via CEC DaNoL.

In other words, the source device may use a graceful degradation in that the time alignment may be gradually reduced in accuracy but may still be adjusted, if some information about the latency of the video path is unavailable.

According to an embodiment, the source device is configured to determine, e.g. selectively determine, the information about the latency of the audio path using a summation of device-individual (audio) passthrough latency information associated with a passthrough of audio information for the second audio mode, e.g. MPEG-H, e.g. $AL_{MPEG-H\ passthrough}$, if device-individual passthrough latency information is available for all devices, e.g. in the audio path, between the source device and the audio playback device. Alternatively or additionally, the source device is configured to determine the information about the latency of the audio path using a total audio latency information, for example, an EDID audio latency, e.g. $AL_{EDIDsource}$, describing a total latency of an audio path for a first audio mode, for example, for a legacy audio mode or for a non-MPEG-H audio mode or for a low-delay audio mode or describing an average total latency of the audio path over a plurality of audio modes, for example, by receiving a message representing the total audio latency information. Optionally, the total audio latency information may comprise a correction of an audio latency of the source device. Alternatively or additionally, the source device is configured to determine the information about the latency of the audio path using a summation of any known or estimated audio latency information of devices in an audio path between the source device and the audio playback device. The first audio mode may be a reference audio mode. The second audio mode may be an audio mode to be used by the source device and by the audio playback device. For example the second audio mode may be MPEG-H audio mode and the first audio mode is may be a low latency audio mode having a latency which is smaller than a latency of the second audio mode. Thus, the source device determines the information about the latency of the audio path in dependence of an availability of contributions to the information about the latency of the audio path, e.g. contributions from the plurality of devices in the audio path. Therefore, the source device may still adjust the time alignment in cases in which one or more of the devices in the audio path are unable or fail to provide a contribution to the information about the latency of the audio path, e.g. because some of the devices are incompatible to a communication protocol or do not comprise an information about their latency. As the source device may have several options to determine the information about the latency of the audio path, it may be able to choose the most accurate way to determine the information about the latency of the audio path. In other words, the source device may use a graceful degradation in that the time alignment may be gradually reduced in accuracy but may still be adjusted, if some information about the latency of the audio path is unavailable. In other words, the source device may adjust the time alignment in combination of devices that support or do not support a direct communication with the source device, e.g. via CEC DaNoL.

According to an embodiment, the source device is configured to correct an information, e.g. $AL_{pathEDID}$, about the latency of the audio path obtained using the total audio latency information, e.g. $AL_{EDID\ source}$, using latency information associated with a playback using the first audio mode, e.g. $AL_{none\ MPEG-H}$, and using latency information about a latency associated with a passthrough of audio information for the second audio mode, e.g. $AL_{MPEG-H\ passthrough}$. As the source device is configured to correct an information about the latency of the audio path, it may achieve lipsync in cases in which the audio path comprises a device which fails to communicate a contribution to the information about a latency of the audio path directly to the source device, e.g. via CEC. For example, the source device may be able to discover the latency of the audio path, i.e. the path between the source device and an audio sink device or playback device, if the audio sink is configured to directly communicate with the source device, e.g. via CEC, e.g. CEC DaNoL, and if all devices in the audio path between the source device and the sink device support EDID.

According to an embodiment, the source device is configured to select a determination rule for a determination of the information about the latency of the video (or audio) path in dependence on an amount of information available to the source device, for example, in dependence of an availability of device-individual passthrough latency information for all devices, e.g. devices in the audio path, between the source device and the audio playback device, and/or in dependence on an availability of a total audio latency information, for example, an EDID audio latency, e.g. $AL_{EDIDsource}$, describing a total latency of an audio path for a first audio mode, for example, for a legacy audio mode or for a non-MPEG-H audio mode or for a low-delay audio mode, or describing an average total latency of the audio path over a plurality of audio modes. By selecting a determination rule in dependence of an amount of information available to the source device, the source device may be able to improve or optimize the accuracy of the information about the latency of the video path.

In other words, the source device may be configured to define priorities for each (or some) obtained information and uses only (or primarily) the most reliable ones, but the adjustment of the time alignment may work up to the level of estimated values.

According to an embodiment, the source device is configured to determine a delay to be applied in the provision of audio data and/or a delay to be applied in the provision of the video data, for example to thereby adjust the time alignment, in dependence on the information about the latency of the video path and in dependence on the information about the latency of the audio path. By determining a delay to be applied in the provision of audio data and/or in the provision of the video data, the time alignment may be adjusted very efficiently.

In other words, the source device may, for example, be configured to adjust a audio latency and a video latency independently for every (or at least multiple) audio codecs and even for sub flavors of audio codecs.

According to an embodiment, the source device is configured to also allow for an adjustment of the time alignment using a user interface, for example, using a slider. By allowing a user to adjust the time alignment, lipsync may be achieved manually, even if an amount of information about the latency of the video path and the audio path available to the source device is insufficient or inaccurate or a part or the information about the latency of the video path and the audio path is erroneous.

According to an embodiment, the source device is configured to communicate with the audio playback device and/or the video rendering device and/or one or more devices, e.g. devices in a signal path, e.g. the audio path, between the source device and the audio playback device and/or one or more devices, e.g. in a signal path, e.g. the video path, between the source device and the video rendering device using an additional link, which is separate from the one or more digital media interfaces, e.g. WLAN or Ethernet or Bluetooth or another network connection, to obtain latency information from the one or more devices. By communicating via the additional link, a synchronization of video playback and audio playback may be improved disregarding of a capability of the audio playback device and/or the video rendering device and/or the one or more devices to communicate a latency information via the one or more digital media interfaces.

According to an embodiment, the source device is configured to perform a CEC Discovery and/or a Negotiation of Latencies as described in the Chapter D.1. "CEC Discovery and Negotiation of Latencies (CEC DaNoL)"

According to an embodiment, the source device, e.g. as described before, is configured to perform one or more functionalities or steps as described in the Chapter C.1. "MPEG_H Adjust Source Delay Algorithm (MASDA)"

A further embodiment according to the invention provides a sink device, for example, an audio playback device, wherein the sink device is configured to receive audio data via a digital media interface, e.g. a HDMI interface or "high definition multimedia interface" of version 1.4 or of a down-compatible version, wherein the sink device is configured to decode the received audio data, to obtain decoded audio data, and wherein the sink device is configured to output the decoded output data, e.g. using one or more loudspeakers, or using an analog interface, like an analog audio port or a headphone jack. The sink device is further configured to report a device-individual latency information which comprises latency information associated with a playback using the first audio mode, for example, a low latency playback mode or a playback mode using a first input data format, e.g. $AL_{none\ MPEG-H}$, and latency information associated with a playback using a second audio mode, for example, a high latency playback mode or a playback mode using a second input data format, $AL_{MPEG-H}$, in response to a request from a source device, for example, using an HDMI CEC message, for example, using a <Latency Info> message, which is output by the sink device in response to a <Request Latency Info> message received from the source device. In an alternative and optional example, the sink device is configured to report device-individual latency information using a <Latency Info> which is output by the sink device in response to a <Request Latency Info> message received from the source device, for example, for reporting latency information associated with the second audio mode, and the sink device is configured to report device-individual latency information using a <EDID Latency Info> message which is output by the sink device in response to a <Request EDID Latency Info> message received from the source device, for example, for reporting latency information associated with the first audio mode. As the sink device is configured to report a latency information, a latency of the sink device may be considered by a device receiving the latency information, for example a source device, so that the output of the decoded output data by the sink device may be adjusted to be more synchronous to a playback of video data belonging to the audio data, e.g. by a sink device or playback device. By reporting latency information (e.g. device-individual latency information) for a plurality of different playback modes, the sink device may, for example, enable a source device to select an appropriate playback mode (e.g. a playback mode which fits a delay of a video playback device), and/or enable the source device to correct a total (audio and/or video) latency information based on a device-individual latency information.

According to an embodiment, the sink device is configured to negotiate a decoding latency or a playback latency associated with the second audio mode with a source device. By negotiating the decoding latency, the decoding latency may be adjusted to short, e.g. as short as possible to achieve lipsync between the output of the decoded audio data and a playback of related video data.

According to an embodiment, the sink device is configured to provide a latency span information describing a span of possible decoding latency values or playback latency values to the source device, for example via the digital media interface, for example, using a <reporting latency span> message or a <Report Latency Span> message. Alternatively, the sink device is configured to provide a latency list information describing one or more possible decoding latency values or playback latency values to the source device, for example using a <Report Possible Latency Values> message. For example, the sink device may be configured to provide the latency span information or the latency list information in response to receiving a <Request Latency Info> message from the source device. The sink device is further configured to receive a latency selection message, for example, a <Set Latency> message using a HDMI CEC mechanism, from the source device and to set a decoding latency or playback latency in response to the latency selection message. The sink device being capable of providing the latency span information or the latency list information ensures an efficient negotiation of a decoding latency.

According to an embodiment, the sink device is configured to provide a contribution to a total audio latency information, for example, an EDID audio latency, e.g. $AL_{EDIDsource}$, describing a total latency of an audio path for a first audio mode, for example, for a legacy audio mode or for a non-MPEG-H audio mode or for a low-delay audio mode, or describing an average total latency of the audio path over a plurality of audio modes, for example, by receiving a message representing the total audio latency information, wherein the contribution to the total audio latency information is different from the latency information associated with a playback using a second audio mode. For example, the sink device may be configured to add its contribution to the total audio latency to a latency value received in an ingoing message, to obtain an increased latency value, and to forward a message with the increased latency value. By providing a contribution to the total latency information, the sink device may ensure a consideration of its latency in a synchronization of the output of the decoded audio data and a playback of related video data, in particular if the sink device receives the audio data from a source device incompatible to communicate with the sink device directly, e.g. via CEC or CEC DaNoL, thus ensuring compatibility of the sink device.

According to an embodiment, the contribution to a total audio latency information provided by the sink device is equal to the latency information associated with a playback using the first audio mode.

According to an embodiment, the sink device is configured to perform one or more of the functionalities or steps described in the Chapter D.1. "CEC Discovery and Negotiation of Latencies (CEC DaNoL)".

The sink device relies on the same ideas as the source device described above. For example, the sink device may be used in combination with the source device. Thus, the sink device may be combined with any features concerning a sink device or a playback device described in the context of the source device. Further, the above explained advantages of the source device equally apply to the sink device, in particular when using the sink device in combination with the source device described above.

A further embodiment according to the invention provides a sink device, for example a video playback device, wherein the sink device is configured to receive video data via a digital media interface, e.g. a HDMI interface or "high definition multimedia interface" of version 1.4 or of a down-compatible version, wherein the sink device is configured to render the received video data. The sink device is further configured to report a device-individual latency information which comprises (e.g. static, predefined) latency information representing a contribution, e.g. $VL_{EDID}$, to a total video latency information, for example an EDID video latency, e.g. $VL_{EDIDsource}$, describing a total latency of a video path or describing an average total latency of the video path over a plurality of video modes, for example, by providing a message representing the total video latency information. The device-individual latency information further comprises latency information representing an actual latency of a rendering of video data. As the sink device is configured to report a device-individual latency, a latency of the sink device may be considered by a device receiving the device-individual latency, for example a source device, so that a playback of the video data rendered by the sink device and may be adjusted to be more synchronous to a playback of audio data belonging to the video data, e.g. by a sink device or playback device.

According to an embodiment, the sink device is configured to provide a contribution of the sink device to a total video latency information, for example, an EDID video latency, e.g. $VL_{EDIDsource}$, describing a total latency of a video path or describing an average total latency of the video path over a plurality of video modes, for example, by providing a message representing the total video latency information, wherein the contribution to the total audio (or video) latency information is different from the latency information representing the actual latency of a rendering of video data. For example, the sink device may be configured to add its contribution to the total video latency to a latency value received in an ingoing message, to obtain an increased latency value, and to forward a message with the increased latency value. For example, the sink device may be configured to initiate a new chain for sending the total video latency information, e.g. by sending a message comprising its contribution to the total video latency information. For example, the sink device may be configured to provide its contribution to the total video latency information to a source device in a direct communication, e.g. via CEC. By providing the contribution to the total video latency information, the sink device may enable a source device to improve a synchronization of a playback of the video data rendered by the sink device and a playback of audio data.

According to an embodiment, the device-individual latency information reported by the sink device also comprises latency information associated with an audio playback using a first audio mode, e.g. a low latency audio mode, $AL_{none\ MPEG-H}$. Additionally or alternatively, the device-individual latency information reported by the sink device also comprises average latency information associated with an audio playback using a plurality of different modes, e.g. $AL_{none\ MPEG-H}$. Additionally or alternatively, the device-individual latency information reported by the sink device also comprises latency information associated with a passthrough of audio information for the second audio mode e.g. $AL_{MPEG-H\ passthrough}$. By providing a plurality of device-individual latency information the sink device may enable a source device to improve a synchronization of a playback of the video data rendered by the sink device and a playback of audio data.

According to an embodiment, the sink device is configured to provide a contribution to a total audio latency information, for example, an EDID audio latency, e.g. $AL_{EDIDsource}$ describing a total latency of an audio path for a first audio mode, for example, for a legacy audio mode or for a non-MPEG-H audio mode or for a low-delay audio mode or describing an average total latency of the audio path over a plurality of audio modes, for example, by receiving a message representing the total audio latency information, wherein the contribution to the total audio latency information is different from the latency information associated with a passthrough of audio information for the second audio mode. By providing the contribution to the total audio latency information, the sink device may enable a source device to improve a synchronization of a playback of the video data rendered by the sink device and a playback of audio data.

According to an embodiment, the sink device is configured to provide the device-individual latency information such that the device-individual latency information reported by the sink device comprises a latency information associated with a forwarding of audio data from a first digital media interface to a second digital media interface, wherein, for example, the second digital media interface may be of the same type like the first digital media interface, or wherein, for example, the first digital media interface and the second digital media interface may be of different types, or wherein, for example, the first digital media interface and the second digital media interface may use different protocols, or wherein the first digital media interface is an HDMI port and the second digital media interface is an S/PDIF interface. By providing the latency information associated with a forwarding of audio data from a first digital media interface to a second digital media interface, the sink device may enable a source device to improve a synchronization of a playback of the video data rendered by the sink device and a playback of audio data in case an audio playback device is connected (directly or indirectly) to the sink device, so that the sink device may, for example, function as a splitter of a signal describing the audio data and a signal describing the video data.

According to an embodiment, the sink device is configured to perform one or more of the functionalities or steps described in the Chapter D.1. "CEC Discovery and Negotiation of Latencies (CEC DaNoL)".

A further embodiment according to the invention provides a method for providing audio data and video data on one or more digital media interfaces, for example HDMI ports, for example according to specification HDMI 1.4 or later, wherein the method comprises automatically adjusting a time alignment between a provision of audio data, for example, in the form of an audio stream, and a provision of video data, for example, in the form of a video stream, based on an information about a latency of an audio path, for example from the provision of the audio data by the source device until a provision of audible audio information, and based on an information about a latency of a video path, for example from the provision of audio data by the source device until a provision of visible video data.

A further embodiment according to the invention provides a method for operating a sink device, e.g an audio playback device, wherein the method comprises receiving audio data via a digital media interface, e.g. a HDMI interface or "high definition multimedia interface" of version 1.4 or of a down-compatible version, wherein the method comprises decoding the received audio data, to obtain decoded audio data, and wherein the method comprises outputting the decoded output data, e.g. using one or more loudspeakers, or using an analog interface, like an analog audio port or a headphone jack. The method further comprises reporting a device-individual latency information which comprises latency information associated with a playback using the first audio mode, for example, a low latency playback mode or a playback mode using a first input data format, e.g. $AL_{none\ MPEG-H}$, and latency information associated with a playback using a second audio mode, for example, a high latency playback mode or a playback mode using a second input data format, $AL_{MPEG-H}$, in response to a request from a source device, for example, using an HDMI CEC message, for example, using a <Latency Info> message, which is output by the sink device in response to a <Request Latency Info> message received from the source device.

A further embodiment according to the invention provides a method for operating a sink device, for example, a video playback device, wherein the method comprises receiving video data via a digital media interface, e.g. a HDMI interface or "high definition multimedia interface" of version 1.4 or of a down-compatible version, wherein the method comprises rendering the received video data; wherein the method comprises reporting a device-individual latency information which comprises (e.g. static, predefined) latency information representing a contribution, e.g. $VL_{EDID}$, to a total video latency information, for example, an EDID video latency, e.g. $VL_{EDIDsource}$. The device-individual latency information further comprises describing a total latency of a video path or describing an average total latency of the video path over a plurality of video modes, for example, by providing a message representing the total video latency information; The device-individual latency information further comprises latency information representing an actual latency of a rendering of video data.

The described methods rely on the same ideas as the devices described above, providing equal or equivalent functionalities and advantages. The methods may optionally be combined with (or supplemented by) any of the features, functionalities and details described herein with respect to the corresponding device, i.e. the source device or the sink devices. The methods may optionally be combined with the mentioned features, functionalities and details both individually or in any combination of them.

A further embodiment according to the invention provides a computer program for performing at least one of the methods described above when the computer program runs on a computer.

BRIEF DESCRIPTION OF THE DRAWINGS

In the following, embodiments of the present disclosure are described in more detail with reference to the figures, in which:

FIG. 5A-1 show schematic representations of various arrangements of source devices, audio playback devices and video rendering devices according to embodiments;

FIG. 10 shows a block diagram of a method for providing audio data and video data according to an embodiment;

FIG. 11 shows a block diagram of a method for operating a sink device, e.g. an audio playback device, according to an embodiment.

Tab. 1 lists values for a communication for a latency negotiation according to an embodiment;

Tab. 2 lists messages for a discovery of latencies and a latency negotiation according to an embodiment;

Tab. 3 lists messages for a discovery of latencies and a latency negotiation according to an optional embodiment; and Tab. 4 lists values for a communication for a latency negotiation according to an optional embodiment.

DETAILED DESCRIPTION OF THE INVENTION

In the following, different inventive embodiments and aspects will be described. Some embodiments are described with reference to the figures. Further embodiments are described in the chapters D.1 "CEC Discovery and Negotiation of Latencies (CEC DaNoL)" and C.1 "MPEG-H Adjust Source Delay Algorithm (MASDA)". Also, further embodiments will be defined by the enclosed claims.

It should be noted that any embodiments as defined by the claims can be supplemented by any of the details (features and functionalities) described herein. Also, the embodiments described herein can be used individually, and can also optionally be supplemented by any of the details (features and functionalities) included in the claims. Also, it should be noted that individual aspects described herein can be used individually or in combination. Thus, details can be added to each of said individual aspects without adding details to another one of said aspects. It should also be noted that the present disclosure describes explicitly or implicitly features usable in an audio and/or video devices. Thus, any of the features described herein can be used in the context of an audio and/or video device.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

The invention will be understood more fully from the detailed description given below and from the accompanying drawings of embodiments of the invention, which, however, should not be taken to limit the invention to the specific embodiments described, but are for explanation and understanding only.

In the following, the first digit of a three-digit reference corresponds to the number of the figure, to which the reference refers.

Figure 1:
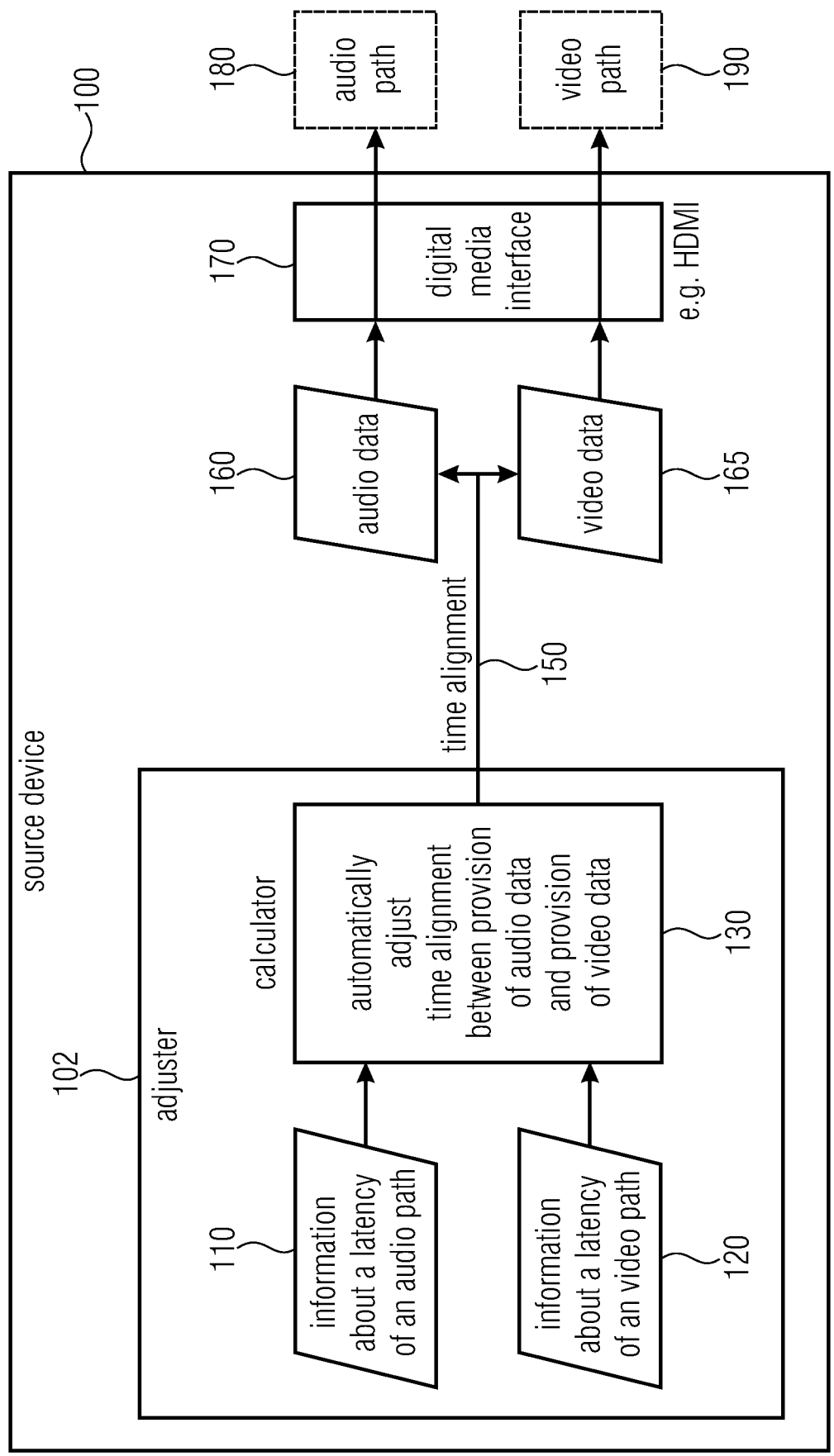
FIG. 1 shows a schematic representation of a source device according to an embodiment.

A) Source Device According to FIG. 1.

FIG. 1 shows a schematic representation of a source device 100 for providing audio data 160 and video data 165 on one or more digital media interfaces 170. The source device 100 is configured to automatically adjust a time alignment 150 between a provision of audio data 160 and a provision of video data 165 based on an information 110 about a latency of an audio path 180 and based on an information 120 about a latency of a video path 190.

For example, the audio path 180 is connected to a first one of the one or more digital media interfaces 170 and the video path 190 is connected to a second one of the one or more digital media interfaces 170 or is connected also to the first one of the one or more digital media interfaces 170. That is, the audio path 180 and the video path 190 may be separate or may overlap at least partially.

The audio path 180 may be a signal path of a signal representing the audio data 160 as provided at one of the one or more digital media interfaces throughout the one of the one or more digital media interfaces to a conversion of the signal into an audible signal or an acoustic signal. The audio path comprises a latency which may be a time span from a provision of a signal at one of the one or more digital media interfaces until the output of an audible signal or an acoustic signal, for example by a device in the audio path 180. That is, the latency of the audio path may be a time span, a signal needs to complete the audio path 180.

The video path 190 may be a signal path of a signal representing the video data 165 as provided at one of the one or more digital media interfaces throughout the one of the one or more digital media interfaces to a conversion of the signal into a visible signal. The video path comprises a latency which may be a time span from a provision of a signal at the one of the one or more digital media interfaces until the output of a visible signal, for example by a device in the video path 190. That is, the latency of the video path may be a time span, a signal needs to complete the video path 190.

The source device 100 comprises an adjuster 102 configured to obtain the information 110 about the latency of the audio path 180 and the information 120 about the latency of the video path 190. The adjuster 102 is configured to automatically obtain the time alignment 150. The adjuster 102 comprises a calculator 130 configured to adjust or to calculate the time alignment 130 based on the information 110 about the latency of the audio path 180 and the information 120 about the latency of the video path 190.

It is pointed out that the source device 100 according to FIG. 1 may optionally be complemented by all features, functionalities and details that are described herein with respect to the other source devices. The respective features, functionalities and details may optionally be added to the source device 100 both individually or in any combination of them.

Figure 2:
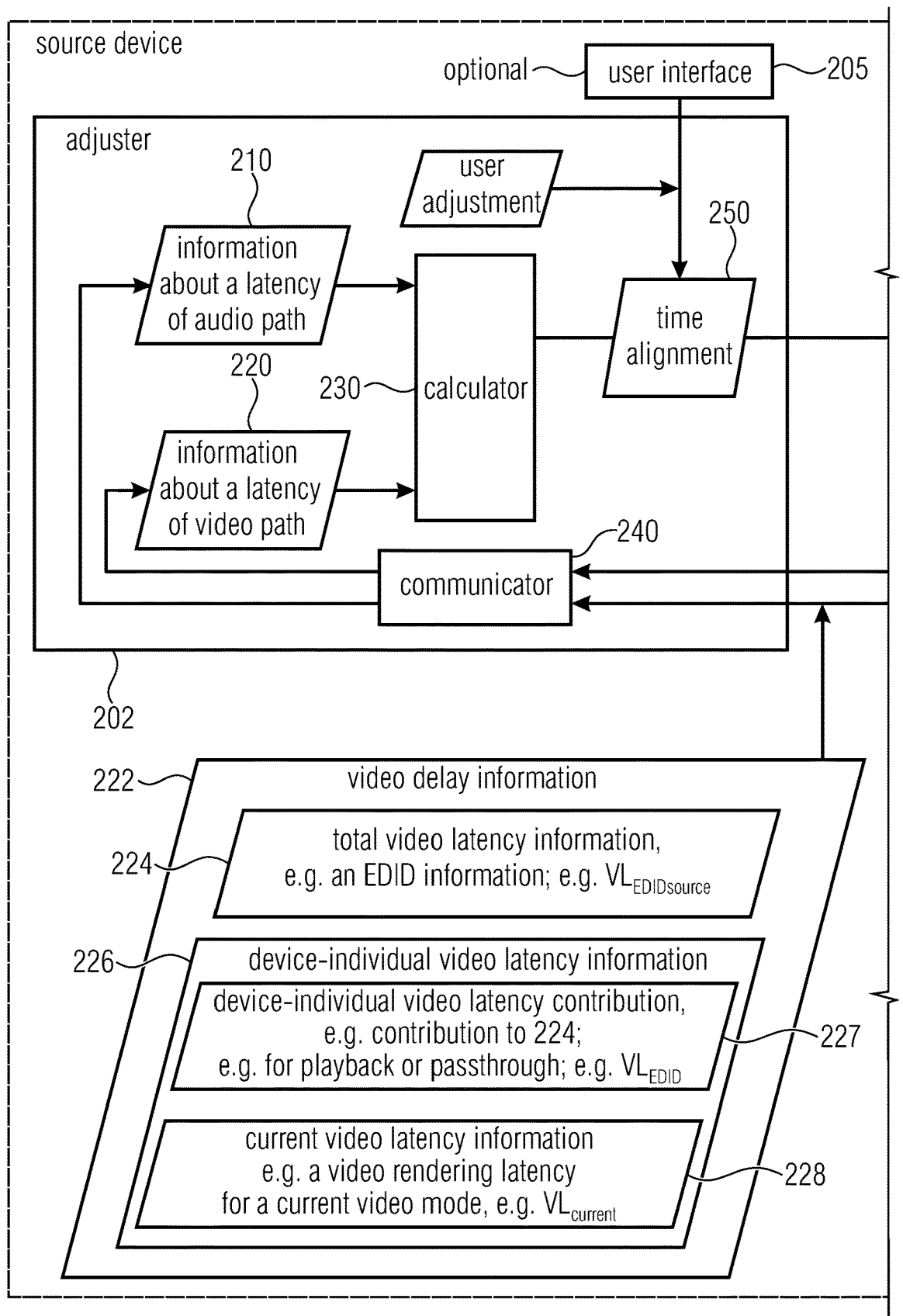
FIG. 2 shows a schematic representation of a source device according to a further embodiment.
Figure 2:
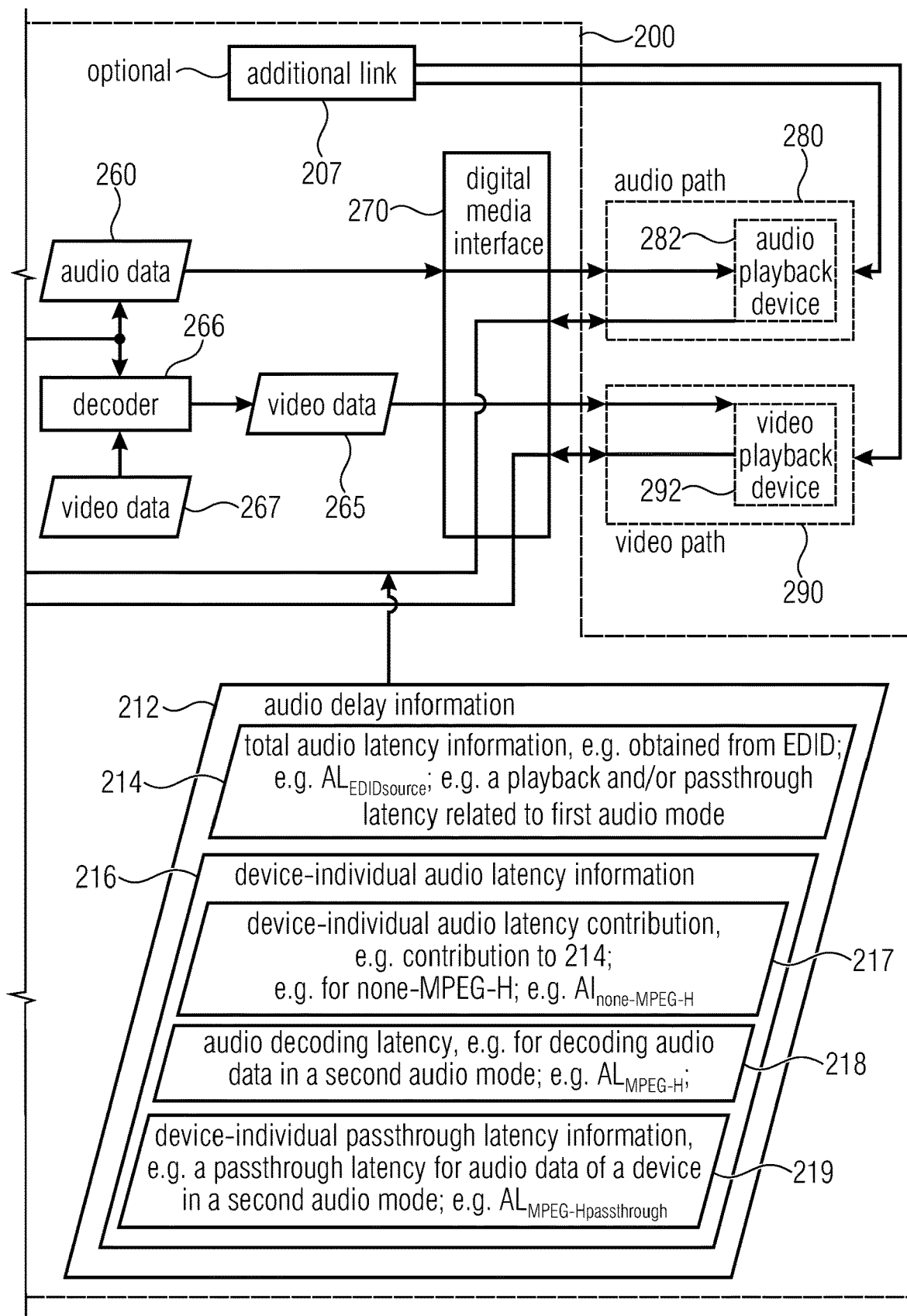

B) Source Device According to FIG. 2

FIG. 2 shows a schematic representation of a source device 200 according to an embodiment. The source device 200 may, for example, correspond to the source device 100.

The source device 200 is configured to provide audio data 260 to an audio path 280, for example in an encoded representation of the audio data 260. The audio path 280 may correspond to the audio path 180.

The audio path 280 comprises an audio playback device 282, for example an audio sink device or an audio decoding device, which is configured to replay the audio data 260, that is, to provide an audible audio information based on the audio data 260. For example, the audio playback device 282 is configured to decode the audio data 260.

The audio playback device 282 is configured to operate, for example, in a first audio mode or in a second audio mode. The first audio mode may be related to a type of decoding audio data or to a type of replaying audio data, for example a legacy mode or a none-MPEG-H mode. A MPEG-H mode may refer to a decoding of audio data according to the MPEG-H codec. The second audio mode may be related to a high quality audio mode or to a time-consuming type of decoding audio data. For example, the second audio mode may refer to types of decoding that comprise a decoding latency of more than 20 ms, or to the MPEG-H mode.

The audio path 280 may optionally comprise further devices, for example a video playback device or a connecting device or a repeater or an inactive audio and/or video device. A further device may be configured to pass through the audio data 260. A further device may be configured to operate or to support the first audio mode and/or the second audio mode.

The source device 200 is configured to provide video data 265 to a video path 290, for example in a decoded representation of the video data 265. The video path 290 may correspond to the video path 190.

The video path 290 comprises a video playback device 292, for example a video sink device or a video rendering device, which is configured to replay the video data 265, that is, to provide a visible video information based on the video data 265.

The video playback device 292 may be configured to render the video data 265, for example using a first or a second video mode, for example a gaming mode or a movie mode. The video playback device 292 may be part of the audio path 280.

The video path 290 may optionally comprise further devices, for example an audio playback device or a connecting device or a repeater or an inactive audio and/or video device, for example the audio device 282. A further device may be configured to pass through the video data 265.

The source device 200 comprises an adjuster 202 which is configured to automatically adjust a time alignment 250 which may correspond to the time alignment 150. The adjuster 202 comprises a calculator 230 which is configured to calculate the time alignment 250 based on an information 210 about the latency of the audio path 280 and based on an information 220 about the latency of the video path 290.

The information 210 about the latency of the audio path may comprise information about a latency of a path between the source device 200 and the audio playback device 282 and a decoding latency of the audio playback device 282.

The source device 200 comprises a decoder 266. The decoder 266 is configured to decode an encoded representation 267 of video data to obtain the video data 265 in a decoded video representation. The source device 200 is configured to provide the decoded video representation of the video data 265 on the one or more digital media interfaces 270.

The source device 200 may be configured to delay the provision of the audio data 260 based on the time alignment 250. For example, the source device 200 may be configured to delay the provision of the audio data 260 if the latency of the video path 290 is larger than the latency of the audio path 280. The source device 200 may be configured to delay the decoding of the video data 267, if the latency of the audio path 280 is larger than the latency of the video path 290.

In other words, the source device 200 is configured to obtain an encoded video representation 267. The source device 200 is further configured to decode the encoded video representation 267, to obtain a decoded video representation. The source device 200 is configured to provide the video data 265, such that the video data 265 represent the decoded video representation. The source device 200 is further configured to selectively delay the decoding of the encoded video representation based on the information 210 about the latency of the audio path 280 and the information 220 about the latency of the video path 290.

In other words, the source device 200 is configured to delay the decoding of the video data 267 by the decoder 266 based on the time alignment 250.

The source device 200 is configured to obtain the information 210 about the latency of the audio path 280 using an audio delay information 212 which is obtained from an audio playback device via one of the one or more digital interfaces 270. For example, the source device 200 obtains the audio delay information 212 from a device in the audio path 280. Additionally or alternatively, the source device 200 is configured to obtain the information 220 about the latency of the video path 290 using a video delay information 222 which is obtained from a video rendering device via one of the one or more digital interfaces 270. For example, the source device 200 is configured to obtain the video delay information 222 from a device in the video path 290.

The audio delay information 212 may comprise a total audio latency information 214. The total audio latency information 214 may comprise a sum of audio latencies of devices along at least a part of the audio path 280. The total audio latency information 214 may comprise latencies referring to the first audio mode. For example, the total audio latency information 214 may comprise latencies associated to or referring to a passthrough latency or a playback latency or a decoding latency for a first audio mode. The total audio latency information 214 may, for example, be an audio latency reported in an EDID information, for example $AL_{EDIDsource}$ The audio delay information 212 may further comprise device-individual audio latency information 216. For example, the device-individual audio latency information 216 may comprise a device-individual audio latency contribution 217, which may be a contribution of a device to the total audio latency information 214. The device-individual audio latency contribution 217 may, for example, be a latency associated with a playback of audio data, for example in a first audio mode, for example in a none-MPEG-H mode, for example $AL_{none-MPEG-H}$. The device-individual audio latency contribution 217 may also refer to a latency associated with a pass through of audio data by a device. A latency associated with a pass through may, for example, be a time span between an input of a signal to a device until an output of the signal from the device, wherein the signal may remain unchanged.

The device-individual audio latency information 216 may also comprise an audio decoding information 218 which may be an information concerning a latency associated with a playback of audio data, for example a decoding and/or an output of audible audio data, in a second audio mode, for example the MPEG-H mode. The audio decoding information 218 may be referred to as $AL_{MPEG-H}$.

The device-individual audio latency information 216 may further comprise a device-individual passthrough latency information 219 which may refer to an information about a latency associated with a pass through of audio data in a second audio mode, for example for providing audio data for another device in the audio path, the other device operating in the second audio mode. For example, the device-individual passthrough latency information 219 may refer to $AL_{MPEG-H\ passthrough}$.

The video delay information 222 may comprise a total video latency information 224. The total video latency information 224 may comprise a sum of device-individual video latencies, for example a sum of video latencies of devices within the video path 290. The total video latency information 224 may, for example, be reported in an EDID information. The total video latency information 224 may be referred to as $VL_{EDIDsource}$.

The video delay information 222 may further comprise a device-individual video latency information 226. The device-individual video latency information 226 may comprise a device-individual video latency contribution 227, for example a device-individual contribution of a device in the video path 290 to the total video latency information 222. The device-individual video latency contribution 227 may comprise an information about a latency associated with a playback of video data or a pass through of video data, for example a playback latency or a pass through latency. The device-individual video latency contribution 227 may be referred to as $VL_{EDID}$.

The device-individual video latency information 226 may further comprise a current video latency information 228. The current video latency information 228 may comprise an information about a latency associated with a playback or a rendering of video data, for example a time span between an input of a signal, for example the signal representing video data, to a device, for example a video playback device, and an output of the signal as a visible signal by the device.

In other words, the source device 200 is configured to obtain a total audio latency information 214 describing a total latency of an audio path 280 for a first audio mode. Additionally or alternatively, the source device 200 may be configured to obtain a total video latency information 224 describing a total latency of the video path 290 for a first video mode or a video mode.

The adjuster 202 may comprise a communicator 240 which may be configured to receive the video delay information 222 and the audio delay information 212.

The communicator 240 is configured to communicate, with the audio playback device 282 and/or the video rendering device 292 or another device in the video and/or the audio path via the digital media interface 270. That is, the source device 400 is configured to send a message to and receive a message from the audio playback device 282 and/or the video rendering device 292 or another device in the video and/or the audio path.

For example, a communication between the source device 400 and the audio playback device 482 may be specified by a communication protocol, for example by the communication protocol CEC ("Consumer Electronics Control") which is described, for example, in HDMI 1.4b-CEC.

For example, a communication between the source device 400 and the audio playback device 482 may be performed as described in the chapter D.1 and/or according to the messages and rules as described in Tab. 2, or alternatively and optionally in Tab. 3.

For example, the source device 400 may be configured to transmit one or more of the messages shown in Tab. 2, or alternatively and optionally in Tab. 3, to one or more sink devices (e.g. using an individual direct addressing of a sink device, or a broadcast) and (if applicable) to receive a respective answer message from one or more sink devices (e.g. in a chain of sink devices), and to use an information included in the respective answer message (e.g. for adjusting the time alignment).

Alternatively, for example, the source device 400 may be configured to receive one or more of the messages shown in Tab 2, or alternatively and optionally in Tab. 3, from one or more sink devices and (if applicable) to transmit (e.g. using an individual direct addressing of a sink device, or a broadcast) a respective answer message to one or more sink devices (e.g. in a chain of sink devices) including an information regarding a device-individual latency.

The communicator 240 may further be configured to request the device-individual audio latency information 216 and/or the device-individual video latency information 226. Thus, the communicator 240 is configured to communicate to devices within the audio path 280 and/or the video path 290. For example, the communicator 240 may request a device to communicate its device-individual audio latency information 216 and/or its device-individual video latency information 226.

In other words, the source device 200 is configured to query a plurality of individual devices for their device-individual latency information, that is for their device-individual audio latency information 216 and/or their device-individual video latency information 226.

The communicator 240 may further be configured to negotiate the device-individual audio playback latency 280 with an audio playback device, for example an audio playback device operating in the second audio mode, for example an MPEG-H mode.

The source device 200 may optionally comprise a user interface 205. The user interface 205 is configured to receive a user adjustment 206. The user interface 205 is further configured to adjust the time alignment 250 according to the user adjustment 206. The user interface 205 may be configured to receive a signal comprising the user adjustment 206. Alternatively or additionally, the user interface 205 may allow the user to interact directly with the source device 200.

In case one or more devices in the audio path 280 and/or the video path 290 are incompatible for communication with the source device 200 or fail to communicate or fail to communicate a correct information about their latency the adjuster 202 may adjust the time alignment 250 insufficiently. The user interface 205 provides a mean to a user to adjust the time alignment 250 manually, for example additionally to the automatic adjustment of the time alignment 250 by the adjuster 202.

In other words, the source device 200 is configured to also allow for an adjustment 206 of the time alignment 250 using a user interface 205.

The source device may optionally comprise an additional link 207, for example a communication interface configured to exchange data or to communicate with a device. The additional link 207 is configured to communicate with a device in the audio path 280 and/or the video path 290, for example the audio playback device 282, the video rendering device 290 or another device. The additional link 207 may, for example, communicate via WLAN, Ethernet, Bluetooth or another wired or wireless connection. The source device 200 may be configured request and/or receive and/or negotiate latency information, for example, the audio delay information 212 and/or video delay information 222, via the additional link 207. The source device 200 is configured to obtain latency information from the audio playback device 282 and/or the video rendering device 292 and/or the other device. For example, the adjuster 202 may obtain information via the additional link 207 or use the additional link 207 for communication, for example, communication by the communicator 240.

In other words, the source device 200 is configured to communicate with the audio playback device 282 and/or the video rendering device 292 and/or one or more devices between the source device 200 and the audio playback device 282 and/or one or more devices between the source device 200 and the video rendering device 292 using an additional link 207, which is separate from the one or more digital media interfaces 270, to obtain latency information from the one or more devices.

Figure 3:
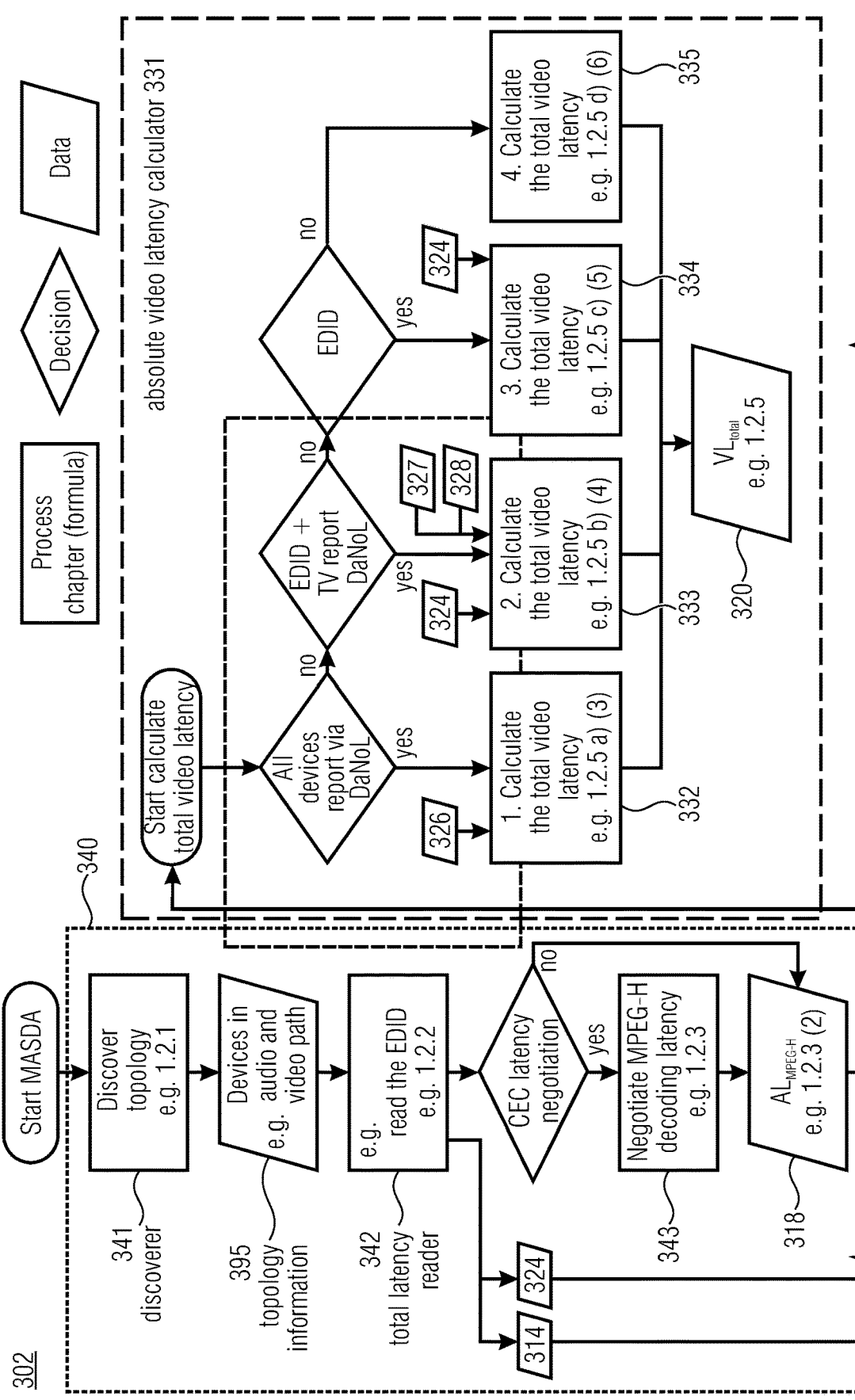
FIG. 3 shows a block diagram of an adjuster for adjusting the time alignment according to an embodiment.
Figure 3:
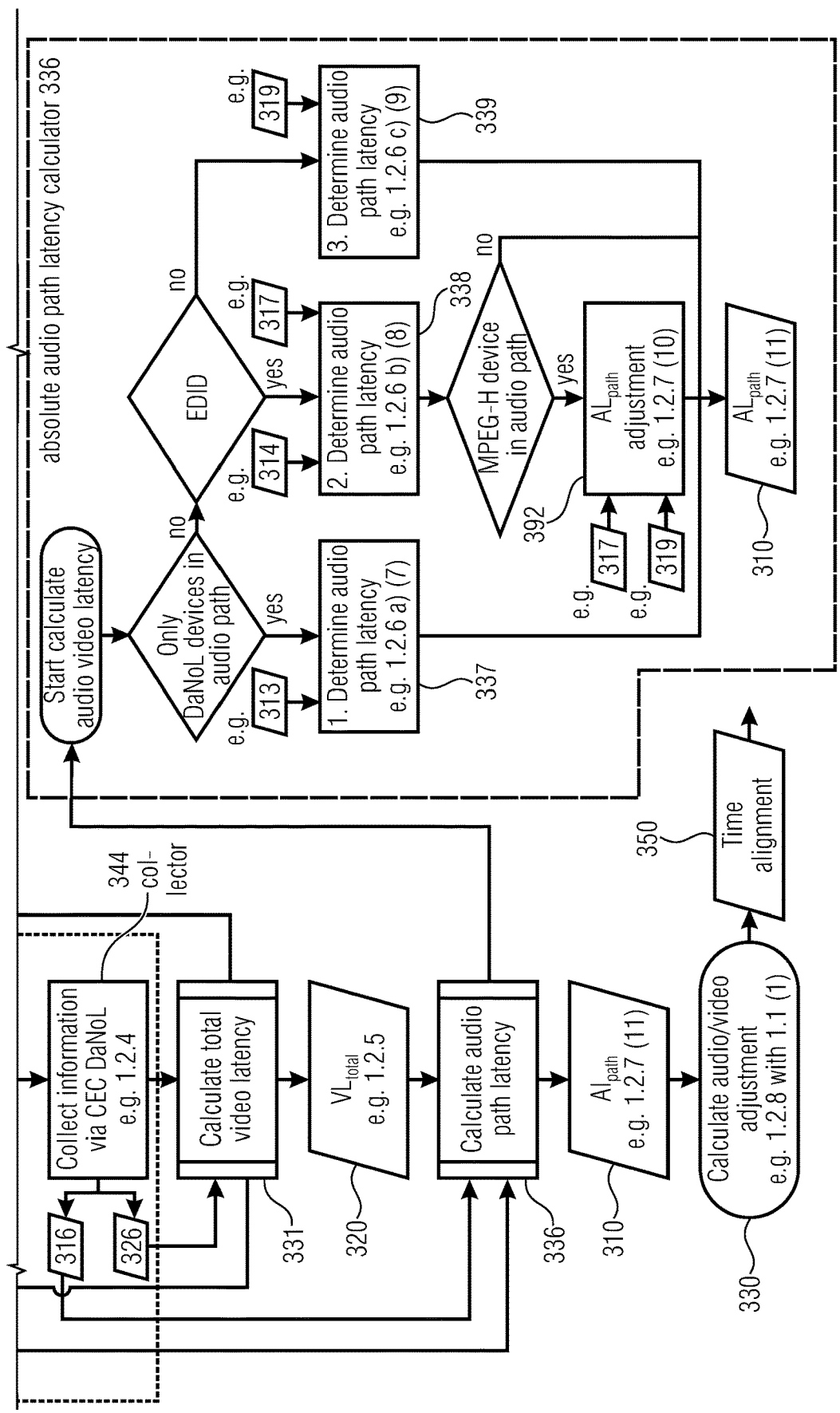

More details about the adjuster 202 are described in the context of the adjuster 302 described in FIG. 3, the features of which may be embodied in the adjuster 302 individually or in combination with each other.

C) Adjuster for Adjusting the Time Alignment According to FIG. 3

FIG. 3 shows a block diagram of an adjuster 302 for adjusting a time alignment 350 according to an embodiment. The adjuster 302 may correspond to the adjuster 102 or the adjuster 202. The time alignment 350 may correspond to the time alignment 150 or the time alignment 250, which may be used for delaying the audio data 160, 260 or the video data 165, 265 as described in sections A and B. FIG. 3 describes the working principle of the adjuster 302 making use of a schematic block diagram.

For adjusting the time alignment 350 between the provision of audio data, for example the audio data 160, 260, and the provision of video data, for example the video data 165, 265, the adjuster 302 comprises a communicator 340, for example the communicator 240, configured to obtain an information 310 about a latency of an audio path, for example, the audio path 180, 280 and to obtain an information 320 about a latency of a video path, for example the video path 190, 290.

The communicator 340 comprises a discoverer 341 configured to obtain a topology information 395, which comprises a topology of the audio path and/or a topology of the video path. Based on the topology information 395, the communicator 340 may request device-individual latency information or may decide how to process audio delay information, e.g. audio delay information 212, and/or video delay information, e.g. the video delay information 222.

For example, the discoverer 341 may be configured to communicate using CEC commands, for example the commands described in the chapter D.1, and/or according to the messages and rules as described in Tab. 2, or alternatively and optionally in Tab. 3.

For example, the discoverer 341 may be configured to transmit one or more of the messages shown in Tab. 2, or alternatively and optionally in Tab. 3, to one or more sink devices (e.g. using an individual direct addressing of a sink device, or a broadcast) and (if applicable) to receive a respective answer message from one or more sink devices (e.g. in a chain of sink devices), and to use an information included in the respective answer message (e.g. for obtaining the topology information 395).

The topology of the audio path may, for example, describe a connection between one of the one or more digital media interfaces, for example the digital media interfaces 170, 270, and an audio playback device for replaying audio data, for example the audio playback device 282. The topology of the audio path may, for example, comprise information about at least a part of the devices within the audio path. For example, the topology of the audio path may comprise a number of devices within the audio path. The topology of the audio path may further comprise information about the devices within the audio path, for example a type of the devices within the audio path and/or characteristics of the devices within the audio path, for example, an information about the capability of the devices to communicate their properties via a digital media interface.

The topology of the video path may, for example, describe a connection between one of the one or more digital media interfaces, for example the digital media interfaces 170, 270, and a video playback device for replaying video data, for example the video playback device 292. The topology of the video path may, for example, comprise information about at least a part of the devices within the video path. For example, the topology of the video path may comprise a number of devices within the video path. The topology of the video path may further comprise information about the devices within the video path, for example a type of the devices within the video path and/or characteristics of the devices within the video path, for example, an information about the capability of the devices to communicate their properties via a digital media interface.

In other words, the source device 300 is configured to discover a topology of a connection between the source device 300 and an audio playback device and also of a connection between the source device 300 and a video rendering device, in order to obtain a topology information 395, and wherein the source device 300 is configured to adjust the time alignment 350 in dependence on the topology information 395.

The communicator 340 further comprises a total latency reader 342 configured to obtain or to receive a total audio latency information 314, for example the total audio latency information 214 and/or a total video latency information 324, for example the total video latency information 224. For example, the total latency reader 342 may be configured to receive the total audio latency information 314 and/or the total video latency information 324 from a device in the audio path and/or the video path, respectively, for example from the device that is closest to the source device within a connection between the source device and an audio playback device and/or a video playback device. For example, the total latency reader 342 may be configured to read an EDID information of a device that is within the audio path and/or in the video path. The EDID information may comprise the total audio latency information 314, for example an EDID audio latency $AL_{EDIDsource}$, and/or the total video latency information 324, for example and EDID video latency $VL_{EDIDsource}$ The communicator further comprises a latency negotiator 343 configured to negotiate a decoding latency, for example an audio decoding latency, with an audio playback device, for example with the audio playback device 282. That is, for example, the latency negotiator 343 may be configured to select a decoding latency to be used by the audio playback device for decoding audio data. wherein the latency negotiator 343 may be configured to select a decoding latency that is compatible with the audio playback device. For example, the latency negotiator 343 may be configured to select the decoding latency based on a current value of the time alignment 350 or based on at least a part of an information 310 about the latency of the audio path and/or at least a part of an information about a latency of the video path 320. As a result of negotiating the decoding latency with the audio playback device, the latency negotiator 343 may obtain or may be aware of a audio decoding latency information 318, for example the audio decoding latency information 218, which may correspond to the negotiated decoding latency of the audio playback device which may, for example, operate in a second audio mode. Details about the negotiator 343 are described in FIG. 4.

The communicator 340 further comprises a collector 344. The collector 344 is configured to collect or to obtain device-individual latency information, for example a device-individual audio latency information 316 (e.g. the device-individual audio latency information 216) and/or a device-individual video latency information 326 (e.g. the device-individual video latency information 316. The device-individual audio latency information 316 may comprise at least one of a device-individual audio latency contribution 317 (e.g. the device-individual audio latency contribution 217), an audio decoding latency 318 (e.g. the audio decoding latency 218), and a device-individual passthrough latency information 319 (e.g. the device-individual passthrough latency information 219). The device-individual video latency information 326 may comprise at least one of a device-individual video latency contribution 327 (e.g. the device-individual video latency contribution 227) and a current video latency information 328 (e.g. the current video latency information 228).

For example, the collector 344 may be configured to communicate using CEC commands, for example the commands described in the chapter D.1, and/or according to the messages and rules as described in Tab. 2, or alternatively and optionally in Tab. 3.

For example, the collector 344 may be configured to transmit one or more of the messages shown in Tab. 2, or alternatively and optionally in Tab. 3, to one or more sink devices (e.g. using an individual direct addressing of a sink device, or a broadcast) and (if applicable) to receive a respective answer message from one or more sink devices (e.g. in a chain of sink devices), and to use an information included in the respective answer message (e.g. for obtaining the device-individual audio latency information 316 and/o the device-individual latency information 326).

For example, the collector 344 is configured to request the device-individual latency information and/or to receive the device-individual latency information. The collector 344 may be configured to communicate with a device in the audio path and/or the video path, for example via a digital media interface, for example the digital media interface 170, 270, via a communication protocol. The communication protocol may, for example, be related to the digital media interface. For example, the communication protocol may be specified for HDMI. For example, the communication protocol may be a consumer electronics control (CEC) protocol.

For example, the collector 344 may be configured to request device-individual latency information from a device which is part of the topology of the audio path and/or part of the topology of the video path contained in the topology information 395. For example, the collector 344 may be configured to send a message to a device described by the topology information 395. The collector 344 may be configured to receive a device-individual latency information from a device upon request.

The adjuster 302 further comprises an absolute video latency calculator 331. The absolute video latency calculator 331 is configured to obtain the information 320 about the latency of the video path based on a video delay information, for example the video delay information 222, which may comprise the total video latency information 324 and/or a device-individual video latency information 326. The absolute video latency calculator 331 is configured to calculate at least a part of the information 320 about the latency of the video path in dependence on the video delay information, that is, in dependence on an amount and a type of information contained in the video delay information.

For example, the video delay information may comprise the current video latency information 328 for every device in the video path as described by the topology of the video path of the topology information 395. In this case, the absolute video latency calculator 331 may calculate the information 320 about the latency of the video path by summing the current video latency information 328 of all devices in the video path. For example, the absolute video latency calculator 331 may sum up the current video latency information 328 of all devices between the source device and the video rendering device and the current video latency information 328 of the video rendering device. Calculating the information 320 about the latency of the video path based on the current video latency information 228 of all devices in the video path may be the most reliable way to calculate the information 320 about the latency of the video path.

If the video latency information comprises the total video latency information 324 and at least a device-individual video latency contribution 327 and a current video latency information 328 of the video rendering device, the absolute video latency calculator 331 may obtain the information 320 about the latency of the video path by using the second video latency calculation 333. The second video latency calculation 333 may, for example, be configured to correct the total video latency information 324 by revising a contribution of the video rendering device to the total video latency information 324. For example, the second video latency calculation 333 may substitute a contribution by the device-individual video latency contribution 327 of the video rendering device to the total video latency information 324 by the current video latency information 328 of the video rendering device. Thus, the second video latency calculation 333 may correct total video latency information 324 in cases, where the device-individual video latency contribution 327 of the video rendering device does not represent a true, current video latency of the video rendering device.

If the video delay information comprises the total video latency information 324, the absolute video latency calculator 331 may, alternatively or additionally, obtain the information 320 about the latency of the video path by using the third video latency calculation 334. The third video latency calculation 334 is configured to use the total video latency information 324. For example, the third video latency calculation 334 may be configured to use a value of the total video latency information 324 as a value for the information 320 about the latency of the video path.

Alternatively or additionally, the absolute video latency calculator 331 may use a fourth video latency calculation 335 for obtaining the information 320 about the latency of the video path. The fourth video latency calculation 335 may, for example, by configured to use the current video latency information 328 of all known devices in the video path, this is, of all devices described in the topology of the video path contained in the topology information 395. Additionally, the fourth video latency calculation 335 may use an estimated video latency information for the video rendering device. The estimated video latency information of the video rendering device may, for example, be the current video latency information 328 of the video rendering device or a video latency information obtained by an additional protocol, for example a dynamic audio lip sync (DALS), or by a default value.

The absolute video latency calculator 331 may be configured to choose between the first video latency calculation 332, the second video latency calculation 333, the third video latency calculation 334 and the fourth video latency calculation 335 based on an availability of information, for example, based on a content of the video delay information.

In other words, the source device is configured to select a determination rule for a determination of the information 320 about the latency of the video path in dependence on an amount of information available to the source device.

In other words, the source device is configured to determine the information 320 about the latency of the video path by using a summation of device-individual current video latency information 328, if device-individual current video latency information 328 is available to the source device for the video rendering device and all devices between the source device and the video rendering device. Additionally or alternatively, the source device is configured to determine the information 320 about the latency of the video path 320 by using a total video latency information 324 describing a total latency of a video path for a first video mode or describing an average total latency of the video path over a plurality of video modes, a latency information 327 describing a contribution of the video rendering device to the total video latency information 324 (e.g. the device-individual video latency contribution 327), and a current video latency information 328 of the video rendering device, if the total video latency information 324, the latency information 327 describing a contribution of the video rendering device to the total video latency information 324 and the current video latency information 328 of the video rendering device is available to the source device but some device-individual current video latency information 328 is unavailable to the source device. Additionally or alternatively, the source device is configured to determine the information 320 about the latency of the video path by using a total video latency information 324 if the total video latency information 224 is available to the source device but the current video latency information 328 of the video rendering device is unavailable to the source device.

The adjuster 302 further comprises an absolute audio path latency calculator 336. The absolute audio path latency calculator 336 is configured to obtain the information 310 about the latency of the audio path based on an audio delay information, for example the audio delay information 212. The audio delay information may comprise the total audio latency information 314 which may be obtained by the total latency reader 342. The audio delay information may further comprise the device-individual audio latency information 316 which may be obtained by the collector 344. If the audio delay information comprises device-individual audio latency information 316 for every device in the audio path, that is, for all devices described by the topology of the audio path contained in the topology information 395, the absolute audio path latency calculator 336 may be configured to obtain the information 310 about the latency of the audio path by using a first audio path latency calculation 337. The first audio path latency calculation 337 may use the device-individual passthrough latency information 219 of all devices in the audio path, for example, for all devices between the source device and the audio playback device, for example, excluding the audio playback device.

The absolute audio path latency calculator 336 may further be configured to calculate the information 310 about the latency of the audio path using a second audio path latency calculation 338, if the audio delay information comprises the total audio latency information 314. The second audio path latency calculation 338 is configured to use the total audio latency information 314 and, optionally, the device-individual audio latency contribution 317 of the audio playback device to obtain a latency of the audio path between the source device and the audio playback device, for example excluding a latency of the playback device. For example, if the audio playback device is within the audio path, that is, the total audio latency information 314 comprises a contribution of the audio playback device, the second audio path latency calculation 338 may be configured to obtain the information 310 about the latency of the audio path by eliminating the contribution of the audio playback device to the total audio latency information 314 from the total audio latency information 314.

Additionally or alternatively, the absolute audio path latency calculator 336 may be configured to use a third audio path latency calculation 339 which is configured to use the device-individual passthrough latency information 319 for obtaining the information 310 about the latency of the audio path. The third audio path latency calculation 339 may use the device-individual audio passthrough latency information 319 of known devices in the audio path, for which a device-individual pass through information 319 is available. The known devices in the audio path may be devices described by the topology of the audio path of the topology information 395. The third audio path latency calculation 339 may further use a default latency value, for example zero, as additional or alternative contribution to the information 310 about the latency of the audio path.

For example, the first audio path latency calculation 337, the audio path latency calculation 338 and the audio path latency calculation 339 may be configured to obtain a first contribution to the information 310 about the latency of the audio path comprising a latency of an audio path between the source device and the audio playback device. The information 310 about the latency of the audio path may comprise a second contribution comprising a latency of the audio playback device, for example the audio decoding latency 318.

The absolute audio path latency calculator 336 may be configured to choose between the first audio path latency calculation 337, the second audio path latency calculation 338 and the third audio path latency calculation 339 based on an availability of information, for example, based on the content of the audio delay information. The absolute audio path latency calculator 336 may most advantageously choose the first audio path latency calculation 337, if the necessary information is available. The absolute audio path latency calculator 336 may second most advantageously choose the audio path latency calculation 338, if the necessary information is available.

In other words, the source device is configured to determine the information about the latency of the audio path 310 using a summation of device-individual passthrough latency information 319 associated with a passthrough of audio information for the second audio mode, if device-individual pass through latency information 319 is available for all devices between the source device and the audio playback device. Additionally or alternatively, the source device is configured to determine the information 310 about the latency of the audio path using a total audio latency information 314 describing a total latency of an audio path for a first audio mode or describing an average total latency of the audio path over a plurality of audio modes. Additionally or alternatively, the source device is configured to determine the information 310 about the latency of the audio path using a summation of any known or estimated audio latency information of devices in an audio path between the source device and the audio playback device.

Optionally, the absolute audio path latency calculator 336 comprises a corrector 329. The corrector 329 is configured to correct a contribution to the information 310 about the latency of the audio path as obtained by the audio path latency calculation 338. The corrector 329 is configured to revise a contribution of a device in the audio path between the source device and the audio playback device to the information about the latency of the audio path, if the device in the audio path is configured to operate in the second audio mode. The corrector 329 is configured to correct the contribution to the information 310 about the latency of the audio path by using the device-individual audio latency contribution 317 and the device-individual audio playback latency information 318 of the device in the second audio mode within the audio path.

In other words, the source device is configured to correct an information about the latency of the audio path obtained using the total audio latency information 214, for example by using the second audio path latency calculation 338, using latency information associated with a playback using the first audio mode, for example the device-individual audio playback latency contribution 217, and using latency information about a latency associated with a pass through of audio information for the second audio mode, for example the device-individual audio pass through latency information 219.

The adjuster 302 further comprises a calculator 330, for example the calculator 130, 230. The calculator 330 is configured to calculate the time alignment 350 based on the information 310 about the latency of the audio path and the information 320 about the latency of the video path.

For example, the calculator 330 may calculate the time alignment 350 by comparing at least one contribution to the information 310 about the latency of an audio path with at least one contribution to the information 320 about a latency of the video path.

As described with respect to FIGS. 1 and 2, the time alignment 350 may be used as a delay to be applied in the provision of audio data and/or the provision of video data.

In other words, the source device is configured to determine a delay to be applied in the provision of audio data and/or a delay to be applied in the provision of the video data in dependence on the information 320 about the latency of the video path and in dependence on the information 310 about the latency of the audio path.

In FIG. 3, the working principle of the adjuster 302 is shown in an exemplary a sequence of working steps performed by components of the adjuster 302. However, the steps may be performed in also in alternative sequences. For example, the total latency reader 342 and the latency negotiator 343 may work independently, so that their working steps may be performed in parallel or in a arbitrary sequence. Also, for example, the absolute latency calculator 331 and the absolute audio path latency calculator 336 may work independently from each other.

The following section C.1 describes a detailed embodiment of the adjuster 302. The features, functionalities and details described in section C.1 can optionally be introduced into any of the embodiments described herein, in particular into the adjuster 202;302, both individually and taken in any combination. The description in section C.1.1 and C.1.2 refers to FIG. 3. In FIG. 3, section references of the form (x.x.x), wherein x is a number, refer to the following section C.1, numbers in brackets (x) refer to equations in section C.1.

C.1. MPEG-H Adjust Source Delay Algorithm (MASDA)

It should be noted that, in the following description, references to other embodiments, e.g. to embodiments of FIGS. 1 to 4 and 6 to 9, should be considered as examples. Such references are not intended to imply that any or all of the features shown in FIGS. 1 to 4 and 6 to 9 must be present in the following embodiments.

C.1.1. Introduction to the Proper Alignment of Audio and Video (Details are Optional)

To achieve perfect lipsync between audio 160;260 and video 165;265 the source should (or, in some cases, has to) delay either audio 160;260 or video 165;265. This is done, for example, by the additional video latency $VL_{additional}$ or the additional audio latency, $AL_{additional}$. They are calculated by this formula:

$$VL_{additional} = (-AL_{additional}) = AL_{path} + AL_{MPEG\_H} - VL_{total} \quad (1).$$

Whether audio 160;260 or video 165;265 should be delayed is determined, for example, by the sign of (1) since a delay is always positive and only one of both can be positive.

For example, the audio latency of the audio path $AL_{path}$, the MPEG-H audio decoding latency $AL_{MPEG\_H}$ and the total video latency $VL_{total}$ are unknown to the audio/video source at first. This description (and, in particular, this section) proposes an algorithm to acquire this information. The audio/video source 100;200;400 in this description (and, in particular, in this chapter) is, for example, a set-top-box (STB) since a TV uses only a subset of the here explained functionality where the video path is internally known.

For example, the calculator 330 may be configured to perform a calculation according to (1). The information 310 about the latency of the audio path may comprise, for example, the MPEG-H audio decoding latency $AL_{MPEG\_H}$, e.g. the audio decoding latency 318, and the audio latency of the audio path $AL_{path}$ which may be, for example, a result provided by the audio path latency calculator 336. The information 320 about the latency of the video path may, for example, comprise the total video latency $VL_{total}$ which may, for example, be a result of the absolute video latency calculator 331. The calculator 330 is configured to adjust the time alignment 350, for example $VL_{additional}$ or $AL_{additional}$.

C.1.2. The Nine Steps of the MPEG-H Adjust Source Delay Algorithm (MASDA)

(One or More or all Steps May be Used; Details are Optional)

The following nine steps define the MPEG-H Adjust Source Delay Algorithm (MASDA). A visual overview of MASDA is given in FIG. 3. In this chapter, the mathematical XOR operator v̇ is used. Its meaning is slightly expanded to prefer the first mentioned variable: The term A v̇ B means A is used if available, otherwise B is used.

C.1.2.1. Discover the Topology (Details are Optional)

Discover (for example) all devices (or at least some devices) in the audio and video signal path. The audio signal path is, for example, between the source and the audio decoding device. The video signal path 190;290 is, for example, between the source 100;200;400 and the video rendering device 292 (normally the TV). The video signal path 190;290 inclusive the video rendering device 292 is also called EDID chain. Since the EDID is written by the video rendering device 292 and transmitted through the video path 190;290 to the source 292. The video latency of the whole EDID chain is called total video latency. The discovery should be done, for example, according to '8.7.3 Discovery Algorithm' (HDMI 1.4b) or '10.9 Discovery Algorithm' (HDMI 2.1x).

For a setup with a TV and a device capable of rendering audio, for example, use the CEC System Audio Control Feature (for example, HDMI 1.4b CEC Table 23) to determine who is rendering audio. For example, the <System Audio Mode Status> is On if a soundbar or an AVR is rendering audio and Off if a TV is doing the audio rendering.

For example, this step may be performed by the discoverer 341.

C1.2.2. Read the EDID (Details are Optional)

The EDID can contain two useful pieces of information in the HDMI Vendor-Specific Data Block (HDMI VSDB). First, the EDID audio latency $AL_{EDIDsource}$ ' e.g. the total audio latency information 214;314, and second the EDID video latency $VL_{EDIDsource}$' e.g. the total video latency information 224;324. The EDID audio latency refers to none MPEG-H audio formats or even weighted mean values (see, for example, HDMI 2.0a 10.6.1.3). Nevertheless, it is useful to calculate the audio path latency in section C.0. For example, if $AL_{EDID_{source}}$, $VL_{EDID_{source}}$ are not contained in the EDID or the EDID cannot be read, default values are used later on.

For example, this step may be performed by the total latency reader 342, to obtain, for example, total audio latency information 214;314 and the total video latency information 224;324.

C1.2.3. Negotiate the MPEG-H Audio Decoding Latency Via CEC DaNoL (Details are Optional)

In this step, the source and the audio decoding device may negotiate the MPEG-H audio decoding latency as described, for example, in the section D.1. 'CEO Discovery and Negotiation of Latencies (CEC DaNoL)'. 'CEO' stands for Consumer Electronics Control and is described, for example, in HDMI 1.4b-CEC. The MPEG-H audio decoding latency $AL_{MPEG\_H}$ is then defined, for example, as $$AL_{MPEG\_H} = AL_{MPEG\_H_{negotiated}} (=[0\ ms-500ms])$$
$$\dot{v} AL_{MPEG\_H_{DEFAULT}} (=250ms) \quad (2).$$

C.1.2.4. Collect Information with the CEC DaNoL Protocol (Details are Optional) (2)

For example, use the directly addressed <Request Latency Info> CEC DaNoL message (as described in Tab. 2) to enquire useful information from every devices n in the audio and video path (or, alternatively, from some of the devices) and (optionally) the corresponding sinks. Devices, which support CEC DaNoL messages, will, for example, send in respond the following values: the audio latency 217;317 for non MPEG-H basic audio codecs $AL_{none\ MPEG\text{-}H_n}$ (same as in EDID added), the video latency 227;327, $VL_n$ (same as in EDID added), the MPEG-H audio decoding latency 218; 318, $AL_{MPEG\_H_n}$, the MPEG-H passthrough latency 219; 319, $AL_{MPEG\_H\ passthrough_n}$, and the current video latency 228;328, $VL_{current_n}$ (or, optionally, at least one or more of said values). In the examples of chapter C.0 the following structure may be used to show the information obtained by CEC DaNoL:

$$[AL_{none\ MPEG-H}, VL_{EDID}, AL_{MPEG-H},$$
$$AL_{MPEG-H\ passthrough}, VL_{current}]_n.$$

Alternatively and optionally, the source device may use multiple messages, for example the directly addressed <Request Latency Info> and <Request EDID Latency Info> CEC DaNoL messages (as described in Tab. 3) to enquire useful information from every devices n in the audio and video path (or, alternatively, from some of the devices) and (optionally) the corresponding sinks. Devices, which support the CEC DaNoL messages according to Tab. 3, will, for example, send in respond the following values: the audio latency 217;317 for non MPEG-H basic audio codecs $AL_{none\ MPEG-H_n}$ (same as in EDID added), the video latency 227;327, $VL_n$ (same as in EDID added), the MPEG-H audio decoding latency 218;318, $AL_{MPEG\_H_n}$, the MPEG-H passthrough latency 219;319, $AL_{MPEG-H\ passthrough_n}$ and the current video latency 228;328, $VL_{current_n}$ (or, optionally, at least one or more of said values). For example, the devices will send the audio latency 217;317 for non MPEG-H basic audio codecs $AL_{none\ MPEG-H_n}$ (same as in EDID added) and/or the video latency 227;327, $VL_n$ (same as in EDID added) in a <EDID Latency Info> message in response to the Request EDID Latency Info> message, and will send the MPEG-H audio decoding latency 218;318, $AL_{MPEG\_H_n}$, the MPEG-H passthrough latency 219;319, $AL_{MPEG\_H\ passthrough_n}$ and the current video latency 228;328, $VL_{current_n}$ (or, optionally, at least one or more of said values) in a <Latency Info> message in response to a <Request Latency Info> message. In the examples of chapter C.0 the following structure may be used to show the information as obtained by CEC DaNoL according to the optional implementation alternative described in Tab. 3:

$$<Latency\ Info> \rightarrow [AL_{MPEG-H}, AL_{MPEG-H\ passthrough},$$
$$VL_{current}]_n < EDID\ Latency\ Info> \rightarrow$$
$$[AL_{none\ MPEG-H}, VL_{EDID}, (AL_{none\ MPEG-H},$$
$$VL_{EDID})_{interlaced}]_n.$$

For example, the collector 344 may be configured to perform this step according to one of the above described examples to obtain from a device that is compatible to communicate with the communicator 340 at least part of the device-individual latency information $AL_{none\ MPEG-H}$, $VL_{EDID}$, $AL_{MPEG-H}$, $AL_{MPEG-H\ passthrough}$, $VL_{current}$.

C.1.2.5. Calculate the Total Video Latency (Details are Optional)

In this step, the total video latency $VL_{total}$ is calculated. It sums up all video latencies (or, optionally, at least some video latencies) after the source up to the video playout device. There are, for example, two ways available to obtain information. First, the EDID the source reads and second the CEC DaNoL protocol. Both information sources are not granted which leads, for example, to four different formulas depending on the scenario. In principle, the total video latency should be the same as the video latency value that the source reads via EDID. However, if the TV changes to a special movie or gaming mode it will not change its EDID but it should (or, in some cases, must) change the $VL_{current}$ reported via CEC DaNoL. That mean the quality of information obtained by CEC DaNoL is much higher.

Depending on the setup and the capability of the used devices, there are, for example, four different ways of calculating the total video latency:

a) If all devices in the video path and the TV understand CEC DaNoL messages and report a valid $VL_{current}$, the total video latency is the sum of all current video latencies in the audio path plus the video latency of the video playout device (TV).

$$VL_{total} = \sum_{all\ devices\ in\ the\ video\ path} VL_{current} + VL_{current_{TV}}. \quad (3)$$

This is the most reliable way to calculate the video latency of the path.

For example, the first video latency calculator 332 may be configured to calculate the information 310 about the latency of the video path according to (3).

b) If EDID information and CEC information about the video sink are obtained, the total video latency is the video latency that the source reads in the EDID but adjusted with the current video latency of the TV (video sink):

$$VL_{total} = VL_{EDID_{source}} - VL_{EDID_{TV}} + VL_{current_{TV}} \quad (4)$$

For example, the second video latency calculator 333 may be configured to calculate the information 310 about the latency of the video path according to (4).

c) If there is an EDID value but no DaNoL values are obtained from the TV, the video latency in the EDID is used as the total video latency.

$$VL_{total} = VL_{EDID_{source}} \quad (5).$$

For example, the third video latency calculator 334 may be configured to calculate the information 310 about the latency of the video path according to (5).

d) If no EDID information is obtained and not all devices or no device in the path support CEC DaNoL messages, the total video latency is calculated, for example, with (6). In HDMI 2.0a 10.7 Dynamic Auto Lipsync (DALS) is introduced. It is (in some cases) possible to get the current video latency with this protocol.

$$VL_{total} = \sum_{\substack{all\ known\ devices \\ in\ the\ video\ path}} VL_{current} + \quad (6)$$

$$(VL_{current_{TV}} \mathrel{\dot{\vee}} VL_{current_{DALS}} \mathrel{\dot{\vee}} VL_{current_{DEFAULT}} = 70\ ms).$$

For example, the fourth video latency calculator 335 may be configured to calculate the information 310 about the latency of the video path according to (3).

C.1.2.6. Determine the Audio Path Latency (Details are Optional)

In this step, the audio path latency $AL_{path}$ is calculated. For example, it sums up all audio latencies (or at least some audio latencies) between the source to the audio decoding device. Depending on the setup and the capability of the used devices, there are, for example, different ways of calculating this information:

a) If all devices in the audio path understand CEC DaNoL messages, the audio latency of the path is the sum of all MPEG-H passthrough latencies in the audio path $$AL_{path_{MPEG-H}} = \sum_{all\ devices\ in\ the\ audio\ path} AL_{MPEG-H\ passthrough}. \quad (7)$$

This is the most reliable way to calculate the audio latency of the path.

For example, the first audio path latency calculator 337 may be configured to calculate a contribution to the information 310 about the latency of the video path, e.g. $AL_{path}$, according to (7).

b) If EDID information and CEC information about the sink are obtained, the audio latency of the path is the audio latency in the EDID minus the audio latency for non MPEG-H content of the sink $$AL_{path_{EDID}} = AL_{EDID_{source}} - [AL_{none\ MPEG-H_{sink}}]_{If\ audio\ sink\ in\ EDID\ chain} \qquad (8).$$

The audio latency $AL_{EDID_{source}}$ is, for example, read by the source via EDID and the audio latency for non MPEG-H content of the sink is, for example, obtained via CEC DaNoL. If the audio sink is not in the EDID chain the subtraction of its audio latency for non MPEG-H content is not needed.

For example, the first audio path latency calculator 338 may be configured to calculate a contribution to the information 310 about the latency of the video path, e.g. $AL_{path}$, according to (8).

c) If no EDID information is obtained and not all devices or no device in the path support CEC DaNoL messages, the audio latency of the path is set to zero plus all known MPEG-H passthrough latencies of the path:

$$AL_{path_{DEFAULT}} = 0\ ms + \sum_{\substack{all\ known\ devices \\ in\ the\ video\ path}} AL_{MPEG-H\ passthrough}. \qquad (9)$$

For example, the first audio path latency calculator 338 may be configured to calculate a contribution to the information 310 about the latency of the video path, e.g. $AL_{path}$, according to (8).

C.1.2.7. Adjust Audio Path Latency (Details are Optional)

In cases where MPEG-H devices are in the audio path they write their audio latency into the EDID. But this may differ from the MPEG-H passthrough latency which applies for MPEG-H bitstream passthrough. This difference is optionally corrected by the formula (wherein, for example, those devices may be considered for which respective information is available):

$$AL_{path_{adjusted}} = \qquad (10)$$
$$AL_{path_{EDID}} - \sum_{\substack{all\ MPEG-H \\ devices\ in\ the \\ EDID\ chain}} AL_{none\ MPEG-H} + \sum_{\substack{all\ MPEG-H \\ devices\ in\ the \\ EDID\ chain}} AL_{MPEG-H\ passthrough}.$$

The audio latency of the path is the most suitable of the previously discussed options:

$$\underline{AL_{path}} = AL_{path_{MPEG-H}} \dot{\vee} AL_{path_{adjusted}} \dot{\vee} AL_{path_{EDID}} \dot{\vee} AL_{path_{DEFAULT}}$$

C.1.2.8. Calculate the Audio/Video Adjustment (Details are Optional)

At this point all available information to calculate (1) is collected (or estimated), the relevant values are underlined. The calculated adjustment should be used to align video with audio in the source.

C.1.2.9. Provide Adjustment Possibility to the User (Details are Optional)

Optionally, provide an additional slider for the user to adjust audio/video alignment in the range of, for example, minimum [−250, 250 ms] with a step size of, for example, at least 5 ms. This is helpful (or, in some cases, needed) since a video rendering device after the audio decoding device may not support neither EDID nor CEC DaNoL. This results in no information about the total audio and video latency which can lead to unsynchronized audio and video. The only way to deal with this is a manual slider.

C.1.3. Examples (Details can optionally be included into the embodiments, both individually and taken in combination; Specific values, identifiers, message names are to be considered as being optional)

FIGS. 5A-1 show schematic representations of arrangements of source devices, e.g. a STB, audio playback devices, e.g. soundbars, video rendering devices, e.g. TVs, and other devices according to embodiments. FIGS. 5A-1, to which this sections refer, comprise boxes, which symbolize devices connected by an HDMI connection shown as black arrow. The physical address of the devices is written over the top of the device. The TV has always the physical address 0.0.0.0. This notation is explained in HDMI 1.4b 8.7. The EDID that a device will report to the next device is stated below the box.

For example, the representation in FIGS. 5A-1 may comprise devices represented by boxes. Values within the boxes may, for example, refer to device-individual latency information. AL may optionally refer to a device-individual audio latency contribution, e.g. the device-individual audio latency contribution 217;317. $AL_{MPEG-H}$ may optionally refer to an audio decoding latency using the second audio mode, e.g. the audio decoding latency 218;318. VL may optionally refer to a device-individual video latency contribution, e.g. the device-individual video latency contribution 227;327.

For example, the source device 500A-1 may optionally obtain a respective total audio latency information 514A-1, e.g. the total audio latency information 214;314, and a respective total video latency information 524A-1, e.g. the a total video latency information 224;324, from a device closest to the respective source device 500A-1.

C.1.3.1. Example 1

FIG. 5A shows a schematic representation of a given setup comprising a STB 500A, e.g. a source device 100; 200;400, a soundbar 582A, e.g. an audio playback device 282;482;682;782, a TV 592A, e.g. a video rendering device 292;892;992, and another device 591A in the video path.

1) After the discovery of the topology, the source 500A has all information about the audio and video path. This includes the fact that an undefined device 591A is in the video path. This device 591A typically will delay video and audio to the same extend, but audio is already out of the path so that this device 591A will disturb the lipsync if audio and video are played out at the same time. Furthermore, the MPEG-H audio decoding latency $AL_{MPEG-H}$ is not equal to the total video latency 524A, which will disturb lipsync as well.

2) The STB 500A reads in the EDID (514A and 524A): $AL_{EDID_{source}} = 80$ ms and $VL_{EDID_{source}} = 90$ ms.

The soundbar 582A and the TV 592A are audio sinks. But the soundbar 582A is the desired output for audio therefore it overwrites the EDID value of the TV 592A. The total video latency consists of all video latencies of the devices added up.

3) The STB negotiates via CEC that the Soundbar 582A has an MPEG-H audio decoding latency of $AL_{MPEG-H} = 150$ ms. As in (2) defined is the negotiated MPEG-H decoding latency of higher priority as the default MPEG-H decoding latency.

4) The attempt to communicate via CEC DaNoL with the TV 592A will fail since it is not capable of doing it. That means there is no way to obtain the $VL_{EDID_{video\ sink}}$. The soundbar will report via CEC DaNoL:

$$[AL_{none\ MPEG-H}=80\ ms,\ VL_{EDID}=0\ ms,\\ AL_{MPEG-H}=150\ ms,\ AL_{MPEG-H\ passthrough}=20\ ms,\\ VL_{current}=0\ ms]_{soundbar}$$

Optionally, the information provided by the soundbar may be sent in one or in more messages, for example in the messages defined in one of the Tabs. 2 or 3, for example in the <Latency Info> and the <EDID Latency Info> CEC DaNoL messages as defined in Tab. 3. In this case, the information provided by the soundbar have the following structure:

$$<\text{Latency Info}>\to[AL_{MPEG-H}=150ms,\\ AL_{MPEG-H\ passthrough}=0ms,\ VL_{current}=\\ 0ms]_{soundbar}<\text{EDID Latency Info}>\to\\ [AL_{none\ MPEG-H}=80ms,\ VL=0ms]_{soundbar}$$

5) Since only EDID values are obtained, the total video latency is calculated with (5) $VL_{total}=VL_{EDID_{source}}=90$ ms.
6, 7) Since step one it is known, that there is no device in the audio path: $AL_{path}=0$ ms.
8) The STB calculates the additional video latency with the information of the previous steps after (1):

$$VL_{additional}=AL_{path}+AL_{MPEG-H}-VL_{total}=0ms+150\\ ms-90ms=60ms$$

The source configures its outputs so that the video is 60 ms behind the audio. The system achieves perfect lipsync.

For example, example 1 demonstrates, that the source device 500A can handle situations, in which an audio decoding latency is larger than a video latency or larger than a total video latency of a video path, even if the audio decoding latency is larger by more than 20 ms. Example 1 may further demonstrate, that the source device 500A may handle situations, in which an unknown device 591A is part of the video path, but not part of the audio path, that is, there is an unknown but asymmetric relative delay between the audio path and the video path. Example 1 may further demonstrate, that the source device 500A may handle situations, in which a device, e.g. the video rendering device 592A is incompatible to communicate device-individual latency information.

C.1.3.2. Example 2

FIG. 5B shows a schematic representation of a given setup comprising a STB 500B, e.g. a source device 100; 200;400, a soundbar 582B, e.g. an audio playback device 282;482;682;782, a TV 592B, e.g. a video rendering device 292;892;992, another device 581B in the audio path, and another device 591B in the video path.

1) After the discovery of the topology, the source 500B has all information about the audio and video path.
2) The EDID states: $AL_{EDID_{source}}=100$ ms, $VL_{EDID_{source}}=130$ ms.
3) Via CEC DaNoL $AL_{MPEG-H}$ is set to 150 ms.
Note: If the latency negotiation between the STB and the soundbar fails both devices use the default MPEG-H audio latency $AL_{MPEG-H_{DEFAULT}}=250$ ms.
4) The Soundbar 582B reports five values via CEC DaNoL <Latency Info> message but only the value of $AL_{none\ MPEG-H}$ is used in this particular case:

$$[AL_{none\ MPEG-H}=80\ Ms,\ VL=20\ ms,\ AL_{MPEG-H}=150\\ ms,\ AL_{MPEG-H\ passthrough}=20\ ms,\ VL_{current}=20\\ ms]_{soundbar}$$

Optionally, the information provided by the soundbar may be sent in one or in more messages, for example in the messages defined in one of the Tabs. 2 or 3, for example in the <Latency Info> and the <EDID Latency Info> CEC DaNoL messages as defined in Tab. 3. In this case, the information provided by the soundbar have the following structure:

$$<\text{Latency Info}>\to[AL_{MPEG-H}=150ms,\\ AL_{MPEG-H\ passthrough}=0ms,\ VL_{current}\\ 20ms]_{soundbar}<\text{EDID Latency Info}>\to\\ [AL_{none\ MPEG-H}=80ms,\ VL=20ms]_{soundbar}$$

5) The total video latency is calculated via (5) to $VL_{total}=130$ ms
6) Since the soundbar 582B reports $AL_{none\ MPEG-H_{soundbar}}$ via CEC and the EDID states a sum of latencies, including that one of the soundbar, it is possible to calculate the audio path latency with (8):

$$AL_{path_{EDID}}=AL_{EDID}-AL_{none\ MPEG-H_{soundbar}}=100\\ ms-80ms=20ms.$$

7) The device in the audio path is not capable of DaNoL communication. Therefore, it is not possible and necessary to adjust the audio path latency.
8) The STB calculates the additional video delay with the information of the last steps after (1):

$$VL_{additional}=AL_{path_{EDID}}+AL_{MPEG-H}-VL_{total}=20\\ ms+150\ ms-130\ ms=40\ ms.$$

The source configures its outputs so that the video is 40 ms behind the audio. The system achieves perfect lipsync.

For example, example 2 demonstrates, that, additionally to the situations described in example 1, the source device 500B can handle situations, in which there is an unknown device 581B in the audio path and in the video path, the device 581B being incompatible to communicate device-individual latency information. For example, as the unknown device 581B may add its latency values to the total audio latency information 514B and its total video latency information 524B, the source device 500B is not required to know device-individual latency information about the device 581B.

C. 1.3.3. Example 3

FIG. 5C shows a schematic representation of a given setup comprising a STB 5000, e.g. a source device 100;200; 400, a soundbar 582C, e.g. an audio playback device 282; 482;682;782, a TV 592C, e.g. a video rendering device 292;892;992, another device 581C in the audio path, and another device 591C in the video path.

The TV 592C does not support AL and VL in the EDID. Nevertheless, the values apply in reality that is why the numbers are crossed out in the graphic. No AL, VL value in the EDID of the TV 592C is possible since it is not required for a TV without MPEG-H support. The devices 581C, 591C do not support EDID latency values as well.

1) After the discovery of the topology, the source has all routing information about the audio and video path.
2) The EDID states no values for AL or VL, which leads to default values later on. 3) Via latency negotiation with CEC DaNoL $AL_{MPEG-H}$ is set to 150 ms.
4) The Soundbar 582C reports five values via CEC DaNoL <Latency Info> message but only the bold value is used in this particular case:

$$[AL_{none\ MPEG-H}=80\ ms,\ VL=20\ ms,\ AL_{MPEG-H}=150\\ ns,\ AL_{MPEG-H\ passthrough}=20\ ms,\ VL_{current}=20\\ ms]_{soundbar}$$

Optionally, the information provided by the soundbar may be sent in one or in more messages, for example in the messages defined in one of the Tabs. 2 or 3, for example in the <Latency Info> and the <EDID Latency Info> CEC DaNoL messages as defined in Tab. 3. In this case, the information provided by the soundbar have the following structure:

<Latency Info >$[AL_{MPEG-H}=150ms,$
$AL_{MPEG-H\ passthrough}=20ms, VL_{current}=$
$20ms]_{soundbar}$<EDID Latency Info>→
$[AL_{none\ MPEG-H}=80ms, VL=20ms,]_{soundbar}$ 5) Since the soundbars current video latency is known the total video latency is updated via (6) to $VL_{total}=VL_{current_{soundbar}}+VL_{current_{DEFAULT}}=20ms+70ms=90ms$ 6, 7) There is a device 581C in the audio path as in step one recognized. Since no EDID or CEC DaNoL is supported in this device there is no possibility to calculate an audio path latency. The default value obtained with (9) is $AL_{path_{DEFAULT}}=0$ ns.

8) The STB calculates the additional video delay with the information of the last steps after (1):

$VL_{additional}=AL_{path_{DEFAULT}}+AL_{MPEG-H}-VL_{total}=0\ ms+150\ ms-90\ ms=60\ ms.$ The source configures its outputs so that the video is 60 ms behind the audio. The system doesn't achieve perfect lipsync due to unknown parameters.

9) To achieve perfect lipsync the user manually sets the audio latency slider in the STB to −20 ms.

Note: The overall audio latency is 170 ms and the overall video latency is 130 ms so that the original additional video latency of 60 ms subtracted by the 20 ms results in the 40 ms needed to achieve lipsync.

For example, example 3 demonstrates, that, the source device 5000 may handle situations, in which devices in the audio path and/or in the video path and/or the video rendering device are incompatible to communicate neither device-individual latency information nor total latency values, as it provides the possibility to adjust the time alignment manually. Even without a manual adjustment, the source device 5000 is configured to adjust the time alignment in the shown situation so that a synchronization of the audio data and the video data is improved.

C.1.3.4. Example 4

Alternative A:

FIG. 5D shows a schematic representation of a given setup comprising a STB 500D, e.g. a source device 100; 200;400, a soundbar 582D, e.g. an audio playback device 282;482;682;782, a TV 592D, e.g. a video rendering device 292;892;992, and another device 581D in the audio path and in the video path.

1) After the discovery of the topology, the source has all information about the audio and video path.

2) The EDID states: $AL_{EDID_{source}}=90$ ms $VL_{EDID_{source}}=90$ ms.

3) Via latency negotiation with CEC DaNoL $AL_{MPEG-H}$ is set to 150 ms

4) The TV and Soundbar report each five values via CEC DaNoL but only the bold values are used in this particular case:

$[AL_{none\ MPEG-H}=70\ ms,\ VL=70\ ms,\ AL_{MPEG-H}=250$
$ms,\ AL_{MPEG-H\ passthrough}=20\ ms,\ VL_{current}=90$
$ms]_{TV}$ $[AL_{none\ MPEG-H}=80\ ms,\ VL=20\ ms,\ AL_{MPEG-H}=150$
$ms,\ AL_{MPEG-H\ passthrough}=20\ ms,\ VL_{current}=20$
$ms]_{soundbar}$ 5) Since not all devices report information via DaNoL but the TV 592D does and the EDID 524D is available, the total video latency is obtained via (4) as $VL_{total}=VL_{EDID_{source}}-VL_{EDID_{TV}}+VL_{current_{TV}}=90\ ms-70\ ms+90\ ms=110\ ms.$ 6) Since not all devices report information via DaNoL and the EDID 514D is available, the audio path latency is obtained via (8). The soundbar 582D is not in the EDID chain which means the second term of formula (8) is ignored:

$AL_{path_{EDID}}=AL_{EDID_{source}}-=90$ ms.

7) The reported audio latency 514D in the EDID needs an adjustment. The reason for that is that the TV 592D writes the audio latency of its own audio output into the EDID and not the MPEG-H passthrough latency. The adjustment is done with (10) where the TV is the only device in the EDID chain that is an MPEG-H device:

$AL_{path_{adjusted}}=AL_{path_{EDID}}-AL_{none\ MPEG-H_{TV}}+AL_{MPEG-H\ passthrough_{TV}}=90\ ms-70\ ms+20\ ms=40\ ms.$ 8) The STB 500D calculates the additional video delay with the information of the last steps after (1):

$VL_{additional}=AL_{path_{adjusted}}+AL_{MPEG-H}-VL_{total}=40\ ms+150\ ms-110\ ms=80\ ms.$ The source configures its outputs so that the video is 80 ms behind the audio. The system achieves perfect lipsync.

Alternative B (optional):

FIG. 5G shows a schematic representation of a given setup comprising a STB 500G, e.g. a source device 100; 200;400, a soundbar 582G, e.g. an audio playback device 282;482;682;782, a TV 592G, e.g. a video rendering device 292;892;992, and another device 581G in the audio path and in the video path.

In the alternative B, the TV 592G has a higher pass-through latency $AL_{MPEG-H\ pt}=50$ ms compared to the pass-through latency $AL_{MPEG-H\ pt}=20$ ms of the TV 592D of alternative A. A higher passthrough latency may arise, for example, if the TV needs to repack the data, e.g. the audio data.

1) After the discovery of the topology, the source has all information about the audio and video path.

2) The EDID states: $AL_{EDID_{source}}=90$ ms $VL_{EDID_{source}}=90$ ms.

3) Via latency negotiation with CEC DaNoL $AL_{MPEG-H}$ is set to 150 ms.

4) The TV and Soundbar report each five values via CEC DaNoL but only the bold values are used in this particular case:

<Latency Info>→$[AL_{MPEG-H}=250ms,$
$AL_{MPEG-H\ passthrough}=50ms, VL_{current}=$
$90ms]_{TV}$<EDID Latency Info>→$[AL_{none\ MPEG-H}=70ms, VL=70ms]_{TV}$<Latency Info>→
$[AL_{MPEG-H}=150ms, AL_{MPEG-H\ passthrough}=0ms,$
$VL_{current}=20ms]_{soundbar}$<EDID Latency Info>→
$[AL_{none\ MPEG-H}=80ms, VL=20ms]_{soundbar}$ 5) Since not all devices report information via DaNoL but the TV does and the EDID is available, the total video latency is obtained via (4) as $VL_{total}=VL_{EDID_{source}}-VL_{EDID_{TV}}+VL_{current_{TV}}=90ms-70ms+90ms=110ms.$ 6) Since not all devices report information via DaNoL and the EDID is available, the audio path latency is obtained via (8). The soundbar is not in the EDID chain which means the second term of formula (8) is ignored:

$$AL_{path_{EDID}} = AL_{EDID_{source}} = 90 ms.$$

7) The reported audio latency in the EDID needs an adjustment. The reason for that is that the TV writes the audio latency of its own audio output into the EDID and not the MPEG-H passthrough latency. The adjustment is done with (10) where the TV is the only device in the EDID chain that is an MPEG-H device:

$$AL_{path_{adjusted}} = AL_{path_{EDID}} - AL_{none\ MPEG-H_{TV}} + AL_{MPEG-H\ passthrough_{TV}} = 90ms - 70ms + 50ms = 70ms.$$

8) The STB calculates the additional video delay with the information of the last steps after (1):

$$VL_{additional} = AL_{path_{adjusted}} + AL_{MPEG-H} - VL_{total} = 70\ ms + 150\ ms - 110\ ms = 110\ ms.$$

The source configures its outputs so that the video is 110 ms behind the audio. The system achieves perfect lipsync.

For example, example 4 (A and B) demonstrates, that, the source device 500D (or 500G) may handle situations, in which a device in the second audio mode, e.g. the TV 592D (or 592G) in a MPEG-H mode, is in the audio path, so that a total audio latency information 514D (or 514G) may have to be adjusted to achieve perfect lipsync.

C.1.3.5. Example 5

Alternative A:

FIG. 5E shows a schematic representation of a given setup comprising a STB 500E, e.g. a source device 100;200;400, a soundbar 582E, e.g. an audio playback device 282;482; 682;782, a TV 592E, e.g. a video rendering device 292;892; 992, and another device 581E in the audio path and in the video path.

1) After the discovery of the topology, the source 500E has all information about the audio and video path. But the source 500E sees the TV 592E as audio sink.
2) The EDID states: $AL_{EDID_{source}} = 70$ ms, $VL_{EDID_{source}} = 70$ ms (514E, 524E).
   That means the device 581E is not adding its latency to the EDID information. In this case, it is not relevant since AL and VL of the device 581E are equal.
3) Via CEC $AL_{MPEG-H}$ is negotiated to 275 ms. The TV 592E also reports a normal audio latency of $AL_{none\ MPEG-H} = 70$ ms. The TV has the information that a MPEG-H soundbar 582E is connected. The MPEG-H stream may be converted from 8Ch192 kHz to 2Ch192 kHz that will result in one additional MHAS frame length delay of the audio signal (and maybe some milliseconds more to get a round number). In this example 25 ms is used as latency to pass the bitstream to S/PDIF. Since the real MPEG-H sink (the soundbar) has no CEC access, the TV 592E takes over the role of the MPEG-H sink and reports the MPEG-H audio decoding latency that is the sum of the default MPEG-H audio latency, which the soundbar 582E has, and the MPEG-H pass to S/PDIF latency of the TV:

$$AL_{MPEG-H} = AL_{MPEG-H_{DEFAULT}} + AL_{pass\ to\ S/PDIF_{TV}} = 250\ ms + 25\ ms = 275\ ms.$$

Depending on the setup the TV will report different MPEG-H audio decoding latencies. In the case where the soundbar is connected via ARC or even if the TV is playing MPEG-H itself the TV reports $AL_{MPEG-H} = 250$ ms or a negotiated value.

In the case where the soundbar is connected via e.g. S/PDIF or another technology without HDMI the TV changes its values to $AL_{MPEG-H} = 275$ ms. No negotiation is possible.

4) The TV reports five values via CEC DaNoL but only the bold values are used in this particular case:

$$[AL_{none\ MPEG-H} = 70\ ms,\ VL = 70\ ms,\ \mathbf{AL_{MPEG-H} = 275\ ms},\ AL_{MPEG-H\ passthrough} = 20\ ms,\ VL_{current} = 70\ ms]_{TV}$$

5) The total video latency is obtained via (4):

$$VL_{total} = VL_{EDID_{source}} - VL_{EDID_{TV}} + VL_{current_{TV}} = (90 - 70 + 70)\ ms = 90\ ms$$

6,7) Since the device 581E does not appear in the EDID information, the audio latency of the path (8) is:

$$AL_{path_{EDID}}\ AL_{EDID} - AL_{none\ MPEG-H_{TV}} = 70\ ms - 70\ ms = 0\ ms.$$

8) The STB 500E calculates the additional video delay with the information of the last steps after (1):

$$VL_{additional} = AL_{path_{EDID}} + AL_{MPEG-H} - VL_{total} = 0\ ms + 275\ ms - 70\ ms = 205\ ms.$$

The source configures its outputs so that the video is 205 ms behind the audio. The system achieves perfect lipsync.

Alternative B (optional):

FIG. 5H shows a schematic representation of a given setup comprising a STB 500H, e.g. a source device 100; 200;400, a soundbar 582H, e.g. an audio playback device 282;482;682;782, a TV 592H, e.g. a video rendering device 292;892;992, and another device 581H in the audio path and in the video path.

In the alternative B, the TV 592H has a higher pass-through latency $AL_{MPEG-H_{pt}} 50$ ms compared to the pass-through latency $AL_{MPEG-H\ pt} = 25$ ms of the TV 592E of alternative A. A higher passthrough latency may arise, for example, if the TV needs to repack the data, e.g. the audio data.

1) After the discovery of the topology, the source has all information about the audio and video path. But the source sees the TV as audio sink.
2) The EDID states: $AL_{EDID_{source}} = 70$ ms, $VL_{EDID_{source}} = 70$ ms.
   That means the device is not adding its latency to the EDID information. In this case, it is not relevant since AL and VL of the device are equal.
3) Via CEC $AL_{MPEG-H}$ is negotiated to 300 ms. The TV also reports a normal audio latency of $AL_{none\ MPEG-H} = 70$ ms. The TV has the information that a MPEG-H soundbar is connected. The MPEG-H stream may be converted from 8Ch192 kHz to 2Ch192 kHz that will result in one additional MHAS frame length delay of the audio signal (and maybe some milliseconds more). In this example 50 ms is used as latency to pass the bitstream to S/PDIF. Since the real MPEG-H sink (the soundbar) has no CEC access, the TV takes over the role of the MPEG-H sink and reports the MPEG-H audio decoding latency that is the sum of the default MPEG-H audio latency, which the soundbar has, and the MPEG-H pass to S/PDIF latency of the TV:

$$AL_{MPEG-H} = AL_{MPEG-H_{DEFAULT}} + AL_{pass\ to\ S/PDIF_{TV}} = 250\ ms + 50\ ms = 300\ ms.$$

Depending on the setup the TV will report different MPEG-H audio decoding latencies. In the case where the soundbar is connected via ARC or even if the TV is playing MPEG-H itself the TV reports $AL_{MPEG-H} = 250$ ms or a negotiated value.

In the case where the soundbar is connected via e.g. S/PDIF or another technology without HDMI the TV changes its values to $AL_{MPEG-H}$=300 ms. No negotiation is possible.

4) The TV reports five values via CEC DaNoL but only the bold values are used in this particular case:

<Latency Info >→[$AL_{MPEG-H}$=300 ms, $AL_{MPEG-H\ passthrough}$=50 ms, $VL_{current}$=70 ms]$_{TV}$
<EDID Latency Info >[$AL_{none\ MPEG-H}$=70 ms, VL=70 ms]$_{TV}$ 5) The total video latency is obtained via (4):

$VL_{total}=VL_{EDID_{source}}-VL_{EDID_{TV}}+VL_{current_{TV}}$=(70−70+ 70) ms=70 ms 6,7) Since the device does not appear in the EDID information, the audio latency of the path (8) is:

$AL_{path_{EDID}}=AL_{EDID}-AL_{none\ MPEG-H_{TV}}$=70 ms−70 ms=0 ms.

8) The STB calculates the additional video delay with the information of the last steps after (1):

$VL_{additional}=AL_{path_{EDID}}+AL_{MPEG-H}-VL_{total}$=0 ms+300 ms−70 ms=230 ms.

The source configures its outputs so that the video is 230 ms behind the audio. The system achieves perfect lipsync.

For example, example 5 (A and B) demonstrates, that the as the video rendering device 592E (or 592H) may be configured to pass through audio data from a source device 500E (or 500H) to an audio playback device 582E (or 582H) and to provide an device-individual audio decoding latency of the audio playback device 582E (or 582H) to the source device 500E (or 500H) and to negotiate an audio decoding latency with the source device 500E (or 500H) based on the audio decoding latency of the audio playback device 582E (or 582H), that is, e.g. to provide possible latency values to the source device 500E (or 500H). Thus, perfect lipsync may be achieved even if the audio playback device, even an audio playback device in the second audio mode, is incapable of communicating with the source device.

C.1.3.6. Example 6

Alternative A:

FIG. 5F shows a schematic representation of a given setup comprising a STB 500F, e.g. a source device 100;200;400, a soundbar 582F, e.g. an audio playback device 282;482; 682;782, a TV 592F, e.g. a video rendering device 292;892; 992, and another device 581F in the audio path and in the video path.

1) After the discovery of the topology, the source 500F has all information about the audio and video path, but the source sees the TV 592F as audio sink.
2) The EDID states: $AL_{EDID_{source}}$=90 ms, $VL_{EDID_{source}}$=90 ms (514F, 524F). That means the device 581F and the TV 592F are adding their audio latency for the none-MPEG-H case to the EDID information 514F.
3) Via CEC $AL_{MPEG-H}$ is reported by the TV to 275 ms. As in the examples before the TV adds his MPEG-H pass to S/PDIF latency to the default MPEG-H audio decoding latency for the soundbar.

$AL_{MPEG-H}=AL_{MPEG-H_{DEFAULT}}+AL_{pass\ to\ S/PDIF_{TV}}$=275ms.

4) The TV 592F and the device 581F report five values via CEC DaNoL but only the bold values are used in this particular case:

[$AL_{none\ MPEG-H}$=70 ms, VL=70 ms, $AL_{MPEG-H}$=275 ms, $AL_{MPEG-H\ passthrough}$=20 ms, $VL_{current}$=70 ms]$_{TV}$

[$AL_{none\ MPEG-H}$=20 ms, VL=20 ms, $AL_{MPEG-H}$=0×ff, $AL_{MPEG-H\ passthrough}$=10 ms, $VL_{current}$=20 ms]$_{Device}$ 5) The total video latency is calculated via (3) to $VL_{total}=VL_{current_{device}}+VL_{current_{TV}}$=20 ms+70 ms=90 ms.

6) The audio path latency is calculated via (7) to $AL_{path_{MPEG-H}}=AL_{MPEG-H\ passthrough_{device}}$=10ms 7) Step seven doesn't apply if only devices with DaNoL capability are used.
8) The STB calculates the additional video delay with the information of the last steps after (1):

$VL_{additional}=AL_{path_{MPEG-H}}+AL_{MPEG-H}-VL_{total}$=10 ms+275 ms−90 ms=195 ms.

The source configures its outputs so that the video is 195 ms behind the audio. The system achieves perfect lipsync.

Figure 5I:
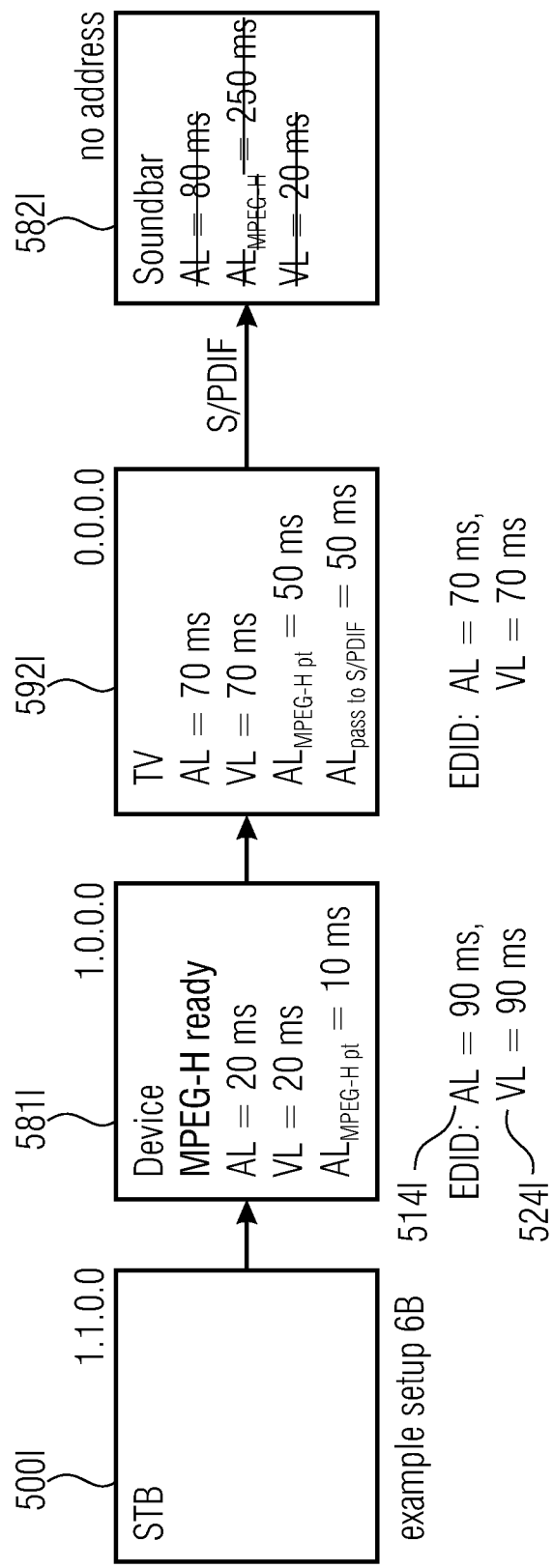

Alternative B (optional):

FIG. 5I shows a schematic representation of a given setup comprising a STB 5001, e.g. a source device 100;200;400, a soundbar 5821, e.g. an audio playback device 282;482; 682;782, a TV 5921, e.g. a video rendering device 292;892; 992, and another device 5811 in the audio path and in the video path.

In the alternative B, the TV 5921 has a higher passthrough latency $AL_{MPEG-H_{pt}}$ 50 ms compared to the passthrough latency $AL_{MPEG-H\ pt}$=25 ms of the TV 592F of alternative A. A higher passthrough latency may arise, for example, if the TV needs to repack the data, e.g. the audio data.

1) After the discovery of the topology, the source has all information about the audio and video path, but the source sees the TV as audio sink.
2) The EDID states: $AL_{EDID_{source}}$=90 ms, $VL_{EDID_{source}}$=90 ms. That means the device and the TV are adding their audio latency for the none-MPEG-H case to the EDID information.
3) Via CEC $AL_{MPEG-H}$ is reported by the TV to 300 ms. As in the examples before the TV adds his MPEG-H pass to S/PDIF latency to the default MPEG-H audio decoding latency for the soundbar.

$AL_{MPEG-H}=AL_{MPEG-H_{DEFAULT}}+AL_{pass\ to\ S/PDIF_{TV}}$=300ms.

4) The TV and the device report five values via CEC DaNoL but only the bold values are used in this particular case:

<Latency Info >→[$AL_{MPEG-H}$=300 ms, $AL_{MPEG-H\ passthrough}$=20 ms, $VL_{current}$=70 ms]$_{TV}$
<EDID Latency Info >→[$AL_{none\ MPEG-H}$=70 ms, VL=70 ms]$_{TV}$<Latency Info >→[$AL_{MPEG-H}$=0×ff, $AL_{MPEG-H\ passthrough}$=10 MS, $VL_{current}$=20 ms]$_{Device}$ <EDID Latency Info >→ [$AL_{none\ MPEG-H}$=20 ms, VL=20 ms]$_{Device}$ 5) The total video latency is calculated via (3) to $VL_{total}=VL_{current_{device}}+VL_{current_{TV}}$=20 ms+70 ms=90 ms.

6) The audio path latency is calculated via (7) to $AL_{path_{MPEG-H}}=AL_{MPEG-H\ passthrough\ device}$=10 ms 7) Step seven doesn't apply if only devices with DaNoL capability are used.
8) The STB calculates the additional video delay with the information of the last steps after (1):

$VL_{additional}=AL_{path_{MPEG-H}}+AL_{MPEG-H}-VL_{total}$=10 ms+300 ms−90 ms=220 ms.

The source configures its outputs so that the video is 220 ms behind the audio. The system achieves perfect lipsync.

For example, example 6 (A and B) demonstrates, that, the source device 500F (or 500I) may handle situations, in which a device 581F (or 581I) in the audio path and in the video path communicates its device-individual latency information. In such a case, the source device 500F (or 500I) may be able to adjust the time alignment independently from the total audio latency information 514F (or 514I) and the total video latency information 524F (or 524I).

Figure 4:
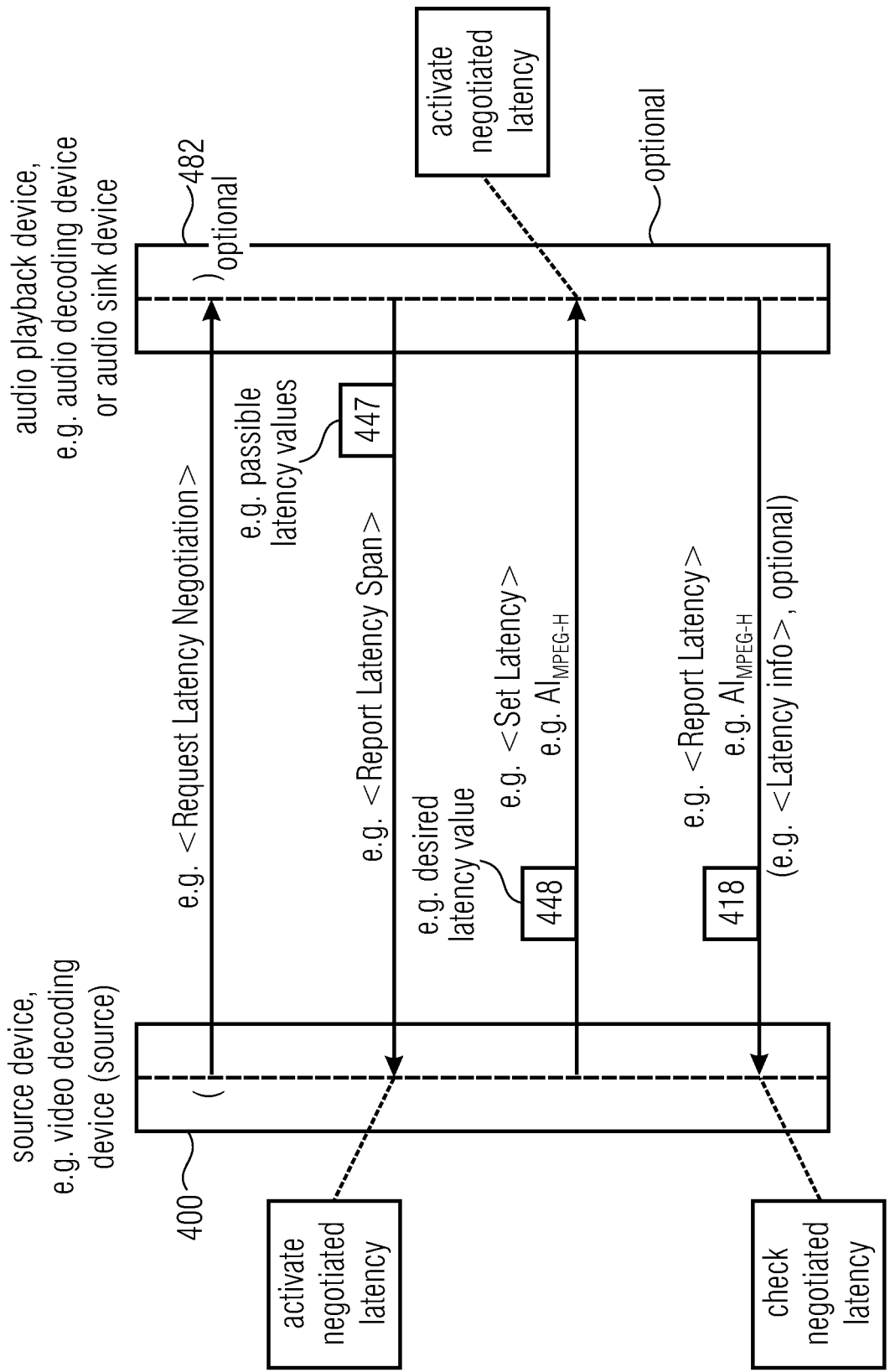
FIG. 4 shows a schematic flow chart of a latency negotiation block according to an embodiment.

D) Latency Negotiation According to FIG. 4.

FIG. 4 shows a flow chart for a latency negotiation of a decoding latency performed by a source device 400 according to an embodiment. The source device 400 may correspond to the source device 100;200. For example, the latency negotiation may be performed by the latency negotiator 343 of the source device 300. FIG. 4 shows a latency negotiation between the source device 400 and an optional audio playback device 482, for example the audio playback device 282, of a decoding latency 418 of the audio playback device 482. The decoding latency 418 may correspond to the audio decoding latency 218;318. The audio playback device 482 is configured to decode audio data, for example, the audio data 160, 260. The audio playback device 482 is connected to a digital media interface of the source device 400 via an audio path, for example the audio path 180, 280. The audio playback device 482 is configured to provide audible audio information based on audio data provided by the source device 400, for example the audio data 160, 260.

For example, the source device 400 may be configured to negotiate the decoding latency 218 with the audio playback device 482 based on a video decoding latency of the source device 400. The video decoding latency may, for example, be a latency associated with a decoding of an encoded representation of video data. For example, the video decoding latency may be associated with a decoding of the encoded video representation 267 by the decoder 266 to obtain the video data 265 represented as a decoded video representation.

As a result of the latency negotiation of the source device 400 with the audio playback device 482, an audio decoding latency 418 of the audio playback device 482 may be adapted. The source device 400 is configured to adjust a time alignment, for example the time alignment 150, 250, 350, according to a change of the audio decoding latency 418 of the audio playback device 482.

In other words, the source device 400 is configured to negotiate a decoding latency 418 with an audio playback device 482, and to adjust the time alignment in dependence on the negotiated decoding latency.

A negotiation of the audio decoding latency may be initiated by the source device 400, for example by sending a request to negotiate the audio decoding latency to the audio playback device 482. For example, the source device 400 may request a latency negotiation after a start-up of the source device 400.

Alternatively or additionally, a latency negotiation may be initiated by the audio playback device 482. For example, the audio playback device 482 may request a latency negotiation with the source device 400 by sending a message to the source device 400. For example, the audio playback device 482 may request a latency negotiation due to a change of the audio decoding latency 418 of the audio playback device 482.

For example, the audio playback device 482 may initiate a latency negotiation by communicating possible latency values 447 to the source device 400. The audio playback device 482 may also communicate possible latency values to the source device 400 upon request or upon an initiation of a latency negotiation by the source device 400.

The source device 400 may be configured to select a desired latency value 448 out of the possible latency values 447 communicated by the audio playback device 482. For example, the source device 400 may select the desired latency value 448 out of the possible latency values communicated by the audio playback device 482 based on the video decoding latency of the source device 400. For example, the source device 400 may select the desired latency value 448 so that the desired latency value 448 corresponds to the video decoding latency.

The audio playback device 482 may be configured to communicate the possible latency values 447 as a latency list information comprising a set of latency values or may be configured to communicate the possible latency values 447 as a latency span information comprising a span of possible latency values.

The source device 400 is configured to communicate the desired latency value 448 to the audio playback device 482.

In other words, the source device 400 is configured to obtain a latency span information describing a span of possible latency values 447 from the audio playback device 482, or to obtain a latency list information describing one or more possible latency values 447 from the audio playback device 482. The source device 400 is further configured to select a desired latency value 448 on the basis of the latency span information or the latency list information. The source device 400 is further configured to instruct the audio playback device 482 to use the desired latency value 482. The source device 400 is further configured to adjust the time alignment in dependence on the selected desired audio playback latency value 448.

The source device 400 is configured to check a success of the latency negotiation. That is, the source device 400 is configured to assume, if the audio playback device 482 adapted its audio decoding latency 418 according to the desired latency value 448 or if the audio playback device 482 kept an original value for the audio decoding latency 418 after the latency negotiation. The source device 400 is configured to adjust the time alignment based on the desired latency value 448 or based on an original value of the audio decoding latency 418 of the sink device 482 depending on its assumption regarding the success of the latency negotiation. For example, the source device 400 is configured to receive a message from the audio playback device 482 comprising the audio decoding latency 418.

Optionally, the source device 400 may be configured to renegotiate the audio decoding latency 418 after a completed latency negotiation, for example by requesting a latency negotiation or by receiving a request for a latency negotiation, for example an information about possible latency values 447.

In other words, the source device 400 is configured to verify whether the audio playback device 482 uses the selected desired latency value 448, as instructed. The source device 400 is further configured to consider a default latency value if the audio playback device 482 fails to use the selected desired latency value 448.

The source device 400 is configured to receive a latency negotiation request comprising a latency span information 447 describing a span of possible latency values from the audio playback device 482, or comprising a latency list information describing one or more possible latency values from the audio playback device 482. The source device 400 is further configured to select a desired latency value 448 on the basis of the latency span information or the latency list information.

For example, the latency negotiator 343 may be configured to communicate (or a latency negotiation may be performed) using CEC commands, for example the commands described in the chapter D.1, and/or according to the messages and rules as described in Tab. 2, or alternatively and optionally as described in Tab. 3.

For example, the latency negotiator 343 may be configured to transmit one or more of the messages shown in Tab. 2, or alternatively and optionally in Tab. 3, to one or more sink devices (e.g. using an individual direct addressing of a sink device, or a broadcast) and (if applicable) to receive a respective answer message from one or more sink devices (e.g. in a chain of sink devices), and to use an information included in the respective answer message (e.g. for negotiating an audio decoding latency 318).

The following section D.1 describes embodiments of a latency negotiator. The features, functionalities and details described in section D.1 can optionally be introduced into any of the embodiments described herein, in particular into the latency negotiator 343, both individually and taken in any combination. The description in sections D.1.1 and 1.2 refer to FIG. 4.

D.1. CEC Discovery and Negotiation of Latencies (CEC DaNoL)

It should be noted that, in the following description, references to other embodiments, e.g. to embodiments of FIGS. 1 to 9 should be considered as examples. Such references are not intended to imply that any or all of the features shown in FIGS. 1 to 9 of must be present in the following embodiments.

The features, functionalities and details described in this chapter can optionally be introduced into any of the embodiments described herein (also in the claim set), both individually and taken in combination.

Messages and other features and details described in this chapter may, for example, be implemented individually or in any combination of them in a the source device 100;200; 400, in particular in the discoverer 341, the latency negotiator 343 and/or the collector 344, and/or in a sink device.

Messages and other features and details described in this chapter may, for example, be used to discover devices in a video path and/or an audio path (e.g. section D.1.2.1.), to communicate device-individual (audio and/or video) latency information, and/or to negotiate a decoding latency (e.g. section D.1.2.2.).

D.1.1. Messages

The following messages (or, optionally, a subset thereof) are used for the latency discovery and negotiation feature:

<Report Latency Span>, <Report Possible Latency Values>, <Set Latency>, <Request Latency Negotiation>, <Report Latency>, <Request Report Latency>, <Latency Info>, <Request Latency Info>, <Latency Not Supported>, <Unsupported Audio Codec>.

All of these messages are extensions of the <Vendor Command With ID> (HDMI 1.4b, CEC15, CEC Table 16), where the Vendor ID is the MA-L of the Fraunhofer IIS: '12:34:56' (This is a dummy variable. The real MA-L is to be defined).

For details of which messages are mandatory in some embodiments, see Tab. 2. Other embodiments may optionally use a subset of these messages and/or additional messages.

For example, alternatively the following messages (or, optionally, a subset thereof) may optionally be used for the latency discovery and negotiation feature:

<Report Latency Span>, <Report Possible Latency Values>, <Set Latency>, <Request Latency Negotiation>, <Latency Info>, <Request Latency Info>, <EDID Latency Info>, <Request EDID Latency Info>, <Latency Not Supported>, <Unsupported Audio Codec>.

All of these messages are extensions of the <Vendor Command With ID> (HDMI 1.4b, CEC15, CEC Table 16), where the Vendor ID is the CID of the Fraunhofer IIS: BA-C4-85 (hex); BAC485 (base 16).

For details of which messages are mandatory in some optional embodiments, see Tab. 3.

D.1.2. Feature Description (Details are Optional)

This feature allows, for example, all devices in an HDMI setup to communicate latency values. This is especially interesting for an audio bitstream decoding device (sink), e.g. the audio playback device 282;482;682;782, and a video decoding device which is the active source (source), e.g. the source device 100;200;400. This feature enables, for example, a source to ensure lipsync by gaining all relevant information from devices in the audio and video path and the sinks via CEC messages. The feature is, in some cases, used since modern audio codecs like MPEG-H fall into the in HDMI marked as forbidden case Video Latency+20 ms<Audio Latency, see, for example, HDMI 2.0a 10.6.1.1 table 10-26 case 4.

The mechanism is, in some cases, needed to achieve lipsync in a complicated HDMI path. But it can also be used to negotiate another audio latency than the default audio latency of a certain codec. The communication is done, for example, via CEC Vendor Specific Commands described in HDMI 1.4b, CEC 13.9. Both devices shall only utilize a non-default latency value after the negotiation and confirmation between them has been successfully completed by following the procedures specified in this section.

For example, all CEC messages described in this document have the Opcode <Vendor command With ID> with the corresponding value of '0xA0'. An overview of the command is give here:

[logical address Tx] [logical address Rx] [opcode 0xA0] [Vendor ID] [Vendor Specific data]

The logical address is defined, for example, in HDMI 1.4b, CEC 10.2. The vendor ID is, for example, always the MA-L of the Fraunhofer IIS: '12:34:56'. Alternatively and optionally, the vendor ID may always the CID of the Fraunhofer IIS: BAC485. The Vendor Specific data is, for example, occupied by a Vendor Opcode of 1 Byte followed, for example, by the three bytes long short audio descriptor (SAD). Afterwards are, for example, maximum seven one byte parameters corresponding to the Vendor Opcode:

[Vendor Specific Data]=[Vendor Opcode] [SAD] [parameter 1] [parameter 2] . . . [parameter 7]

It is in some cases not allowed to use more than 7 parameters since the data of one [Vendor Specific Data] block is, for example, limited to 11 Bytes see, for example, HDMI 1.4b CEC 17 table 29 with 'Name' [Vendor Specific Data] in column 'Purpose'.

The short audio descriptor (SAD) is explained, for example, in HDMI 1.4b which refers to CTA-861-G 7.5.2 and 7.5.3. One SAD contains, for example, a clearly defined audio encoding and associated parameters. This is, in some cases, used since the lipsync problem might be different for varying audio codecs and even for different flavors of them. The SADs of the audio decoding device and the source should (or, in some cases, must) contain the same 'Audio Format Code' and the same 'Audio Coding Extension Type Code'. The accordance of all other Bits may depend on the codec. The source device shall, for example, write the SAD, differently as in the EDID, only with one specific codec flavor. For example: A source device supports audio passthrough of flavors A and B of a codec. The EDID-SAD will state the capability of A and B. But for the CEC lipsync discovery the source will negotiate separately with one SAD only containing A and one only containing B. Every codec may provide (or, in some cases, has to provide) the handling information for every flavor or all flavors have the same lipsync adjustment. In general, the SAD of the source should be a subset of the SAD of the decoding device.

For example, if the messages refers to the SAD of the currently played audio stream, or the last played one, every bit of the SAD should optionally be set to zero. The 3 byte referring to the current or latest SAD may, for example, look like this: 00:00:00.

To transmit the latency it is, for example, converted into one byte via this formula, which is the same as in HDMI 2.0a 10.7.1 table 10-28 or HDMI 1.4b 8.3.2 'audio latency':

$$\text{latency}_{converted\ to\ one\ byte} = [\text{latency}_{in\ ms}/2+1]_{HEX}$$

The negotiable latency is, for example, in the region of [0 ms, 500 ms] or converted [0 x01, 0xFB]. If a device does not support a specific latency stated in the <Latency Info> message it shall, for example, report 0xff. For example, all other values are reserved.

All features of this paper can, in some cases, only be used after the vendor functionality has been activated (see HDMI 1.4b CEC 13.9.2).

D.1.2.1. Discovery of Latencies (Details are Optional)

In case where a source wants to calculate the latency of a chain of multiple devices, then it shall send a directly addressed <Request Latency Info> message to all relevant devices. Note: The algorithm to set the delays in a source device in case of the audio codec MPEG-H is contained in another chapter called: MPEG-H Adjust Source Delay Algorithm (MASDA).

The <Request Latency Info> message shall be answered, for example, with a <Latency Info> message, for example, addressed to broadcast which consists of, for example, five parameters. These parameters are, for example, in this order: the audio latency for none codec case as added in EDID (progressive value), the video latency as added in EDID (progressive value), the codec passthrough latency, the codec decoding latency and the current video latency. The first two parameters are, for example, the same as the device adds in its EDID Vendor-Specific Data Block (HDMI VSDB). It is possible for a codec to define two additional values and add them afterwards.

Optionally, if a device changes an internal parameter and therefore the data of the <Latency Info> message, it shall send this message with the new parameters to inform the source. This happens for example if the TV changes its video mode resulting in a different current video latency.

Alternatively, according to an optional example, a <Request Latency Info> message shall be answered with a <Latency Info> message addressed to broadcast which consists of three parameters. These parameters may, for example, be in this order: the codec decoding latency, the codec passthrough latency and the current video latency. It is possible for a codec to define four additional values and add them afterwards.

According to this optional example, if only the third parameter [Current video latency] of the <Latency Info> message changes in a device like a TV, for example due to a switching between video modes, and if the current video latency is equal for all audio modes, it may be allowed to send the <Latency Info> message addressed to broadcast with the SAD 0xffffff with latency parameters 1 and 2 also set to 0xff.

According to this optional example, a <Request EDID Latency Info> message shall be answered with a <EDID Latency Info> message, for example, addressed to broadcast which consists, for example, of four parameters. These parameters are, for example, in this order: the audio latency (for none codec case) as added in EDID (progressive value), the video latency as added in EDID (progressive value), the audio latency (for none codec case) as added in EDID (interleaved value), the video latency as added in EDID (interleaved value). These parameters are, for example, the same as the device may add in its EDID Vendor-Specific Data Block (HDMI VSDB). If the progressive and the interleaved case have the same latencies, for example, only the first two parameters are transmitted.

D.1.2.2. Latency Negotiation (Details are Optional)

In the case a source device wants to initiate the latency negotiation, then it shall send, for example, a directly addressed <Request Latency Negotiation> message to the audio decoding device. Then the audio decoding device shall start the initiation of latency negotiation.

In the case of latency negotiation initiation, an audio decoding device shall, for example, send a directly addressed <Report Latency Span> (or <Report Possible Latency Values>) message to the source. For example, if the Follower sends a <Feature Abort>['Unrecognized opcode'] message or no related message within the required maximum response time specified, for example, in HDMI 1.4b, CEC 9.2 (=1 s, for example), then the MPEG-H decoding device, for example, assumes that the video decoding device does not support latency negotiation.

If the Follower responds, for example, with a directly addressed <Latency Not Supported> message, the audio decoding device knows that the Follower is a device capable of latency negotiation, but does not support the requested latency for the requested codec type. If the Follower responds, for example, with a directly addressed <Unsupported Audio Codec> message the SAD of the audio decoding device contains an unknown audio codec for the source.

If the Follower picks one latency out of the reported span or out of the reported values, it will, for example, activate this latency and transmit it via a directly addressed <Set Latency> message.

In case the latency parameter of the <Set Latency> message is within the latency span of the audio decoding device, it shall, for example, use this latency and send a directly addressed <Report Latency> message to the source, or, according to an optional example, broadcast a <Latency Info> message or send a <Latency Info> message to the source In case the latency parameter of the <Set Latency> message is not within the latency span of the audio decoding device, it shall, for example, use the default latency and send a directly addressed <Latency Not Supported> message to the source.

For example, the source waits after the <Set Latency> message for a <Report Latency> message within the required maximum response time specified, for example, in HDMI 1.4b, CEC 9.2. If there is no <Report Latency> message the soundbar or their source will not use a negotiated latency.

According to an optional example, the source waits after the <Set Latency> message for a <Latency Info> message within the required maximum response time, for example, specified in HDMI 1.4b, CEC 9.2. If there is no <Latency Info> message the source will not use a negotiated latency.

This way the latency is checked, for example, on both sides before it is used. The <Latency Not Supported> message can be answer with another <Latency Not Supported> message.

The normal negotiation process is presented, for example, in FIG. 4.

Optionally, in case the video decoding device wants to renegotiate it sends, for example, a directly addressed <Request Latency Negotiation> message to the audio decoding device.

Optionally, in case the audio decoding device wants to renegotiate it sends, for example, a directly addressed <Report Latency Span> or <Report Possible Latency Values> message to the video decoding device. The span should contain the new latency value.

D.1.2.3. Update of Information (Optional)

Every device which reports dynamic values, for example, in the <Latency Info> message broadcasts this message after the value changed. For example: If a TV changes its video mode from movie to gaming it needs to send <Latency Info> to update the [current video latency] value of this message, for example, in every listening device, or at least in some listening devices.

D.1.3. Examples (Details can optionally be included into the embodiments, both individually and taken in combination; Specific values, identifiers, message names are to be considered as being optional) In this section the transmitted data is shown as hex values. Logical parts are separated by a ':' sign.

In this sections, exemplary embodiments are described. For example, a TV may serve as a source device, e.g. the source device 100;200;400 and as a video rendering device, e.g. the video rendering device 292;892;992, and a soundbar connected to the TV may serve as an audio playback device, e.g. the audio playback device 282;482;692;792.

D.1.3.1. Initiation of latency negotiation

A MPEG-H soundbar with the logical address 0 ×5 (audio system) is via ARC connected to a TV with the logical address of 0 ×0 (TV). The MPEG-H TV is delaying its video signal so that it is in lipsync with the audio of the soundbar which is assumed to have the default MPEG-H decoding latency of 250 ms. The soundbar has the capability of smaller latency values down to 100 ms. The TV is in a special image enhancing mode which needs 150 ms or at maximum 150 ms video latency. The negotiation between these two devices is shown here:

Soundbar_Tx: 50:A0:654321:01:SAD_MPEG-H:33:7E
TV_Tx: 05:A0:654321:03:SAD_MPEG-H:4C
Soundbar_TX: 50: A0:654321:05:SAD_MPEG-H: 4C This communication is explained in more details Tab. 1.

Alternatively, according to an optional embodiment, the Vendor ID has the value BAC485 and/or the soundbar responds to the <Set Latency> message with a <Latency Info> message, according to the set of messages shown in Tab. 3. According to this optional example, the negotiation between these two devices may be described as shown here:
Soundbar_Tx: 50: A0:BAC485:01:SAD_MPEG-H: 33:7E
TV_Tx: 05: A0:BAC485:03:SAD_MPEG-H: 4C
Soundbar_TX: 50: A0: BAC485:05:SAD_MPEG-H: 4C: 0C: 00

This communication is explained in more details in Tab. 4.

In both examples shown above, without latency negotiation the TV delays its video (in decoded form) for 100 ms to ensure lipsync. The successful negotiation leads to no additional video delay in the TV.

D.1.3.2. Termination of Latency Negotiation and Errors
D.1.3.2.1. Audio Codec Mismatch A soundbar tries to initiate the latency negotiation, but the TV reacts with a <Unsupported Audio Codec> message since it dones't support the audio codec flavor stated in the SAD_A.
Soundbar_Tx: 50: A0:654321: 01:SAD_A:33:7E
TV_Tx: 05: A0:654321: 0A:SAD_B Alternatively, according to an optional embodiment, the Vendor ID has the value BAC485, so that the negotiation between these two devices may be described as shown here:
Soundbar_Tx: 50: A0:BAC485:01:SAD_A: 33:7E
TV_Tx: 0 5: A0:BAC485:0A:SAD_B D.1.3.2.2. No Matching Negotiatable Latency A soundbar tries to initiate the latency negotiation and sends 3 possible latency values with the directly addressed <Report Possible Latency Values> message. None of these latencies suit the TV. That is why it responds with a directly addressed <Latency Not Supported> message.
1 Soundbar_Tx: 50: A0:654321: 02:SAD_MPEG-H: 4C: 59:6F
(150 ms, 176 ms, 220 ms)
TV_Tx: 05: A0:654321: 09:SAD_MPEG-H Alternatively, according to an optional embodiment, the Vendor ID has the value BAC485, so that the negotiation between these two devices may be described as shown here:
1 Soundbar_Tx: 50: A0:BAC485:02:SAD_MPEG-H: 4C: 59:6F
(150 ms, 176 ms, 220 ms)
TV_Tx: 05: A0:BAC485:09:SAD_MPEG-H The soundbar knows now, that the TV is able to negotiate via CEC. Therefore the soundbar could make another attempt with different latency values.

D.1.3.3. Latency Information Exchange

A Playout device (logical address 0 ×1) asks a soundbar (logical address 0 ×5) for its latency values. The soundbar responds with its audio latency for non MPEG-H added in the EDID (progressive value), video latency added in the EDID (progressive value), MPEG-H passthrough latency, MPEG-H audio decoding latency and the current video latency. This information is useful for a source device to ensure lipsync.
Playout Tx: 15: A0:654321: 07:SAD_MPEG-H
Soundbar_Tx: 5F:A0:654321: 08:SAD_MPEG-H: 29:29: 0C: 4C:FF
(80 ms, 80 ms, 22 ms, 150 ms, not available)

Alternatively, according to an optional embodiment, the Vendor ID has the value BAC485, and the communication may follow the optional set of messages described in Tab. 3, so that the information exchange between these two devices may be described as shown here:
A Playout device (logical address 0 ×1) asks a soundbar (logical address 0 ×5) for its latency values. The soundbar responds with its MPEG-H audio decoding latency, MPEG-H passthrough latency and the current video latency. This information is useful for a source device to ensure lipsync.
Playout Tx: 15: A0:BAC485:06:SAD_MPEG-H
Soundbar_Tx: 5F:A0:BAC485:05:SAD_MPEG-H: 4C: 0C:FF
(150 ms, 22 ms, not available)

Also, the playout devcie asks for the static audio and video latency values stored in the EDID.

Playout Tx: 15: A0:BAC485:08:SAD_MPEG-H
Soundbar_Tx: 5F:A0:BAC485:07:SAD_MPEG-H: 29:29 (80 ms, 80 ms)

For example, if interlaced and progressive audio/video latencies are equal, only one pair is transmitted. That is what happened in the example above, where the soundbar reports the progressive (and interlaced) audio latency and the progressive (and interlaced) video latency.

It is strongly recommended (and suggested in MPEG-H Adjust Source Delay Algorithm), that the latency negotiation is done before the latency information exchange. In this way the negotiated latency can be checked again.

Figure 6:
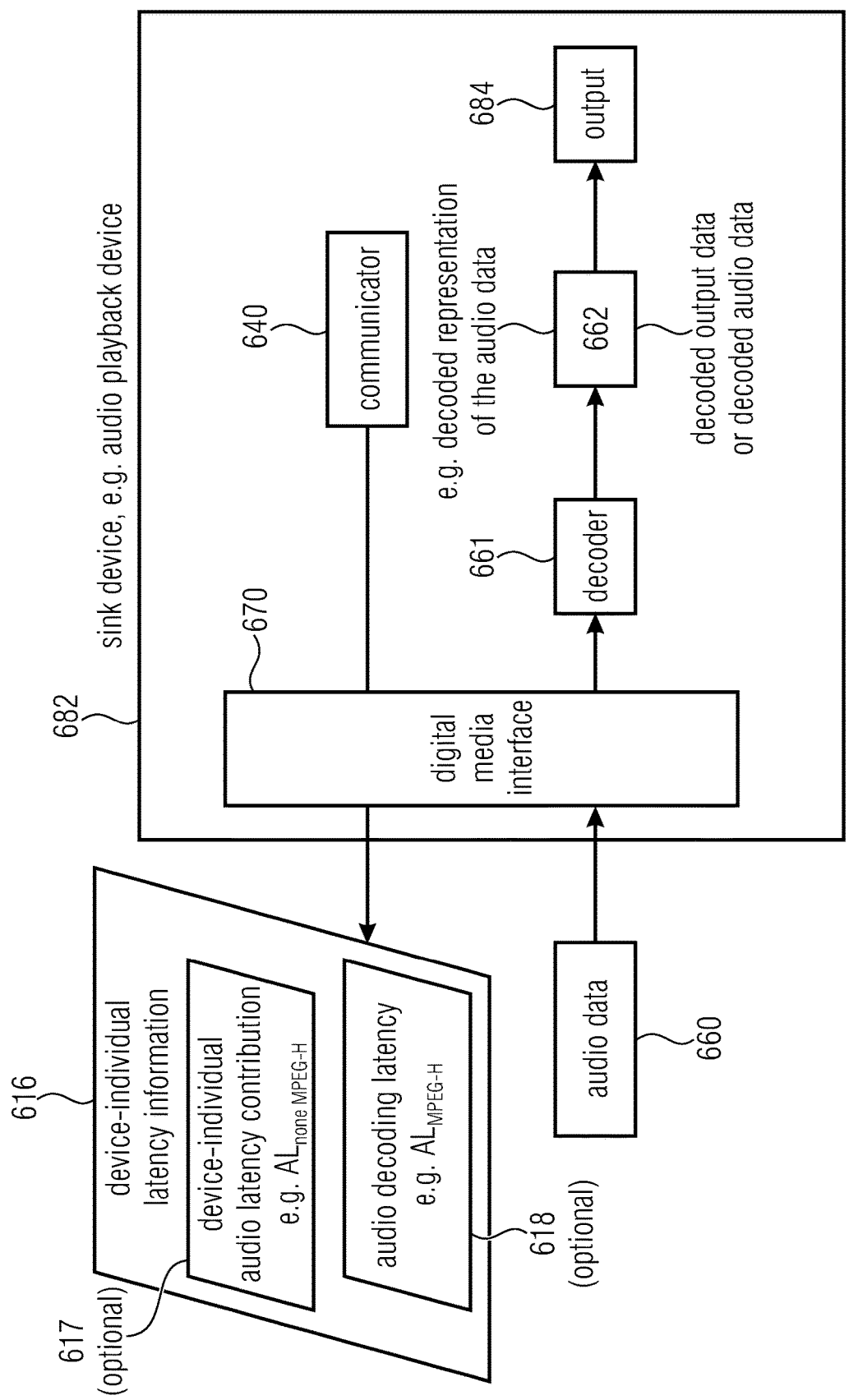
FIG. 6 shows a schematic representation of a sink device, e.g. an audio playback device, according to an embodiment.

E) Sink Device According to FIG. 6

FIG. 6 shows a schematic representation of a sink device 682 according to an embodiment. The sink device 682 may be an audio playback device, for example the audio playback device 282.

The sink device 682 is configured to receive audio data 660 via a digital media interface 670. The sink device 682 comprises a decoder 661 configured to decode the received audio data 660, to obtain decoded audio data 662. The sink further comprises an output 684 configured to output the decoded output data 662. The sink device comprises a communicator 640 configured to report a device-individual latency information 616 which comprises latency information associated with a playback using the first audio mode, for example the device-individual audio latency contribution 617, and latency information associated with a playback using second audio mode, for example the audio decoding latency 618, in response to a request from a source device.

The sink device is configured receive the audio data 660 in an encoded representation. The task of the sink device 682 is to obtain the decoded audio data 662 from the encoded audio data 660 and to provide the decoded audio data 662, for example as an analog signal or an audible signal. The sink device may be configured to use various audio modes for decoding and/or for providing the decoded audio data 682.

For example, the sink device 682 may be configured to operate in a first audio mode, for example the first audio mode described with respect to the source device 100;200; 400, or to operate in a second audio mode, for example the second audio mode described with respect to the source device 100;200;400. The audio mode may refer to a setting of the decoder 661, the setting determining a decoding of the audio data 660 by the decoder 661. The output 684 may be configured to output audible audio data or to provide a decoded representation 662 of the audio data 660, e.g. the decoded audio data 662 or the decoded output data 662.

It is pointed out that the sink device 682 according to FIG. 6 may optionally be complemented by all features, functionalities and details that are described herein with respect to the other source devices. The respective features, functionalities and details may optionally be added to the sink device 682 both individually or in any combination of them.

Figure 7:
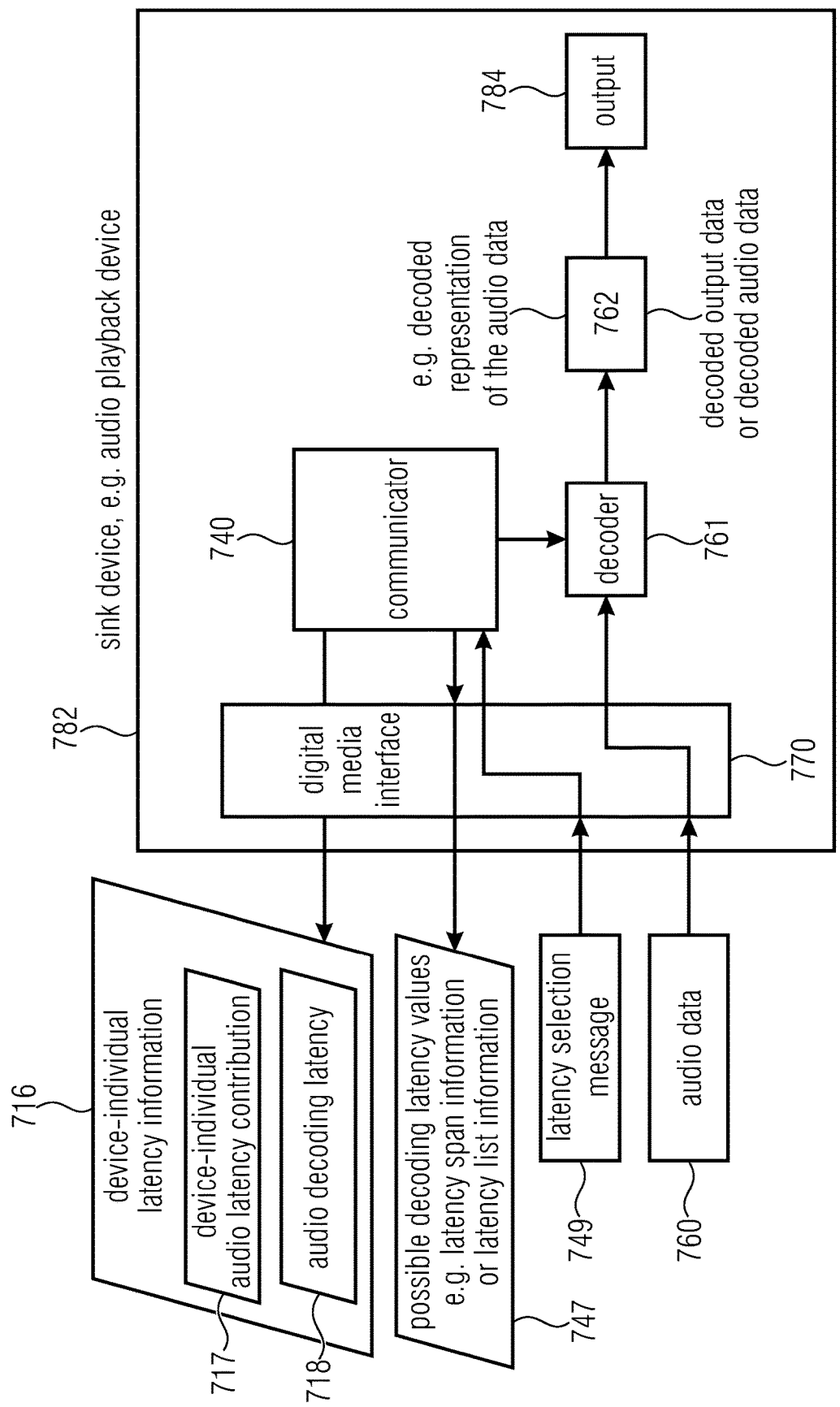
FIG. 7 shows a schematic representation of a sink device, e.g. an audio playback device, according to a further embodiment.

F) Sink Device According to FIG. 7

FIG. 7 shows a schematic representation of the sink device 782 according to an embodiment. The sink device 782 may corresponds to the sink device 682.

The sink device 782 is configured to receive, as an input, audio data 760 in an encoded representation, e.g. the audio data 660, via a digital media interface 770. The digital media interface 770 may correspond to the digital media interface 670. The digital media interface may be of an equal or similar type as the digital media interface 170;270 or may at least be configured to facilitate a communication with the digital media interface 170;270.

The sink device 782 comprises a decoder configured to decode the audio data 760 to obtain the decoded audio data 762, for example by using the first audio mode or the second audio mode. The first audio mode and the second audio mode may correspond to the respective first and second audio modes described in chapters A, B, C, D. The sink device 782 comprises an output 784 configured to provide the decoded audio data 762.

The decoding of the audio data may involve a latency, that is, a time offset between a reception of a signal representing encoded audio data and the provision of a signal representing decoded audio data.

As the sink device 782 may use various audio modes for decoding the audio data 760, a latency for decoding the audio data 760 may change accordingly. Thus, an audio mode may comprise a latency for decoding and/or providing, e.g. replaying, audio data, which is specific for the audio mode.

The sink device comprises a communicator 740 configured to communicate, for example, via the digital media interface 770 or via another wired or wireless connection. That is, the communicator 740 may be configured to send and/or receive messages. The communicator 740 may be configured to communicate to a source device, e.g. the source device 100;200;400 or to another sink device or another device connected to the digital media interface 770.

The communicator 740 is configured to communicate a latency of the sink device 782 by providing a device-individual latency information 716, which may correspond to the device-individual latency information 216;316;616.

The device-individual latency information 716 comprises latency information which is specific to an audio mode of the sink device. A latency of the first audio mode is referred to as device-individual audio latency contribution 717 and may correspond to the device-individual audio latency contribution 217;317;616. A latency of the second audio mode is referred to as audio decoding latency 718, and may correspond to the audio decoding latency 218;318;718. The device-individual latency information 716 comprises the device-individual audio latency contribution 717 and/or the audio decoding latency 718.

The device-individual audio decoding latency 717 may be associated to a playback of the decoded audio data 762, that is, a latency between a reception of the audio data 760 to a playback of the decoded audio data 762 as audible audio information.

In other words, the contribution to a total audio latency information provided by the sink device is equal to the latency information associated with a playback using the first audio mode.

As the second audio mode may provide the decoded audio data 762 in a higher quality, a latency of the second audio mode may be larger than a latency of the first audio mode. Therefore, the audio decoding latency 718 may be different from the device-individual audio latency contribution 717.

The audio decoding latency 718 associated with the second audio mode may be variable, so that the sink device 782 may adapt the audio decoding latency 718 within a range or a set of possible latency values 747.

In other words, the sink device 782 is configured to provide a contribution 717 to a total audio latency information, e.g. the total audio latency information 214;314;614 describing a total latency of an audio path for a first audio mode or describing an average total latency of the audio path over a plurality of audio modes, wherein the contribution 717 to the total audio latency information is different from the latency information 718 associated with a playback using a second audio mode.

The sink device 782 may be configured to negotiate the audio decoding latency 718 with another device, for example a source device, for example the source device 100;200;400. The sink device 782 may be configured to adapt the audio decoding latency 718 as a result of negotiating the audio decoding latency 718.

In other words, the sink device 782 is configured to negotiate a decoding latency 718 or a playback latency associated with the second audio mode with a source device.

The sink device 782 is configured to send a message comprising the possible latency values 747, for example in form of a latency span information describing the possible latency values 747 as a span, or in form of a latency list information comprising a the possible latency values 747 as list.

The sink device 782 is further configured to receive a latency selection message 749, which may comprise a desired latency value suggested or requested by another device, for example a source device, for example the desired latency value 448. The sink device is configured to adapt the audio decoding latency 418 according to the desired latency value, if the possible latency values 747 comprise the desired latency value.

The sink device 782 may be configured to provide an information comprising the audio delay information 718, for example the device-individual latency information, after having received a latency selection message 749, so that the information comprises a current value of the audio delay information 718 corresponding to a vaulue of the audio delay information 718 after a decision of the sink device 782, if to adapt the value of the audio delay information 718 according to the latency selection message 749.

In other words, the sink device 782 is configured to provide a latency span information describing a span of possible decoding latency 747 values or playback latency values to the source device, or to provide a latency list information describing one or more possible decoding latency values 747 or playback latency values to the source device. The sink device 782 is further configured to receive a latency selection message 749 from the source device and to set a decoding latency 718 or playback latency in response to the latency selection message 749.

For example, the sink device 782 may be configured to receive one or more of the messages shown in Tab. 2, or alternatively and optionally in Tab. 3, from a source device (e.g. from the source device 100;200400) and to provide a respective answer message (e.g. comprising the information shown in Tab. 2, or alternatively and optionally in Tab. 3, e.g. providing a device-individual latency information 716, or possible latency values 747).

Figure 8:
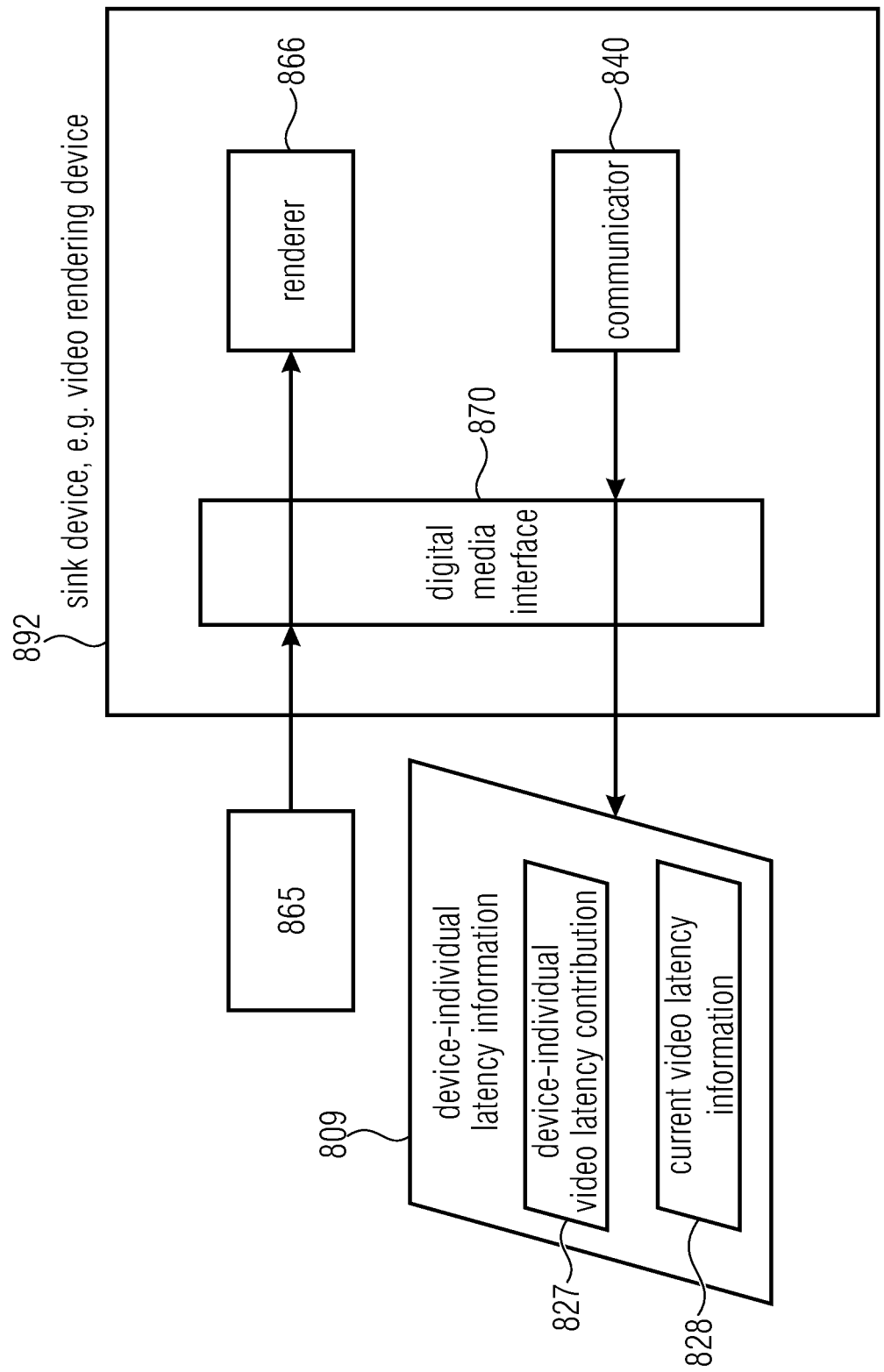
FIG. 8 shows a schematic representation of a sink device, e.g. a video rendering device, according to an embodiment.

G) Sink Device, e.g. Video Rendering Device, According to FIG. 8

FIG. 8 shows a schematic representation of a sink device 892 according to an embodiment. The sink device 892 may be an video rendering device, for example the video rendering device 292.

The sink device 892 is configured to receive video data 865 via a digital media interface 870. The sink device comprises a renderer 866 configured to render the received video data 865. The sink device 892 further comprises a communicator 840 configured to report a device-individual latency information 909 which comprises latency information 827 representing a contribution to a total video latency information describing a total latency of a video path or describing an average total latency of the video path over a plurality of video modes, and latency information 828 representing an actual latency of a rendering of video data.

For example the sink device is configured to receive the video data 265 in a decoded representation, for example the video data 165;265. The task of the sink device is to render the video data 265 to obtain rendered video data. The rendered video data may for example provided to an output, for example a screen or to an output providing an analog signal. The video sink device may be able to use various video modes for rendering the video data 265. By reporting device-individual latency information, the sink device may be able to support an accurate adjustment of a time alignment between a provision of the rendered video data to the output and a playback of related audio data, for example by an audio playback device.

It is pointed out that the sink device 892 according to FIG. 8 may optionally be complemented by all features, functionalities and details that are described herein with respect to the other source devices. The respective features, functionalities and details may optionally be added to the sink device 892 both individually or in any combination of them.

Figure 9:
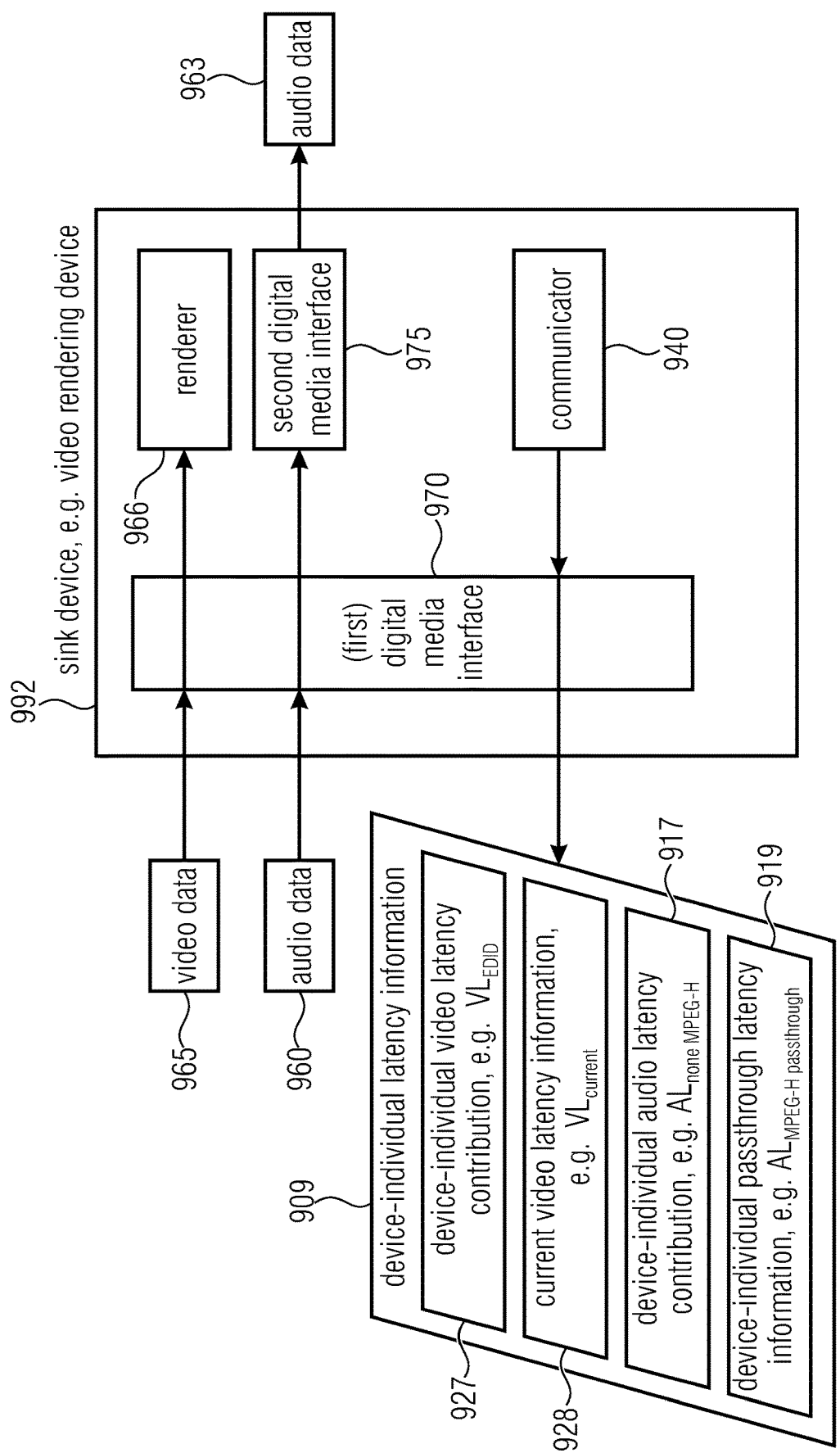
FIG. 9 shows a schematic representation of a sink device, e.g. a video rendering device, according to a further embodiment.

H) Sink Device, e.g. Video Rendering Device, According to FIG. 9

FIG. 9 shows a schematic representation of the sink device 992 according to an embodiment. The sink device 992 may corresponds to the sink device 982.

The sink device 992 is configured to receive, as an input, video data 965 in a decoded representation, e.g. the video data 965, via a digital media interface 970. The digital media interface 970 may correspond to the digital media interface 870. The digital media interface may be of an equal or similar type as the digital media interface 170;270;670;770 or may at least be configured to facilitate a communication with the digital media interface 170;270;670;770.

The sink device 992 comprises a renderer configured to render the video data 965, for example, by using a specific video mode, such as a movie mode or a gaming mode.

The rendering of the video data may involve a latency, that is, a time offset between a reception of a signal representing video data 965 and the provision of rendered video data.

As the sink device 992 may be configured to use a specific video mode out of various video modes for decoding the video data 965, a latency for rendering the video data 965 may change accordingly. Thus, a video mode may comprise a latency for rendering and/or providing, e.g. replaying, video data, which is specific to the video mode.

The sink device comprises a communicator 940 configured to communicate, for example, via the digital media interface 970 or via another wired or wireless connection. That is, the communicator 940 may be configured to send and/or receive messages. The communicator 940 may be configured to communicate to a source device, e.g. the source device 100;200;400 or to another sink device or another device connected to the digital media interface 970.

The communicator 940 is configured to communicate a latency of the sink device 992 by providing a device-individual latency information 909, which may comprise the device-individual video latency information 226;326;626 and optionally also the device-individual audio latency information 216;316;616.

The device-individual latency information 909 comprises latency information which is specific to a video mode of the sink device. The sink device may comprise a standard video mode. A latency of the standard video mode may be referred to as device-individual video latency contribution 927 and may correspond to the device-individual video latency contribution 227;327;827. The renderer 966 may be capable of using a different video mode different from the standard video mode. The different video mode may involve a latency different from the as device-individual video latency contribution 927. A latency of a video mode currently in use during a time of operation of the sink device 992 may be described by a current video latency information 928, for example the current video latency information 228;328;828, which may be part of the device-individual latency information 909.

In other words, the sink device 992 is configured to provide a contribution 927 of the sink device to a total video latency information, for example the total video latency information 227;327, describing a total latency of a video path or describing an average total latency of the video path over a plurality of video modes, wherein the contribution 927 to the total audio latency information or the total video latency information is different from the latency information 928 representing the actual latency of a rendering of video data.

The video rendering device 992 may further be configured to receive audio data 960, for example via the digital media interface 970 (referred to as the first digital media interface 970). The video rendering device 992 may comprise a second digital media interface 975. The video rendering device 992 may be configured to provide or to output the audio data 960 on the second digital media interface 975, for example unchanged. That is, the video rendering device 992 may be configured to pass through or to forward the audio data 960.

For example, the video rendering device 992 may be configured to receive the video data 965 and the audio data 960 simultaneously via the first digital media interface 970, for example from a source device providing the audio data 960 and the video data 965 on one digital media interface. The video rendering device may be configured to render the video data 965 and to pass through the audio data 960, so that the audio data 960 may be received and replayed by an audio playback device, e.g. the audio playback device 282; 682;782. That is, the video rendering device 992 may be able to split the audio path and the video path.

In case the video rendering device 992 is configured to pass through the audio data, the video rendering device 992 may be part of an audio path, for example the audio path 180;280. Therefore, the video rendering device 992 may contribute to a latency of the audio path. The video rendering device 992 may be configured to report a device-individual latency regarding the audio path, for example in form of a device-individual audio latency contribution 917 which is a contribution of the video rendering device 992 to a total audio latency information, e.g. the total audio latency information 214. For example, the device-individual latency information 909 may comprise a device-individual audio latency contribution 917 which may correspond to the device-individual audio latency contribution 217. The device-individual audio latency contribution 917 may for example refer to a latency associated with a playback of the audio data 960 in a first audio mode, for example by an audio playback device connected to the second digital media interface 975. The device-individual audio latency contribution 917 may for example also refer to an average of a plurality of latency values associated with a plurality of audio playback modes.

In other words, the sink device 992 is configured to provide the device-individual latency information 909 such that the device-individual latency information 909 reported by the sink device comprises a latency information associated with a forwarding of audio data 960 from a first digital media interface 970 to a second digital media interface 975.

The video rendering device 992 may, for example, be configured to support the second audio mode. For example, the video rendering device may be configured to pass through the audio data 960 so that the audio data 960 may be replayed using the second audio mode. A latency value describing a latency between a reception of the audio data 960 on the first digital media interface 970 and a provision of the audio data 960 on the second digital media interface 975 for a second audio mode is described by a device-individual passthrough latency information 919, e.g. the device-individual passthrough latency information 219, which may be part of the device-individual latency information 909.

In other words, the device-individual latency information 909 reported by the sink device 992 may also comprise latency information 917 associated with an audio playback using a first audio mode; and/or an average latency information 917 associated with an audio playback using a plurality of different modes; and/or a latency information 919 associated with a passthrough of audio information for the second audio mode.

As the a device-individual passthrough latency information 919 refers to a passthrough of audio data for the second audio mode, it may be different from the device-individual audio latency contribution 917 which may, for example, related to a playback in the first audio mode and/or a pass through of audio data for the first audio mode.

In other words, the sink device 992 may be configured to provide a contribution 917 to a total audio latency information describing a total latency of an audio path for a first audio mode or describing an average total latency of the audio path over a plurality of audio modes, wherein the contribution 917 to the total audio latency information is different from the latency information associated with a passthrough of audio information for the second audio mode.

For example, the sink device 992 may be configured to receive one or more of the messages shown in Tab. 2, or alternatively and optionally in Tab. 3, from a source device (e.g. from the source device 100;200400) and to provide a respective answer message (e.g. comprising the information shown in Tab. 2, or alternatively and optionally in Tab. 3, e.g. providing a device-individual latency information 909).

G) Method for Providing Audio Data and Video Data According to FIG. 10

FIG. 10 shows a block diagram of a method 1000 for providing audio data and video data according to an embodiment.

The method 1000 for providing audio data, e.g. the audio data 160;260;660;760;960, and video data, e.g. the video data 165;265;865;965, on one or more digital media interfaces, e.g. the one or more digital media interfaces 170:270, comprises a step 1010 of automatically adjusting a time alignment, e.g. the time alignment 150;250;350 between a provision of audio data, e.g. the audio data 160;260;660; 760;960, and a provision of video data, e.g. the video data 165;265;865;965, based on an information about a latency of an audio path, e.g. the an information 110;210;310 about a latency of an audio path, and based on an information about a latency of a video path, e.g the information 120; 220;320 about a latency of a video path.

H) Method for Operating an Audio Playback Device According to FIG. 11

FIG. 11 shows a block diagram of a method 1100 for operating a sink device, e.g. the audio playback device 282;482;682;782, according to an embodiment.

The method 1100 comprises a step 1110 of receiving audio data, e.g. the audio data 160;260;660;760;960, via a digital media interface, e.g. the one or more digital media interfaces 170:270. The method 1100 comprises a further step 1120 of decoding the received audio data, to obtain decoded audio data, e.g. the decoded audio data 662;762. The method 1100 comprises a further step 1230 of outputting the decoded output data. The method 1100 comprises a further step 1240 of reporting a device-individual latency information, e.g. the device-individual latency information 616;716 which comprises latency information associated with a playback using the first audio mode and latency information associated with a playback using a second audio mode, in response to a request from a source device.

It is pointed out that the sequence of the steps of the method 1100 as presented in FIG. 11 is not mandatory, but the steps may be performed in any other sequence or in parallel. In particular, step 1140 may be performed independently, i.e. before, after, or overlapping in time, from the other steps.

Figure 12:
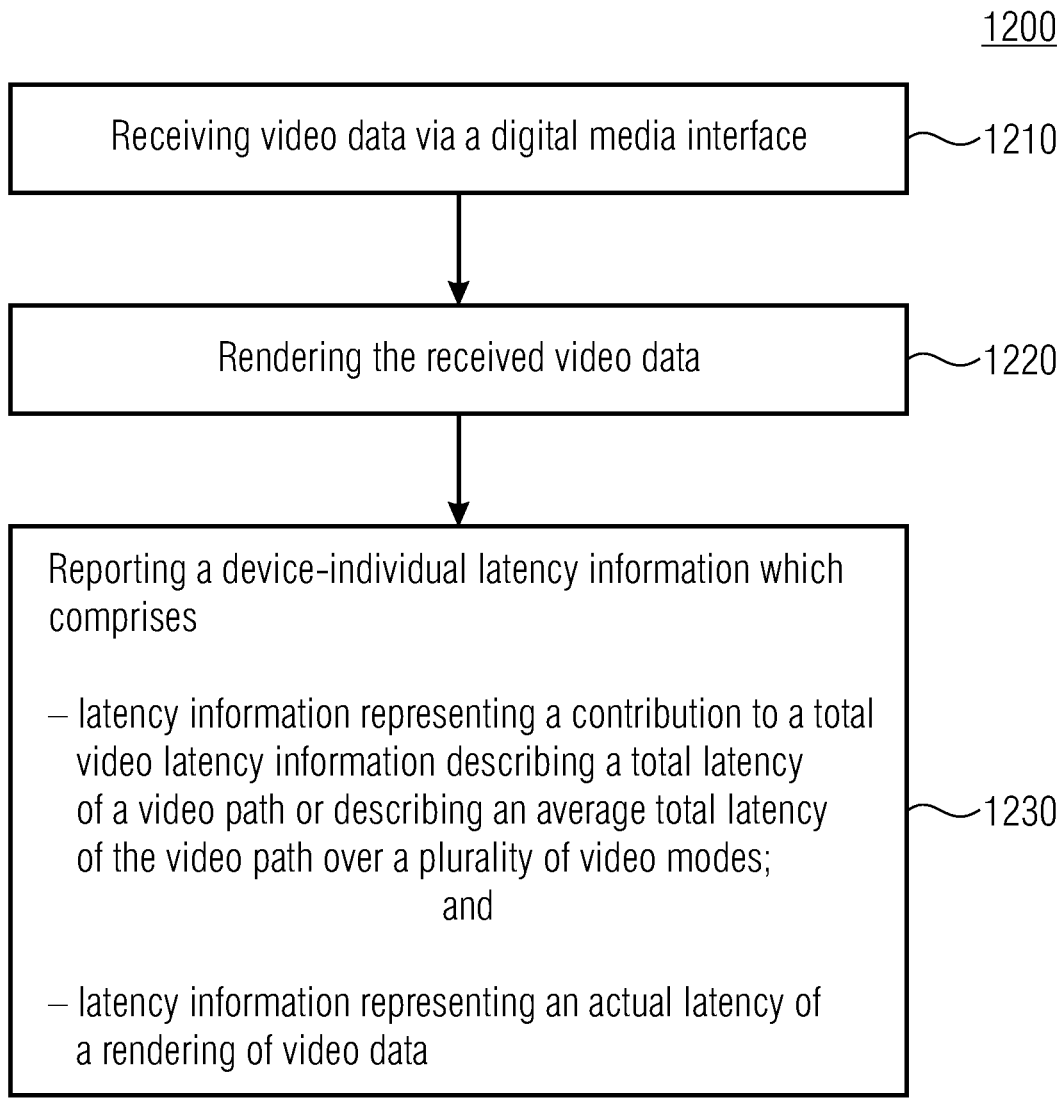
FIG. 12 shows a block diagram of a method for operating a sink device, e.g. a video rendering device, according to an embodiment, Listing of Tables (Tab.)

I) Method for Operating a Video Rendering Devices According to FIG. 12

FIG. 12 shows a block diagram of a method 1200 for operating a sink device, e.g. the video rendering device 292;892;992, according to an embodiment.

The method 1200 comprises a step 1210 of receiving video data, e.g. the video data 165;265;865;965 via a digital media interface, e.g. the digital media interface 870;970. The method 1200 comprises a further step 1220 of rendering the received video data. The method 1200 comprises a further step 1230 of reporting a device-individual latency information, e.g. the device-individual latency information 809;909, which comprises latency information, e.g. the device-individual video latency contribution 227;327;827;927, representing a contribution to a total video latency information describing a total latency of a video path or describing an average total latency of the video path over a plurality of video modes; and latency information, e.g. the current video latency information 228;328;828;929, representing an actual latency of a rendering of video data.

It is pointed out that the sequence of the steps of the method 1200 as presented in FIG. 12 is not mandatory, but the steps may be performed in any other sequence or in parallel. In particular, step 1230 may be performed independently, i.e. before, after, or overlapping in time, from the other steps.

J) Further Embodiments, Aspects and Benefits

Further embodiments of the present invention are described by the following additional embodiments:

1) A source device for playing out audio and video data on an HDMI port according to spec HDMI1.4 or later, the source device comprising:
    automatic adjustment of the time alignment between the played out audio stream and the video stream based on information on the latency of the audio path (from HDMI source output to audible audio) and the latency of the video path (from HDMI source output to visible video)
2) The source device according to the additional embodiment 1, where the video stream can be delayed in the compressed domain if the latency of the audio path is larger than the latency of the video path
3) The source device according to one of the additional embodiments 1 or 2, where the source device implements the CEC DaNoL protocol defined in "CEC Discovery and Negotiation of Latencies (CEC DaNoL)".
4) The source device according to one of the additional embodiments 1 to 3, where the source device executes the steps defined in the document "MPEG-H_Adjust_Source_Delay_Algorithm_(MASDA)" to acquire as many parameters as possible that can be used to calculate latencies of audio path and video path:
    a) execute either '8.7.3 Discovery Algorithm' (HDMI 1.4b) or '10.9 Discovery Algorithm' (HDMI 2.1×) to discover the topology of the connected devices from source device to video sink and from source device to audio sink
    b) read EDID and extract information on audio latency and video latency, if available
    c) (optionally) negotiate the MPEG-H audio decoding latency of the audio sink using CEC DaNoL
    d) collect latency information with CEC DaNoL protocol from all devices in audio path and video path that support CEC DaNoL.
5) The source device according to one of the additional embodiments 1 to 3, where the source device can communicate to the other devices using WLAN or Ethernet or Bluetooth or other network connection and where this communication is used by the source device to collect latency information of the other devices that would otherwise be collected using CEC DaNoL.
6) The source device according to one of the additional embodiments 1 to 5, where the source device
    a) calculates the best available estimation of video latency as defined in MASDA
    b) calculates the best available estimate of audio latency as defined in MASDA.
7) The source device according to one of the additional embodiments 1 to 6, wherein the source device uses the collected latency information to adjust alignment between audio and video as defined in MASDA.
8) The source device according to one of the additional embodiments 1 to 7, wherein the source device provides the user with an interface to manually fine-tune the audio to video alignment.
9) A video sink device with an HDMI input according to HDMI 1.4 or later that implements the exchange of latency information using CEC DaNoL.
10) An audio sink device with an HDMI or HDMI ARC input that implements the exchange of latency information using CEC DaNoL.
11) An audio sink device according to embodiment 10 that additionally has an S/PDIF (electrical or optical) audio input.

Conventional Solution: Today's Synchronization Scheme (details discussed herein can optionally be introduced into the embodiments)

Conventional approaches to improve a synchronization between audio playback and video playback obey the following restrictions:

1) HDMI 1.4 and 2.0 expect source devices to playout audio and video in sync.
2) Sink devices are expected to delay audio by the same amount, that is needed for video rendering.
3) Audio latencies larger than video latency+20 ms are forbidden in this scheme.
4) Discovery of video latency (by devices other than the video sink) is based on optional mechanisms that are typically not implemented in today's devices. In practice, audio sink devices are therefore usually not able to discover the video latency.

Aspects of Embodiments of the Invention (Embodiments according to the invention may implement one or more or all of the aspects mentioned in the following)

The following aspects may be embodied by embodiments of the present invention to solve the problem:

1) Define a new set of vendor specific CEC commands (compatible with all HDMI versions since HDMI1.3) that enables source and sink devices to directly communicate a variety of audio and/or video latencies with each other. See chapter "CEC Discovery and Negotiation of Latencies (CEC DaNoL)". One or more or all of the features, functionalities and details described in said chapter may optionally be used, both individually and in combination.
2) Use all information (or at least some information, or at least relevant information) from existing resources to discover the topology of the setup (path from source to sink) and to discover the audio and video latencies. Combine and enhance this with information from applying CEC DaNoL. Alternatively, the information that would normally be exchanged via CEC DaNoL can be exchanged using other communication paths between the devices.
3) Do the time adjustment between audio and video in the source device by using all known information (or all relevant information). Since video will be available in compressed format in the source device, it can only be delayed in the source device with reasonable effort.

Steps 2) and 3) are described in detail the chapter C.1"MPEG-H_Adjust_Source_Delay_Algorithm_ (MASDA)" also with regard of the fact that information may only partially be available. One or more or all of the features, functionalities and details described in said chapter may optionally be used, both individually and in combination.

Benefits of the Invention (Embodiments of the invention may comprise one or more or all of the following benefits)

1) Lipsync can be achieved if audio latency is larger than video latency+20 ms.
2) Proposed method is compatible to spec HDMI1.4 and HDM12.0.
3) Proposed method can be used in combination of devices that support or do not support CEC DaNoL.
4) Proposed method uses graceful degradation in that it will gradually be reduced in accuracy, if not all information is available, but it will still be useable.
5) Proposed method can discover audio latency of path between source and sink, if CEC DaNoL is supported in source and sink and if latency info from EDID is supported within path.
6) Proposed method can adjust audio and video latency independently for every audio codec and even for sub flavors of it.
7) Proposed method excels the speed and reliability of existing lipsync management algorithms (which are defined only for cases where: audio latency <video latency +20 ms).
8) Proposed method DaNoL defines a latency negotiation between the source device and the audio decoding device so that it is possible to adjust the latency to the most suitable value.
9) Proposed method defines priorities for each obtained information and uses only the most reliable ones, but works up to the level of estimated values.

K) Further Aspects

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

tions, permutations, and equivalents as fall within the true spirit and scope of the present invention.

Abbreviations

In the following, abbreviations used in the foregoing descriptions are exemplarily described. All details are optional. The details used for the explanation of the abbreviations can optionally be introduced into any of the embodiments described herein, both individually and taken in any combination.

| | |
|---|---|
| $AL_{MPEG-H}$ | The MPEG-H audio decoding latency is the time needed by a device from MPEG-H bitstream input to audio output. |
| $AL_{MPEG-H_{DEFAULT}}$ | The default MPEG-H audio decoding latency is 250 ms. It is used if no negotiation is possible or if the negotiation failed. |
| $AL_{MPEG-H_{negotiated}}$ | The negotiated MPEG-H audio decoding latency is the result of a latency negotiation between audio source and sink and is allowed in the region of [0, 500] ms. |
| $AL_{MPEG-H\ passthrough}$ | The MPEG-H audio passthrough latency needed form MPEG-H bitstream input to output. |
| $AL_{pass\ to\ S/PDIF}$ | The 'pass to S/PDIF' audio passthrough latency of a TV is used if the HDMI input bitstream is converted to S/PDIF. This latency is only internally relevant for the TV. |
| $AL_{path}$ | The latency of the audio caused by devices between the source device and the audio decoding device. In small setups there might be no device in the path. |
| $AL_{path_{adjusted}}$ | The adjusted audio path latency replaces every audio latency of a MPEG-H device with its MPEG-H passthrough latency. |
| $AL_{path_{DEFAULT}}$ | The default audio path latency. |
| $AL_{path_{EDID}}$ | The audio path latency according to the EDID. |
| $AL_{pathMPEG-H}$ | The audio path latency according to CEC information obtained only from MPEG-H devices. |
| $AL_{additional}$ | The additional audio latency a source applies to achieve lip sync in the case where audio would be ahead of video. |
| $VL_{additional}$ | The additional video latency a source applies to achieve lip sync in the case where video would be ahead of audio. |
| $VL_{current_{DEFAULT}}$ | The default video latency of a video playout device is 70 ms. This value is used if it is not possible to obtain the actual value. |
| $AL_{EDID_{Source}}$ | This is the audio latency that the source device gets via the EDID Vendor-Specific Data Block (HDMI VSDB). |
| $VL_{EDID_{Source}}$ | This is the video latency that the source device gets via the EDID Vendor-Specific Data Block (HDMI VSDB). |
| $VL_{total}$ | The overall video latency. |
| $VL_n$ | A device n in the video path adds this video latency value to the EDID. It is acquired via CEC. |
| $VL_{current_{DALS}}$ | The current video latency of a video rendering device obtained by Dynamic Auto Lipsync (DALS), see HDMI 2.0a 10.7. |
| $AL_{none\ MPEG-H}$ | An MPEG-H device adds this audio latency value to the EDID. It is not related to MPEG-H but used to calculate the audio path latency. |
| CEC DaNoL information | [ $AL_{none\ MPEG-H}$, VL, $AL_{MPEG-H}$, $AL_{MPEG-H\ passthrough}$, $VL_{current}$ ] device |
| CEC | Consumer Electronics Control |
| DaNoL | Discovery and Negotiation of Latencies |
| EDID | Extended Display Identification Data |
| MPEG-H | Moving Picture Experts Group Standards H |

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A source device for providing audio data and video data on one or more digital media interfaces,
   wherein the source device is configured to automatically adjust a time alignment between a provision of audio data and a provision of video data based on an information about a latency of an audio path and based on an information about a latency of a video path,
   wherein the source device is configured to determine the information about the latency of the video path using a total video latency information describing a total latency of a video path for a first video mode or describing an average total latency of the video path over a plurality of video modes, a static latency information describing a contribution of a video rendering device to the total video latency information, and a current video latency information of the video rendering device, if the total video latency information, the latency information describing a contribution of the video rendering device to the total video latency information and the current video latency information of the video rendering device is available to the source device but some device-individual current video latency information is unavailable to the source device.

2. The source device according to claim 1,
wherein the source device is configured to negotiate a decoding latency with an audio playback device, and to adjust the time alignment in dependence on the negotiated decoding latency.

3. The source device according to claim 2,
wherein the source device is configured to acquire a latency span information describing a span of possible latency values from the audio playback device, or to acquire a latency list information describing one or more possible latency values from the audio playback device, and
wherein the source device is configured to select a desired latency value on the basis of the latency span information or the latency list information; and
wherein the source device is configured to instruct the audio playback device to use the desired latency value; and
wherein the source device is configured to adjust the time alignment in dependence on the selected desired audio playback latency value.

4. The source device according to claim 3,
wherein the source device is configured to verify whether the audio playback device uses the selected desired latency value, as instructed, and
wherein the source device is configured to consider a default latency value if the audio playback device fails to use the selected desired latency value.

5. The source device according to claim 3,
wherein the source device is configured to receive a latency negotiation request comprising a latency span information describing a span of possible latency values from the audio playback device, or comprising a latency list information describing one or more possible latency values from the audio playback device, and
wherein the source device is configured to select a desired latency value on the basis of the latency span information or the latency list information.

6. The source device according to claim 1,
wherein the source device is configured to discover a topology of a connection between the source device and an audio playback device and also of a connection between the source device and a video rendering device, in order to acquire a topology information, and
wherein the source device is configured to adjust the time alignment in dependence on the topology information.

7. The source device according to claim 1,
wherein the source device is configured to acquire a total audio latency information describing a total latency of an audio path for a first audio mode or describing an average total latency of the audio path over a plurality of audio modes, and/or
wherein the source device is configured to acquire a total video latency information describing a total latency of a video path for a first video mode or describing an average total latency of the video path over a plurality of video modes.

8. The source device according to claim 1,
wherein the source device is configured to query a plurality of individual devices for device-individual latency information.

9. The source device according to claim 1,
wherein the source device is configured to determine the information about the latency of the video path
using a summation of device-individual current video latency information, if device-individual current video latency information is available to the source device for the video rendering device and all devices between the source device and the video rendering device and/or
using
a total video latency information describing a total latency of a video path for a first video mode or describing an average total latency of the video path over a plurality of video modes,
a latency information describing a contribution of the video rendering device to the total video latency information, and
a current video latency information of the video rendering device,
if the total video latency information, the latency information describing a contribution of the video rendering device to the total video latency information and the current video latency information of the video rendering device is available to the source device but some device-individual current video latency information is unavailable to the source device; and/or
using the total video rendering information if the total video rendering information is available to the source device but the current video latency information of the video rendering device is unavailable to the source device.

10. The source device according to claim 1,
wherein the source device is configured to determine the information about the latency of the audio path
using a summation of device-individual passthrough latency information associated with a passthrough of audio information for the second audio mode, if device-individual passthrough latency information is available for all devices between the source device and the audio playback device; and/or
using a total audio latency information describing a total latency of an audio path for a first audio mode or describing an average total latency of the audio path over a plurality of audio modes; and/or
using a summation of any known or estimated audio latency information of devices in an audio path between the source device and the audio playback device.

11. The source device according to claim 1,
wherein the source device is configured to correct an information about the latency of the audio path acquired using the total audio latency information using latency information associated with a playback using the first audio mode and using latency information about a latency associated with a passthrough of audio information for the second audio mode.

12. The source device according to claim 1,
wherein the source device is configured to select a determination rule for a determination of the information about the latency of the video path in dependence on an amount of information available to the source.

13. The source device according to claim 12,
wherein the source device is configured to determine a delay to be applied in the provision of audio data and/or a delay to be applied in the provision of the video data in dependence on the information about the latency of the video path and in dependence on the information about the latency of the audio path.

14. The source device according to claim 1,
wherein the source device is configured to also allow for an adjustment of the time alignment using a user interface.

15. The source device according to claim 1,
wherein the source device is configured to communicate with the audio playback device and/or the video rendering device and/or one or more devices between the source device and the audio playback device and/or one or more devices between the source device and the video rendering device using an additional link, which is separate from the one or more digital media interfaces, to acquire latency information from the one or more devices.

16. The source device according to claim 1,
wherein the source device is configured
to acquire an encoded video representation,
to decode the encoded video representation, to acquire a decoded video representation, and
to provide the video data, such that the video data represent the decoded video representation,
wherein the source device is configured to selectively delay the decoding of the encoded video representation based on the information about the latency of the audio path and the information about the latency of the video path.

17. The source device according to claim 1,
wherein the source device is configured to acquire the information about the latency of the audio path using an audio delay information which is acquired from an audio playback device via one of the one or more digital interfaces, and/or
wherein the source device is configured to acquire the information about the latency of the video path using a video delay information which is acquired from a video rendering device via one of the one or more digital interfaces.

18. A sink device,
wherein the sink device is configured to receive audio data via a digital media interface,
wherein the sink device is configured to decode the received audio data, to acquire decoded audio data, and
wherein the sink device is configured to output the decoded output data;
wherein the sink device is configured to report a device-individual latency information which comprises latency information associated with a playback using a first audio mode and latency information associated with a playback using a second audio mode, in response to a request from a source device, and
wherein the sink device is configured to provide a contribution to a total audio latency information describing a total latency of an audio path for a first audio mode or describing an average total latency of the audio path over a plurality of audio modes,
wherein the contribution to the total audio latency information is different from the latency information associated with a playback using the second audio mode, and
wherein the contribution to a total latency information provided by the sink device is equal to the latency information associated with a playback using the first audio mode.

19. The sink device according to claim 18,
wherein the sink device is configured
to provide a latency span information describing a span of possible decoding latency values or playback latency values to the source device, or
to provide a latency list information describing one or more possible decoding latency values or playback latency values to the source device; and
wherein the sink device is configured to receive a latency selection message from the source device and to set a decoding latency or playback latency in response to the latency selection message.

20. The sink device according to claim 18,
wherein the sink device is configured to negotiate a decoding latency or a playback latency associated with the second audio mode with a source device.

21. A sink device,
wherein the sink device is configured to receive video data via a digital media interface,
wherein the sink device is configured to render the received video data;
wherein the sink device is configured to report a device-individual latency information which comprises
static latency information representing a contribution of the sink device to a total video latency information describing a total latency of a video path or describing an average total latency of the video path over a plurality of video modes; and
latency information representing an actual latency of a rendering of video data,
wherein the static latency information representing the contribution to the total video latency information is different from the latency information representing the actual latency of a rendering of video data in a way that
the static latency information representing the contribution to the total video latency information represents a video latency of the sink device when using a standard video mode for rendering the video data, and
the latency information representing the actual latency of a rendering of video data represents a video latency of the sink device for a currently used video mode for rendering the video data.

22. The sink device according to claim 21,
wherein the device-individual latency information reported by the sink device also comprises
latency information associated with an audio playback using a first audio mode; and/or
average latency information associated with an audio playback using a plurality of different modes; and/or
latency information associated with a passthrough of audio information for the second audio mode.

23. The sink device according to claim 21,
wherein the sink device is configured to provide a contribution to a total audio latency information describing a total latency of an audio path for a first audio mode or describing an average total latency of the audio path over a plurality of audio modes, wherein the contribution to the total audio latency information is different from the latency information associated with a passthrough of audio information for the second audio mode.

24. The sink device according to claim 21, wherein the sink device is configured to provide the device-individual latency information such that the device-individual latency information reported by the sink device comprises a latency information associated with a forwarding of audio data 160;260;660;760;860; 960 from a first digital media interface to a second digital media interface.

25. A method for providing audio data and video data on one or more digital media interfaces, wherein the method comprises automatically adjusting a time alignment between a provision of audio data and a provision of video data based on an information about a latency of an audio path and based on an information about a latency of a video path, wherein the method comprises determining the information about the latency of the video path using a total video latency information describing a total latency of a video path for a first video mode or describing an average total latency of the video path over a plurality of video modes, a static latency information describing a contribution of a video rendering device to the total video latency information, and a current video latency information of the video rendering device, if the total video latency information, the latency information describing a contribution of the video rendering device to the total video latency information and the current video latency information of the video rendering device is available to the source device but some device-individual current video latency information is unavailable.

26. A method for operating a sink device, wherein the method comprises receiving audio data via a digital media interface, wherein the method comprises decoding the received audio data, to acquire decoded audio data, and wherein the method comprises outputting the decoded output data;

wherein the method comprises reporting a device-individual latency information which comprises latency information associated with a playback using a first audio mode and latency information associated with a playback using a second audio mode, in response to a request from a source device, and wherein the sink device is configured to provide a contribution to a total audio latency information describing a total latency of an audio path for the first audio mode or describing an average total latency of the audio path over a plurality of audio modes, wherein the contribution to the total audio latency information is different from the latency information associated with a playback using the second audio mode, and wherein the contribution to a total audio latency information provided by the sink device is equal to the latency information associated with a playback using the first audio mode.

27. A method for operating a sink device, wherein the method comprises receiving video data via a digital media interface, wherein the method comprises rendering the received video data wherein the method comprises reporting a device-individual latency information which comprises static latency information representing a contribution of the sink device to a total video latency information describing a total latency of a video path or describing an average total latency of the video path over a plurality of video modes; and latency information representing an actual latency of a rendering of video data, wherein the static latency information representing the contribution of the sink device to the total video latency information is different from the latency information representing the actual latency of a rendering of video data in a way that the static latency information representing the contribution to the total video latency information represents a video latency of the sink device when using a standard video mode for rendering the video data, and the latency information representing the actual latency of a rendering of video data represents a video latency of the sink device for a currently used video mode for rendering the video data.

28. A non-transitory digital storage medium having stored thereon a computer program for performing the method for providing audio data and video data on one or more digital media interfaces according to claim 25 when said computer medium is run by a computer.

29. A non-transitory digital storage medium having stored thereon a computer program for performing the method for operating a sink device according to claim 26 when said computer medium is run by a computer.

30. A non-transitory digital storage medium having stored thereon a computer program for performing the method for operating a sink device according to claim 27 when said computer medium is run by a computer.

* * * * *